US009854201B2

United States Patent
Aharon et al.

(10) Patent No.: US 9,854,201 B2
(45) Date of Patent: Dec. 26, 2017

(54) DYNAMICALLY UPDATING QUALITY TO HIGHER CHROMA SAMPLING RATE

(71) Applicant: Microsoft Technology Licensing, LLC, Redmond, WA (US)

(72) Inventors: Shir Aharon, Mountain View, CA (US); Lihua Zhu, Mountain View, CA (US); B. Anil Kumar, Saratoga, CA (US); Jeroen E. van Eesteren, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 14/599,412

(22) Filed: Jan. 16, 2015

(65) Prior Publication Data
US 2016/0212373 A1 Jul. 21, 2016

(51) Int. Cl.
*H04N 7/26* (2006.01)
*H04N 7/01* (2006.01)
(Continued)

(52) U.S. Cl.
CPC ......... *H04N 7/0102* (2013.01); *H04N 19/167* (2014.11); *H04N 19/17* (2014.11); *H04N 19/186* (2014.11); *H04N 19/513* (2014.11)

(58) Field of Classification Search
CPC ...... H04N 19/186; H04N 19/30; H04N 19/59; H04N 19/147
See application file for complete search history.

(56) References Cited

U.S. PATENT DOCUMENTS

| 5,047,853 A | 9/1991 | Hoffert et al. |
| 5,412,428 A | 5/1995 | Tahara |

(Continued)

FOREIGN PATENT DOCUMENTS

| CN | 1627830 | 6/2005 |
| CN | 102801988 | 11/2012 |

(Continued)

OTHER PUBLICATIONS

Lin, Tao, et al. "Mixed chroma sampling-rate high efficiency video coding for full-chroma screen content." IEEE Transactions on Circuits and Systems for Video Technology 23.1 (2013): 173-185.*

(Continued)

*Primary Examiner* — Neil Mikeska
(74) *Attorney, Agent, or Firm* — Klarquist Sparkman, LLP

(57) ABSTRACT

Innovations in encoding of video pictures in a high-resolution chroma sampling format (such as YUV 4:4:4) using a video encoder operating on coded pictures in a low-resolution chroma sampling format (such as YUV 4:2:0) are presented. For example, according to a set of decision rules, high chroma resolution details are selectively encoded on a region-by-region basis such that increases in bit rate (due to encoding of sample values for the high chroma resolution details) happen when and where corresponding increases in chroma resolution are likely to improve quality in noticeable ways. In this way, available encoders operating on coded pictures in the low-resolution chroma sampling format can be effectively used to provide high chroma resolution details.

24 Claims, 35 Drawing Sheets

(51) Int. Cl.
*H04N 19/167* (2014.01)
*H04N 19/513* (2014.01)
*H04N 19/186* (2014.01)
*H04N 19/17* (2014.01)

(56) References Cited

U.S. PATENT DOCUMENTS

| | | |
|---|---|---|
| 5,650,824 A | 7/1997 | Huang |
| 5,712,687 A | 1/1998 | Naveen et al. |
| 5,742,892 A | 4/1998 | Chaddha |
| 6,208,350 B1 | 3/2001 | Herrera |
| 6,674,479 B2 | 1/2004 | Cook et al. |
| 6,700,588 B1 | 3/2004 | MacInnis et al. |
| 6,937,659 B1 | 8/2005 | Nguyen et al. |
| 6,938,105 B2 | 8/2005 | Osa |
| 7,551,792 B2 | 6/2009 | Kong et al. |
| 7,924,292 B2 | 4/2011 | Bujold et al. |
| 7,995,069 B2 | 8/2011 | Van Hook et al. |
| 8,054,886 B2 | 11/2011 | Srinivasan et al. |
| 8,139,081 B1 | 3/2012 | Daniel |
| 8,472,731 B2 | 6/2013 | Suzuki et al. |
| 8,532,175 B2 | 9/2013 | Pandit et al. |
| 8,532,424 B2 | 9/2013 | Zarubinsky et al. |
| 8,625,666 B2 | 1/2014 | Bakke |
| 8,639,057 B1 | 1/2014 | Mendhekar et al. |
| 8,737,466 B2 | 5/2014 | Demos |
| 8,780,996 B2 | 7/2014 | Bankoski et al. |
| 8,787,443 B2 | 7/2014 | Sun et al. |
| 8,787,454 B1 | 7/2014 | Chechik et al. |
| 8,817,179 B2 | 8/2014 | Zhu et al. |
| 8,837,826 B1 | 9/2014 | Gaddy |
| 8,953,673 B2 | 2/2015 | Tu et al. |
| 9,153,017 B1 | 10/2015 | Russell et al. |
| 9,185,421 B2 | 11/2015 | Wang et al. |
| 9,288,500 B2 | 3/2016 | Budagavi |
| 2002/0101536 A1 | 8/2002 | Cook et al. |
| 2003/0108248 A1 | 6/2003 | Huang et al. |
| 2005/0024384 A1 | 2/2005 | Evans et al. |
| 2005/0053294 A1 | 3/2005 | Mukerjee et al. |
| 2005/0228654 A1 | 10/2005 | Prieto et al. |
| 2006/0013490 A1 | 1/2006 | Sun |
| 2007/0074266 A1 | 3/2007 | Raveendran et al. |
| 2007/0110153 A1 | 5/2007 | Cho et al. |
| 2008/0043852 A1 | 2/2008 | Park et al. |
| 2008/0069247 A1 | 3/2008 | He |
| 2009/0003435 A1 | 1/2009 | Cho et al. |
| 2009/0219994 A1* | 9/2009 | Tu .................... H04N 19/186 375/240.08 |
| 2009/0225225 A1 | 9/2009 | Nakagawa et al. |
| 2010/0046612 A1 | 2/2010 | Sun et al. |
| 2010/0046635 A1 | 2/2010 | Pandit et al. |
| 2011/0199542 A1 | 8/2011 | Hirai |
| 2011/0280316 A1 | 11/2011 | Chen |
| 2011/0286530 A1 | 11/2011 | Tian et al. |
| 2012/0008679 A1* | 1/2012 | Bakke ............... H04N 19/186 375/240.08 |
| 2012/0020413 A1 | 1/2012 | Chen et al. |
| 2012/0093226 A1 | 4/2012 | Chien et al. |
| 2012/0236115 A1 | 9/2012 | Zhang et al. |
| 2012/0307904 A1 | 12/2012 | Yi et al. |
| 2013/0003840 A1* | 1/2013 | Gao .................... H04N 19/50 375/240.12 |
| 2013/0106998 A1 | 5/2013 | Pahalawatta et al. |
| 2013/0113884 A1 | 5/2013 | Leonatris |
| 2013/0121415 A1 | 5/2013 | Wahadaniah et al. |
| 2013/0188744 A1 | 7/2013 | Van der Auwera |
| 2013/0202201 A1* | 8/2013 | Park ................... H04N 19/176 382/165 |
| 2013/0243076 A1 | 9/2013 | Malladi |
| 2013/0287097 A1 | 10/2013 | Song et al. |
| 2014/0022460 A1* | 1/2014 | Li ....................... G06T 5/009 348/708 |
| 2014/0064379 A1 | 3/2014 | Mrak et al. |
| 2014/0072027 A1 | 3/2014 | Li et al. |
| 2014/0072048 A1 | 3/2014 | Ma et al. |
| 2014/0092998 A1 | 4/2014 | Zhu et al. |
| 2014/0112394 A1 | 4/2014 | Sullivan et al. |
| 2014/0169447 A1 | 6/2014 | Hellman |
| 2014/0192261 A1 | 7/2014 | Zhu |
| 2014/0247890 A1 | 9/2014 | Yamaguchi |
| 2014/0301464 A1 | 10/2014 | Wu |
| 2014/0341305 A1 | 11/2014 | Qu et al. |
| 2015/0010068 A1 | 1/2015 | Francois et al. |
| 2015/0016501 A1* | 1/2015 | Guo .................... G06T 9/00 375/240.02 |
| 2016/0212373 A1 | 7/2016 | Aharon et al. |
| 2016/0212433 A1 | 7/2016 | Aharon et al. |
| 2016/0277762 A1 | 9/2016 | Zhang et al. |

FOREIGN PATENT DOCUMENTS

| | | |
|---|---|---|
| EP | 0788282 | 8/1997 |
| EP | 1542476 | 6/2005 |
| EP | 2456204 | 5/2012 |
| EP | 2904769 | 8/2015 |
| JP | 2010-110007 | 5/2010 |
| WO | WO 99/37097 | 7/1999 |
| WO | WO 2009/002061 | 12/2008 |
| WO | WO 2013/128010 | 9/2013 |

OTHER PUBLICATIONS

Ali et al., "Survey of Dirac: A Wavelet Based Video Codec for Multiparty Video Conference and Broadcasting," *Intelligent Video Event Analysis & Understanding*, pp. 211-247 (Jan. 2011).

Bross et al., "High Efficiency Video Coding (HEVC) Text Specification Draft 7," JCTVC-I1003_d5, 294 pp. (Apr. 2012).

Bross et al., "High Efficiency Video Coding (HEVC) Text Specification Draft 9," JCTVC-K1003, 311 pp. (Oct. 2012).

Bross et al., "High Efficiency Video Coding (HEVC) Text Specification Draft 10 (for FDIS & Last Call)," JCTVC-L1003, 310 pp. (Jan. 2013).

Bross et al., "Proposed Editorial Improvements for High Efficiency Video Coding (HEVC) Text Specification Draft 8," JCTVC-K0030, 276 pp. (Oct. 2012).

Calderbank et al., "Wavelet Transforms That Map Integers to Integers," *Applied and Computational Harmonic Analysis*, vol. 5, pp. 332-369 (1998).

Chen et al., "R-D Cost Based Effectiveness Analysis of Dual-coder Mixed Chroma-sampling-rate (DMC) Coding for 4:4:4 Screen Content," JCTVC-J0353, 6 pp. (Jul. 2012).

Cohen et al., "Biorthogonal Bases of Compactly Supported Wavelets," *Communications on Pure and Applied Mathematics*, pp. 485-560 (1992).

Flynn et al., "High Efficiency Video Coding (HEVC) Range Extensions Text Specification: Draft 3," JCTVC-M1005, 315 pp. (Apr. 2013).

Gold, "Stop Worrying About Compression With an On-Camera Video Recorder," downloaded from http://www.bhphotovideo.com/indepth/video/hands-reviews/stop-worrying-about-compression-camera-video-recorder, 6 pp. (Jul. 2012).

He et al., "De-Interlacing and YUV 4:2:2 to 4:2:0 Conversion on TMS320DM6446 Using the Resizer," Texas Instruments Application Report SPRAAK3B, 18 pp. (Dec. 2008).

"HEVC Software Repository," downloaded from https://hevc.hhi.fraunhofer.de/svn/svn_HEVCSoftware/, 1 p. (downloaded on Sep. 17, 2013).

ISO/IEC, "Information Technology—JPEG 2000 Image Coding System—Part 11: Wireless," ISO/IEC FCD 15444-11, 72 pp. (Mar. 2005).

ISO/IEC, "ISO/IEC 11172-2, Information Technology—Coding of Moving Pictures and Associated Audio for Digital Storage Media at up to About 1.5 Mbit/s," 122 pp. (Aug. 1993).

ISO/IEC, "Information Technology—Coding of Audio-Visual Objects: Visual, ISO/IEC 14496-2, Committee Draft," 330 pp. (Mar. 1998).

ISO/IEC, "Information Technology—Coding of Audio-Visual Objects—Part 10: Advanced Video Coding," ISO/IEC 14496-10, 7th edition, 720 pp. (May 2012).

(56) References Cited

OTHER PUBLICATIONS

ITU-R, Recommendation ITU-R BT.601-7, "Studio Encoding Parameters of Digital Television for Standard 4:3 and Wide-screen 16:9 Aspect Ratios," 19 pp. (Mar. 2011).

ITU-R, Recommendation ITU-R BT.709-5, "Parameter Values for the HDTV Standards for Production and International Programme Exchange," 32 pp. (Apr. 2002).

ITU-R, Recommendation ITU-R BT.2020, "Parameter Values for Ultra-high Definition Television Systems for Production and International Programme Exchange," 7 pp. (Aug. 2012).

ITU-T, "ITU-T Recommendation H.261, Video Codec for Audiovisual Services at p × 64 kbits," 28 pp. (Mar. 1993).

ITU-T, "ITU-T Recommendation H.262, Information Technology—Generic Coding of Moving Pictures and Associated Audio Information: Video," 218 pp. (Jul. 1995).

ITU-T, "ITU-T Recommendation H.263, Video Coding for Low Bit Rate Communication," 167 pp. (Feb. 1998).

ITU-T, H.264, "Advanced Video Coding for Generic Audiovisual Services," 680 pp. (Jan. 2012).

ITU-T, T.800, "Information Technology—JPEG 2000 Image Coding System: Core Coding System," 217 pp. (Aug. 2002).

Jin et al., "Resynchronization and Remultiplexing for Transcoding to H.264/AVC," *Journal of Zhejiang University Science A*, pp. 76-81 (Jan. 2006).

Le Gall et al., "Sub-band Coding of Digital Images Using Symmetric Short Kernel Filters and Arithmetic Coding Techniques," *IEEE Trans. on Acoustics, Speech, and Signal Processing*, pp. 761-764 (Apr. 1988).

Lin et al., "Syntax and Semantics of Dual-coder Mixed Chroma-sampling-rate (DMC) Coding for 4:4:4 Screen Content," JCTVC-J0233, 4 pp. (Jul. 2012).

Ma et al., "De-Ringing Filter for Scalable Video Coding," *IEEE Int'l Conf. on Multimedia and Expo Workshops*, 4 pp. (Jul. 2013).

Microsoft Corporation, "ClearType Information," downloaded from http://www.microsoft.com/typography/cleartypeinfo.mspx, 2 pp. (Jan. 2010).

Microsoft Corporation, "Microsoft RemoteFX," downloaded from http://technet.microsoft.com/en-us/library/ff817578(WS.10).aspx, 10 pp. (Feb. 2011).

Mohanbabu et al., "Chroma Subsampling Based Compression of Bayer-Pattern Video Sequences using Gradient Based Interpolation," *European Journal of Scientific Research*, vol. 86, No. 4, pp. 556-564 (Sep. 2012).

Rao et al., *Techniques and Standards for Image, Video, and Audio Coding*, Prentice-Hall, Ch. 2, pp. 9-16 (1996).

Reddy et al., "Subband Decomposition for High-Resolution Color in HEVC and AVC 4:2:0 Video Coding Systems," Microsoft Research Tech Report MSR-TR-2014-31, 12 pp. (Mar. 2014).

Rossholm et al., "Adaptive De-Blocking De-Ringing Post Filter," *IEEE Int'l Conf. on Image Process*, vol. 2, 4 pp. (Sep. 2005).

Rothweiler, "Polyphase Quadrature Filters—A New Subband Coding Technique," *IEEE Trans. on Acoustics, Speech, and Signal Processing*, pp. 1280-1283 (Apr. 1983).

Schwarz et al., "Overview of the Scalable Video Coding Extension of the H.264/AVC Standard," *IEEE Trans. on Circuits and Systems for Video Technology*, vol. 17, No. 9, pp. 1103-1120 (Sep. 2007).

Smith et al., "Exact Reconstruction Techniques for Tree-Structured Subband Coders," *IEEE Trans. on Acoustics, Speech, and Signal Processing*, vol. ASSP-34, No. 3, pp. 434-441 (Jun. 1986).

SMPTE 421M, "VC-1 Compressed Video Bitstream Format and Decoding Process," 493 pp. (Feb. 2006).

Sullivan et al., "Recommended 8-Bit YUV Formats for Video Rendering," downloaded from the World Wide Web, 9 pp. (document marked: Apr. 2002, updated Nov. 2008).

Sullivan et al., "Overview of the High Efficiency Video Coding (HEVC) Standard," *IEEE Trans. on Circuits and Systems for Video Technology*, vol. 22, No. 12, pp. 1649-1668 (Dec. 2012).

Sweldens, "The Lifting Scheme: A Construction of Second Generation Wavelets," to appear in *SIAM Journal on Mathematical Analysis*, 42 pp. (May 1995).

Uytterhoeven et al., "Wavelet Based Interactive Video Communication and Image Database Consulting—Wavelet Transforms Using the Lifting Scheme," 24 pp. (Apr. 1997).

Vetro, "Frame Compatible Formats for 3D Video Distribution," Mitsubishi Electric Research Laboratories TR2010-099, 6 pp. (Nov. 2010).

Villasenor et al., "Wavelet Filter Evaluation for Image Compression," *IEEE Trans. on Image Processing*, vol. 4, No. 8, pp. 1053-1060 (Aug. 1995).

Wan et al., "Perceptually Adaptive Joint Deringing-Deblocking Filtering for Scalable Video Transmission over Wireless Networks," *Proc. of Signal Processing: Image Communication*, vol. 22, Issue 3, 25 pp. (Mar. 2007).

Wiegand et al., "Overview of the H.264/AVC Video Coding Standard," *IEEE Trans. on Circuits and Systems for Video Technology*, vol. 13, No. 7, pp. 560-576 (Jul. 2003).

Wikipedia, "Chroma Subsampling," 8 pp. (last modified Aug. 20, 2013).

Wong, "Enhancement and Artifact Removal for Transform Coded Document Images," powerpoint slides, 45 pp. (Apr. 2010).

Wu et al., "Frame Packing Arrangement SEI for 4:4:4 Content in 4:2:0 Bitstreams," JCTVC-K0240, 6 pp. (Oct. 2012).

Wu et al., "Tunneling High-Resolution Color Content through 4:2:0 HEVC and AVC Video Coding Systems," *IEEE Data Compression Conf.*, 10 pp. (Mar. 2013).

Ying et al., "4:2:0 Chroma Sample Format for Phase Difference Eliminating and Color Space Scalability," JVT-O078, 13 pp. (Apr. 2005.).

Zhang et al., "Additional Experiment Results for Frame Packing Arrangement SEI Message for 4:4:4 Content in 4:2:0 Bitstreams," JCTVC-M0281, 11 pp. (Apr. 2013).

Zhang et al., "BD-rate Performance vs. Dictionary Size and Hash-table Memory Size in Dual-coder Mixed Chroma-sampling-rate (DMC) Coding for 4:4:4 Screen Content," JCTVC-J0352, 3 pp. (Jul. 2012).

Zhang et al., "Updated Proposal for Frame Packing Arrangement SEI for 4:4:4 Content in 4:2:0 Bitstreams," JCTVC-L0316, 10 pp. (Jan. 2013).

Zhang et al., "Updated Proposal with Software for Frame Packing Arrangement SEI Message for 4:4:4 Content in 4:2:0 Bitstreams," JCTVC-N0270, 9 pp. (Aug. 2013).

Dumic et al., "Image Quality of 4:2:2 and 4:2:0 Chroma Subsampling Formats," *Int'l Symp. ELMAR*, pp. 19-24 (Sep. 2009).

International Preliminary Report on Patentability dated Apr. 13, 2017, from International Patent Application No. PCT/US2016/013121, 20 pp.

International Search Report and Written Opinion dated Apr. 21, 2016, from International Patent Application No. PCT/US2016/013121, 15 pp.

Khairat et al., "Adaptive Cross-Component Prediction for 4:4:4 High Efficiency Video Coding," *Int'l Conf. on Image Processing*, pp. 3734-3738 (Oct. 2014).

Lin et al., "Mixed Chroma Sampling-Rate Coding: Combining the Merits of 4:4:4 and 4:2:0 and Increasing the Value of Past 4:2:0 Investment," JCTVC-H0065, 5 pp. (Feb. 2012).

Lin et al., "Mixed Chroma Sampling-Rate High Efficiency Video Coding for Full-Chroma Screen Content," *IEEE Trans. On Circuits and Systems for Video Technology*, vol. 23, No. 1, pp. 173-185 (Jan. 2013).

Su et al., "Image Interpolation by Pixel Level Data-Dependent Triangulation," *Computer Graphics Forum*, 13 pp. (Jun. 2004).

Wiegand, "Study of Final Committee Draft of Joint Video Specification (ITU-T Rec. H.264 I ISO/IEC 14496-10 AVC)" JVT-F100, 242 pp. (Dec. 2002).

Written Opinion of the International Preliminary Examining Authority dated Jan. 24, 2017, 9 pp.

* cited by examiner software 180 implementing one or more innovations for encoding and/or decoding of high chroma resolution details

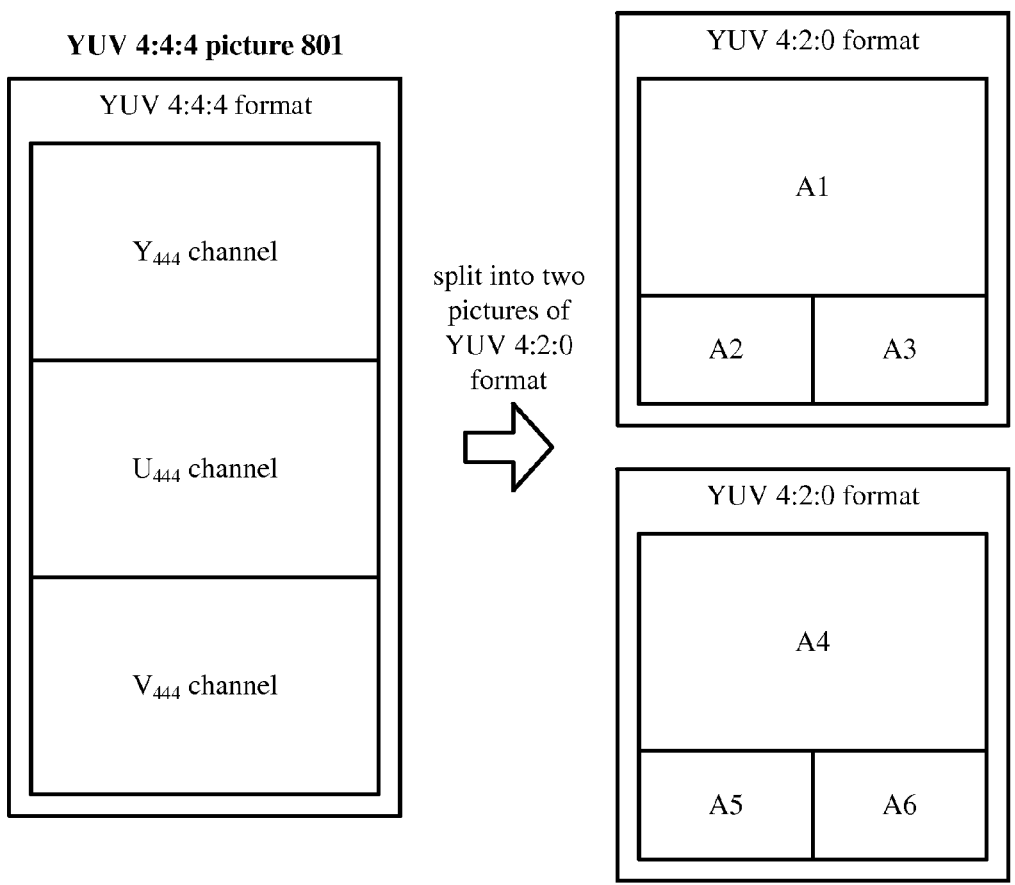

A1 = values from $Y_{444}$ channel
A2 = values from even columns, even rows of $U_{444}$ channel (possibly filtered)
A3 = values from even columns, even rows of $V_{444}$ channel (possibly filtered)
A4 = values from odd columns of $U_{444}$ channel and odd columns of $V_{444}$ channel, alternating on a column-by-column basis ($U_{444}$ column 1, $V_{444}$ column 1, $U_{444}$ column 3, $V_{444}$ column 3)
A5 = values from even columns, odd rows of $U_{444}$ channel
A6 = values from even columns, odd rows of $V_{444}$ channel

FIG. 8c

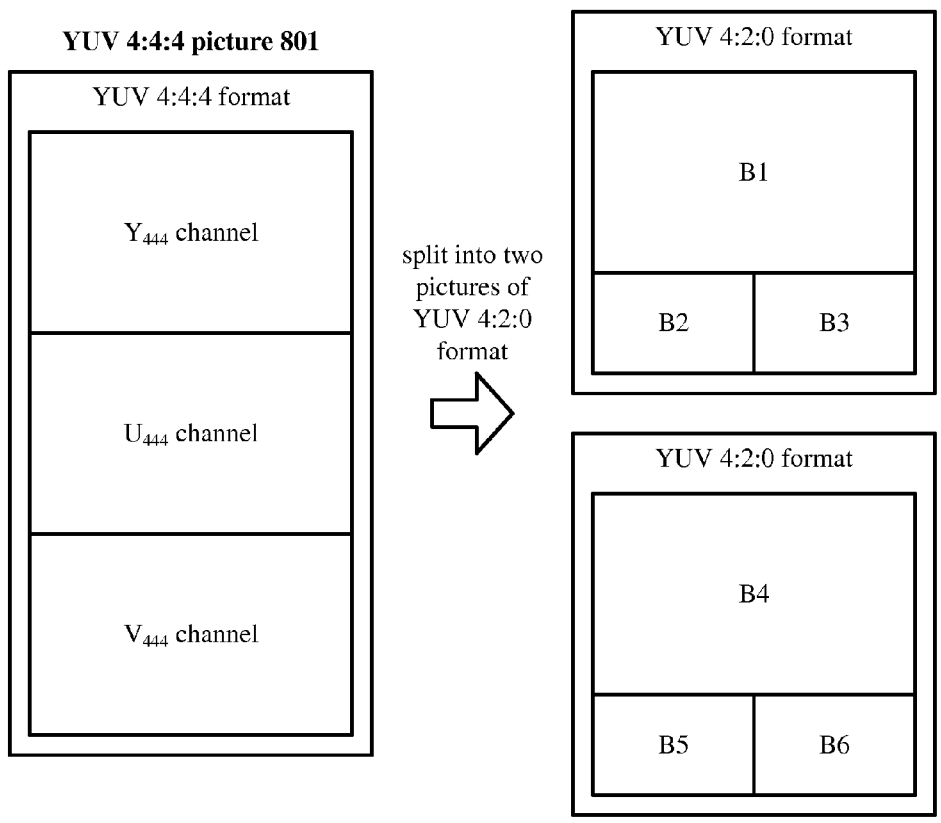

B1 = values from $Y_{444}$ channel
B2 = values from even columns, even rows of $U_{444}$ channel (possibly filtered)
B3 = values from even columns, even rows of $V_{444}$ channel (possibly filtered)
B4 = values from odd rows of $U_{444}$ channel and odd rows of $V_{444}$ channel, alternating on a row-by-row basis ($U_{444}$ row 1, $V_{444}$ row 1, $U_{444}$ row 3, $V_{444}$ row 3)
B5 = values from odd columns, even rows of $U_{444}$ channel
B6 = values from odd columns, even rows of $V_{444}$ channel

FIG. 8d 830

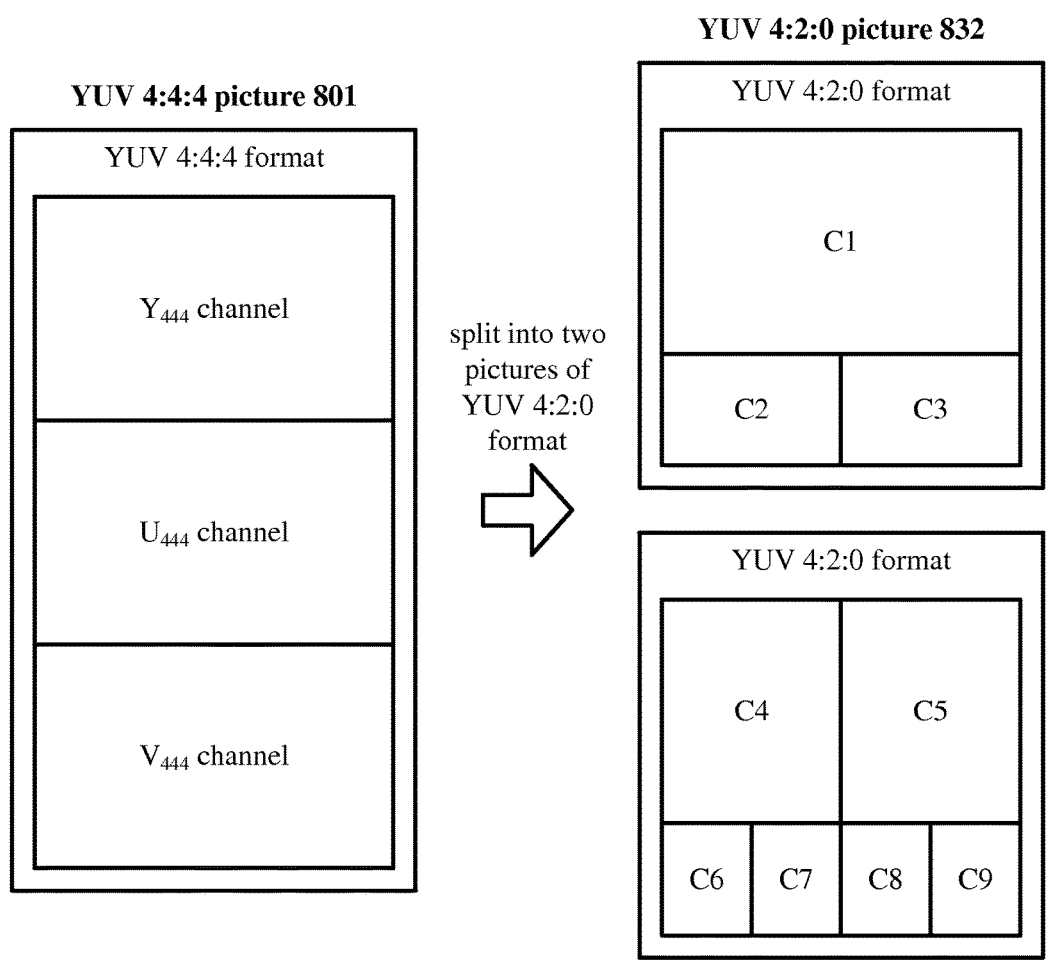

C1 = values from $Y_{444}$ channel
C2 = values from even columns in even rows of $U_{444}$ channel (possibly filtered)
C3 = values from even columns in even rows of $V_{444}$ channel (possibly filtered)
C4 = values from odd columns of $U_{444}$ channel
C5 = values from odd columns of $V_{444}$ channel
C6 = values from columns 0, 4, 8, ... in odd rows of $U_{444}$ channel
C7 = values from columns 0, 4, 8, ... in odd rows of $V_{444}$ channel
C8 = values from columns 2, 6, 10, ... in odd rows of $U_{444}$ channel
C9 = values from columns 2, 6, 10, ... in odd rows of $V_{444}$ channel

FIG. 8e    840

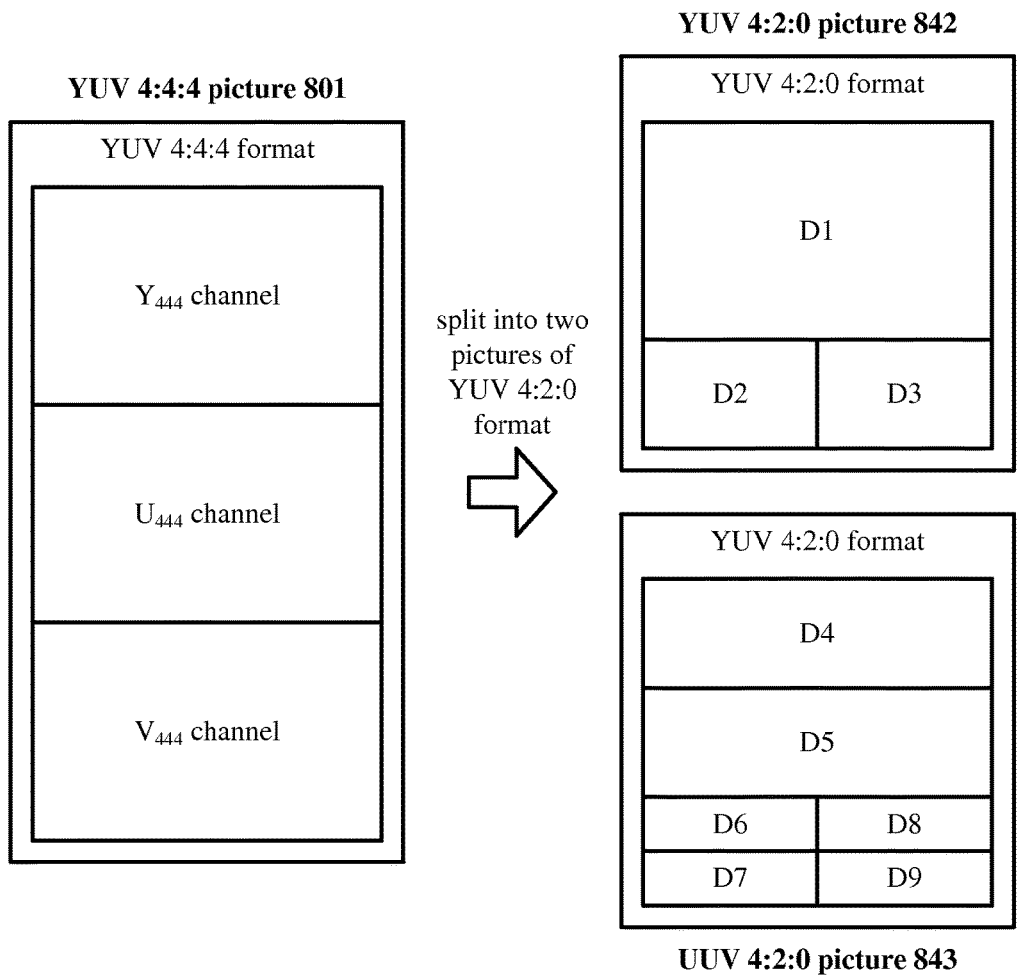

YUV 4:4:4 picture 801 → split into two pictures of YUV 4:2:0 format → YUV 4:2:0 picture 842 and UUV 4:2:0 picture 843

D1 = values from $Y_{444}$ channel
D2 = values from even columns in even rows of $U_{444}$ channel (possibly filtered)
D3 = values from even columns in even rows of $V_{444}$ channel (possibly filtered)
D4 = values from odd rows of $U_{444}$ channel
D5 = values from odd rows of $V_{444}$ channel
D6 = values from odd columns in rows 0, 4, 8, ... of $U_{444}$ channel
D7 = values from odd columns in rows 0, 4, 8, ... of $V_{444}$ channel
D8 = values from odd columns in rows 2, 6, 10, ... of $U_{444}$ channel
D9 = values from odd columns in rows 2, 6, 10, ... of $V_{444}$ channel

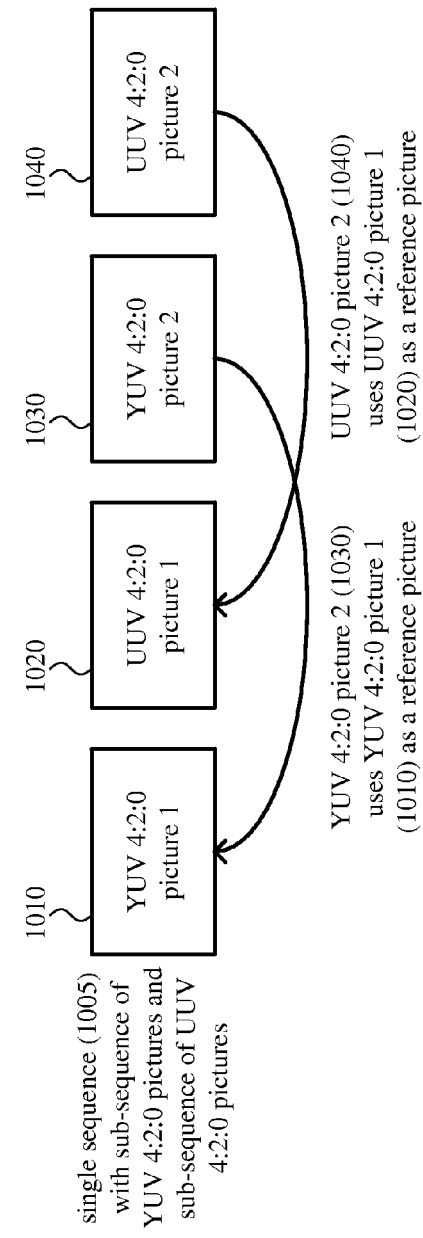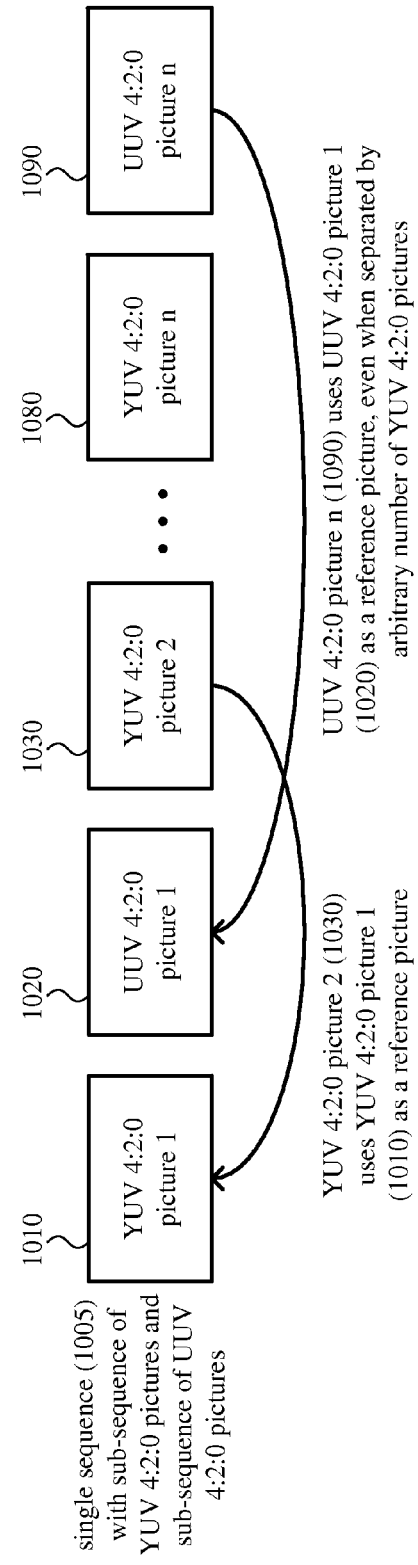

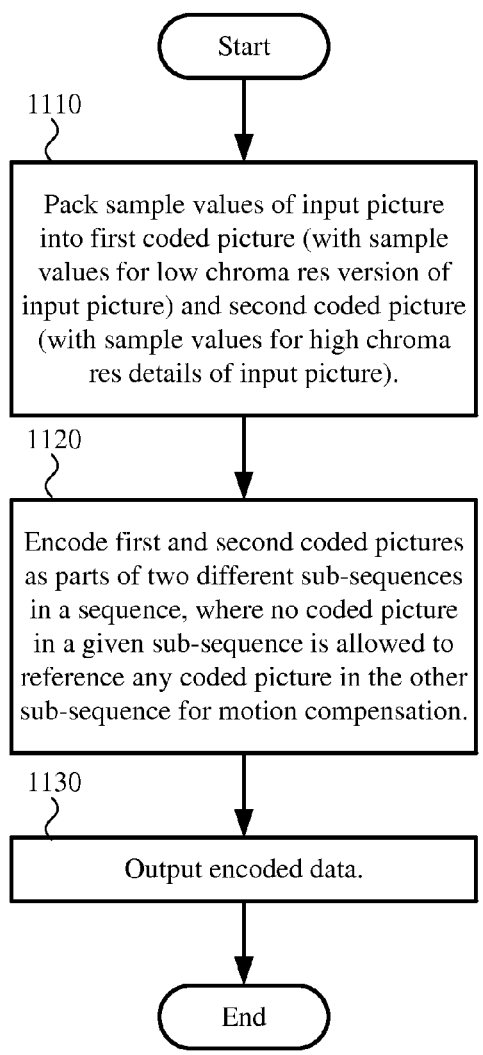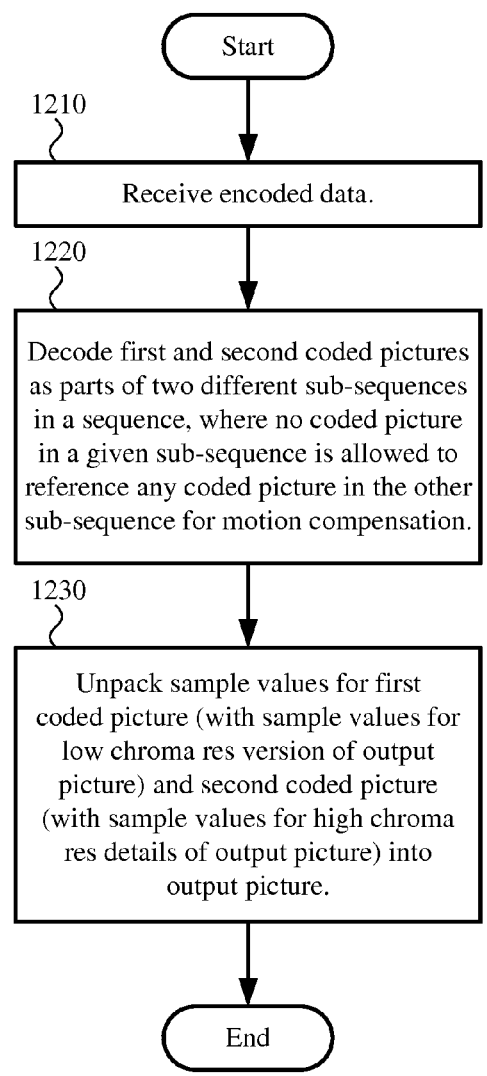

FIG. 15  1500

YUV 4:2:0 picture 1510 for input picture _x_

| region 0<br>dirty | region 1<br>dirty | region 2<br>dirty | region 3<br>dirty |
|---|---|---|---|
| region 4<br>dirty | region 5<br>not dirty | region 6<br>not dirty | region 7<br>not dirty |
| region 8<br>dirty | region 9<br>not dirty | region 10<br>not dirty | region 11<br>not dirty | map 1512 for
YUV 4:2:0 picture 1510 region 0: 0x00    region 6: 0x01
region 1: 0x00    region 7: 0x01
region 2: 0x00    region 8: 0x00
region 3: 0x00    region 9: 0x01
region 4: 0x00    region 10: 0x01
region 5: 0x01    region 11: 0x01

UUV 4:2:0 picture 1520 for input picture _x_

| region 0<br>dirty | region 1<br>dirty | region 2<br>dirty | region 3<br>dirty |
|---|---|---|---|
| region 4<br>dirty | region 5<br>dirty | region 6<br>dirty | region 7<br>dirty |
| region 8<br>dirty | region 9<br>not dirty | region 10<br>not dirty | region 11<br>not dirty | map 1522 for
UUV 4:2:0 picture 1520 region 0: 0x00    region 6: 0x00
region 1: 0x00    region 7: 0x00
region 2: 0x00    region 8: 0x00
region 3: 0x00    region 9: 0x01
region 4: 0x00    region 10: 0x01
region 5: 0x00    region 11: 0x01

0x00 = dirty
0x01 = not dirty

YUV 4:2:0 picture 1610 for input picture x

| region 0<br>dirty | region 1<br>non-dirty<br>non-high quality | region 2<br>non-dirty<br>non-high quality | region 3<br>non-dirty<br>non-high quality |
|---|---|---|---|
| region 4<br>dirty | region 5<br>non-dirty<br>high quality | region 6<br>non-dirty<br>high quality | region 7<br>non-dirty<br>high quality |
| region 8<br>dirty | region 9<br>non-dirty<br>high quality | region 10<br>non-dirty<br>high quality | region 11<br>non-dirty<br>high quality | map 1612 for
YUV 4:2:0 picture 1610 region 0: 0x02  region 6: 0x01
region 1: 0x00  region 7: 0x01
region 2: 0x00  region 8: 0x02
region 3: 0x00  region 9: 0x01
region 4: 0x02  region 10: 0x01
region 5: 0x01  region 11: 0x01

UUV 4:2:0 picture 1620 for input picture x

| region 0<br>dirty | region 1<br>dirty | region 2<br>dirty | region 3<br>dirty |
|---|---|---|---|
| region 4<br>dirty | region 5<br>dirty | region 6<br>dirty | region 7<br>dirty |
| region 8<br>dirty | region 9<br>non-dirty<br>high quality | region 10<br>non-dirty<br>high quality | region 11<br>non-dirty<br>high quality | map 1622 for
UUV 4:2:0 picture 1620 region 0: 0x02  region 6: 0x02
region 1: 0x02  region 7: 0x02
region 2: 0x02  region 8: 0x02
region 3: 0x02  region 9: 0x01
region 4: 0x02  region 10: 0x01
region 5: 0x02  region 11: 0x01

0x00 = non-dirty, non-high quality
0x01 = non-dirty, high quality
0x02 = dirty

FIG. 17 <u>1700</u>
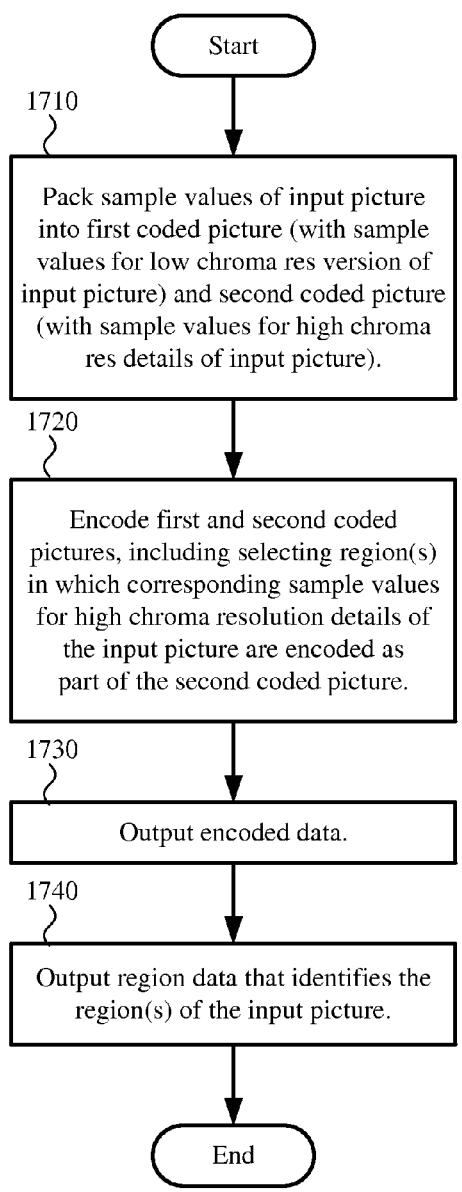
FIG. 18 <u>1800</u>
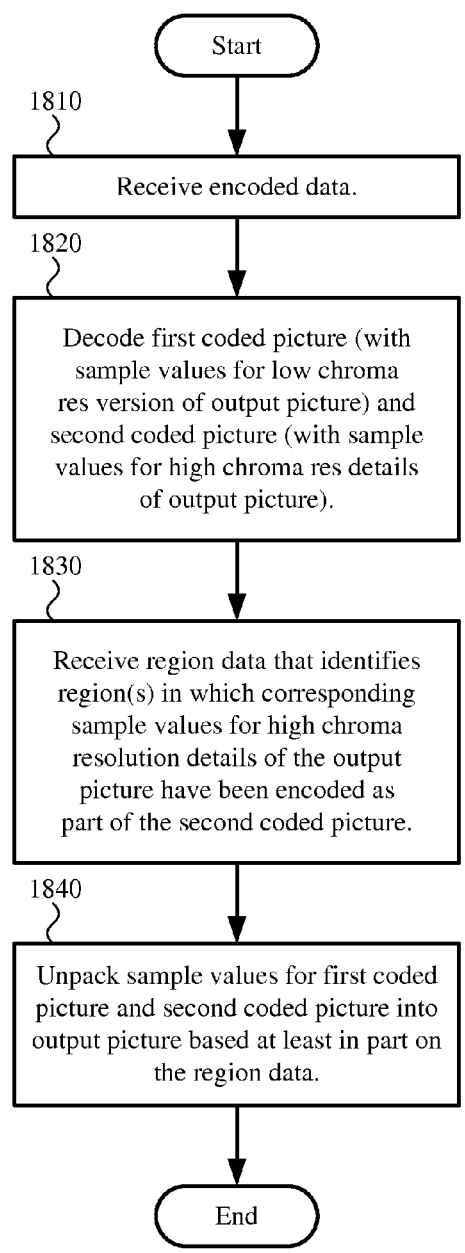

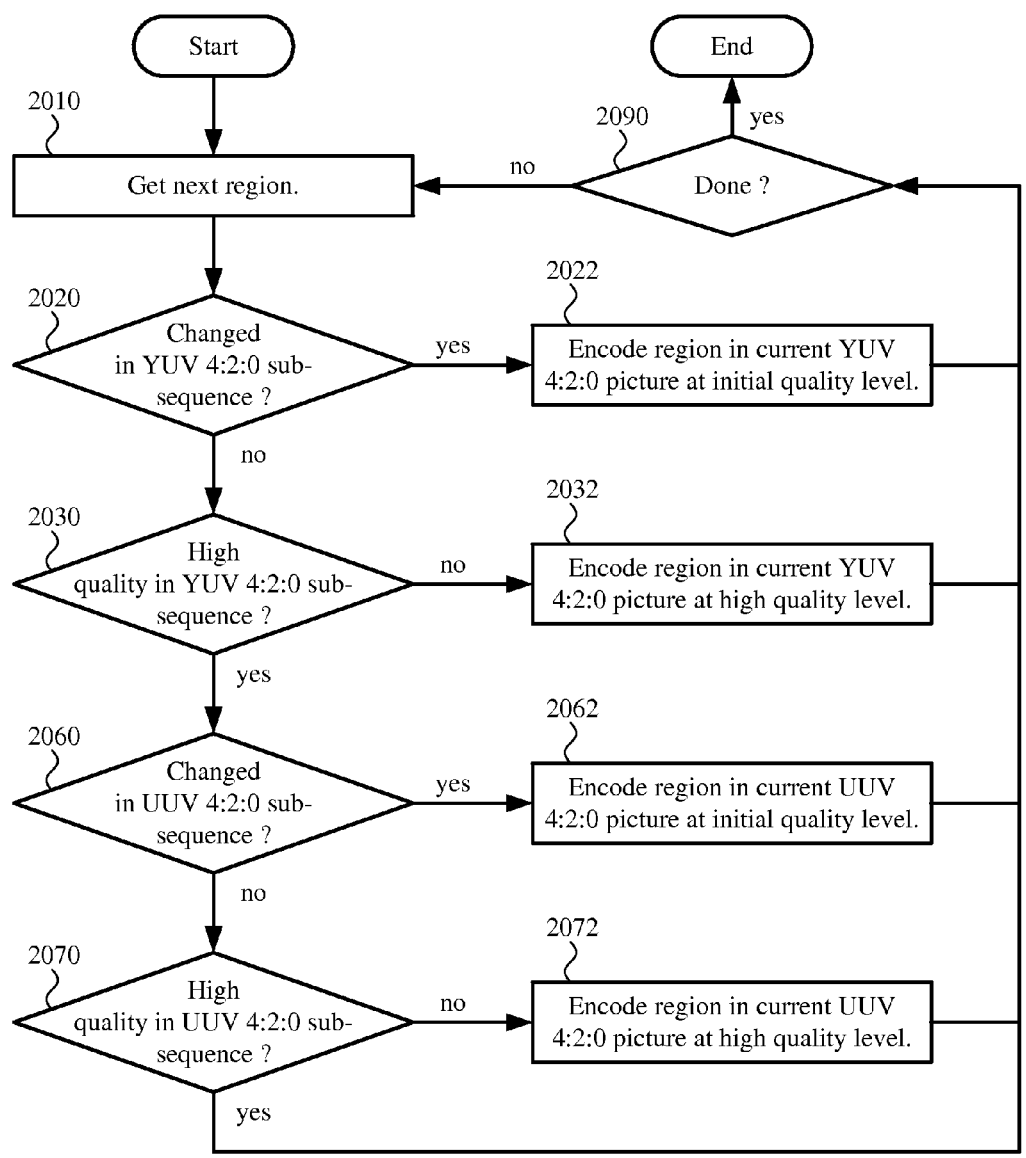

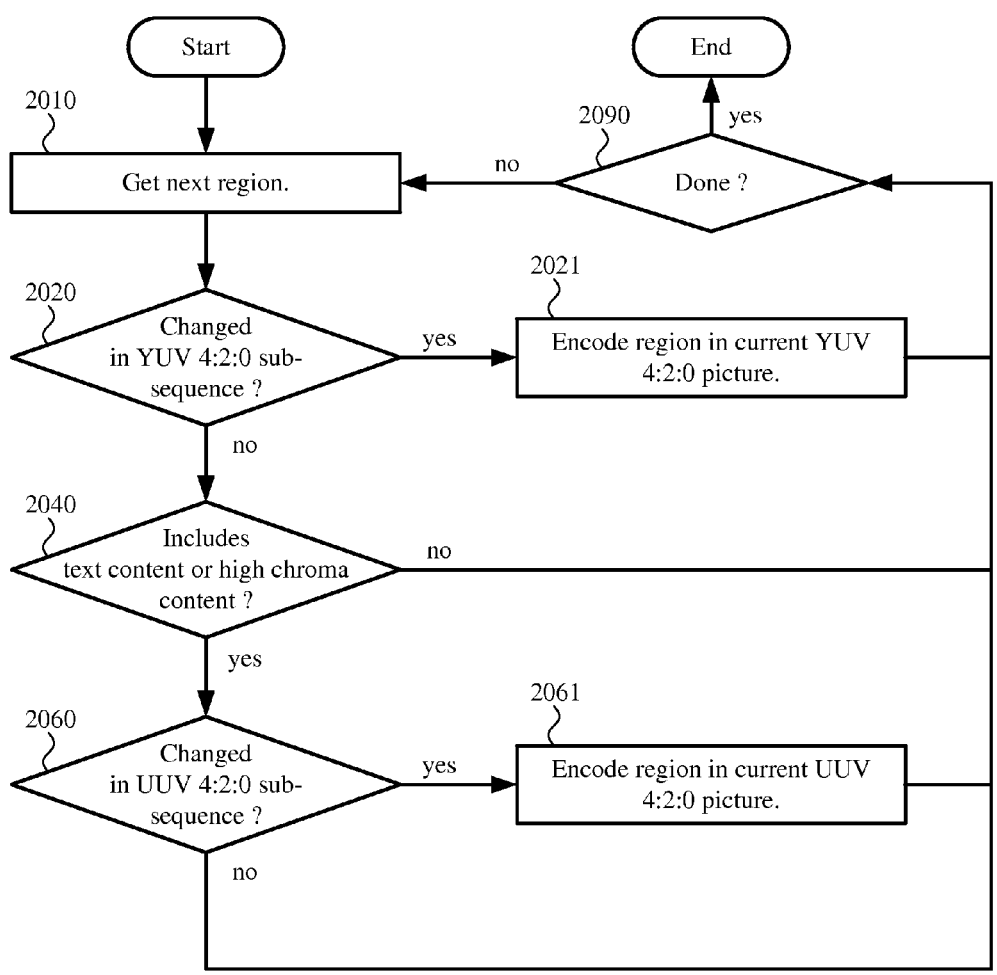

FIG. 22a  2201

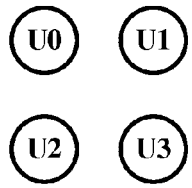

$U0 = U_{444}(2x, 2y)$
$U1 = U_{444}(2x+1, 2y)$
$U2 = U_{444}(2x, 2y+1)$
$U3 = U_{444}(2x+1, 2y+1)$ apply anti-aliasing filter ⬇

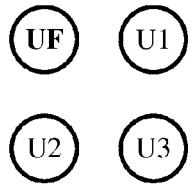

$UF = (\alpha * U0 + \beta * U1 + \gamma * U2 + \delta * U3) / (\alpha + \beta + \gamma + \delta)$
(e.g., $UF = (U0 + U1 + U2 + U3)/4$)

separate into coded pictures,
encode coded pictures,
transmit,
decode (reconstruct),
combine into output picture

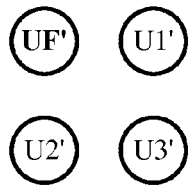

UF' = reconstructed UF
U1' = reconstructed $U_{444}(2x+1, 2y)$
U2' = reconstructed $U_{444}(2x, 2y+1)$
U3' = reconstructed $U_{444}(2x+1, 2y+1)$ apply recovery filter ⬇

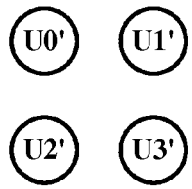

$U0' = ((\alpha + \beta + \gamma + \delta) * UF' + \beta * U1' - \gamma * U2' - \delta * U3') / \alpha$
(e.g., $U0' = 4*UF' - U1' - U2' - U3'$)

FIG. 22b         2202

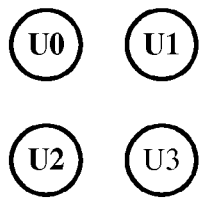

$U0 = U_{444}(2x, 2y)$
$U1 = U_{444}(2x+1, 2y)$
$U2 = U_{444}(2x, 2y+1)$
$U3 = U_{444}(2x+1, 2y+1)$ apply anti-aliasing filter ⇩

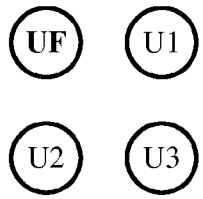

$UF = (\alpha * U0 + \beta * U1 + \gamma * U2) / (\alpha + \beta + \gamma)$
(*e.g.*, $UF = (U0 + U1 + U2)/3$)

separate into coded pictures,
encode coded pictures,
transmit,
decode (reconstruct),
combine into output picture

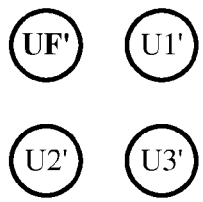

$UF'$ = reconstructed UF
$U1'$ = reconstructed $U_{444}(2x+1, 2y)$
$U2'$ = reconstructed $U_{444}(2x, 2y+1)$
$U3'$ = reconstructed $U_{444}(2x+1, 2y+1)$ apply recovery filter ⇩

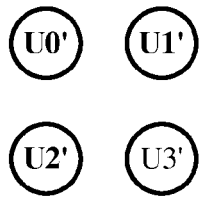

$U0' = ((\alpha + \beta + \gamma) * UF' + \beta * U1' - \gamma * U2') / \alpha$
(*e.g.*, $U0' = 3*UF' - U1' - U2'$)

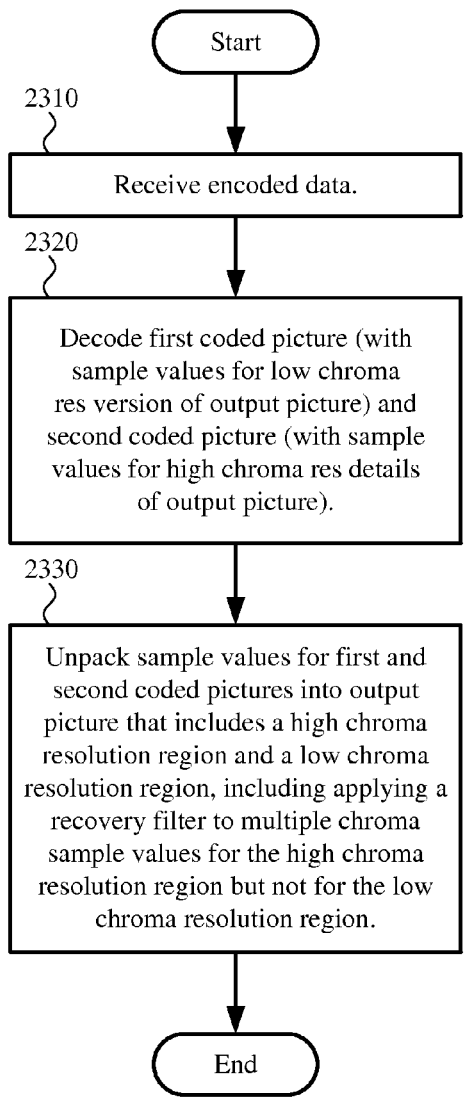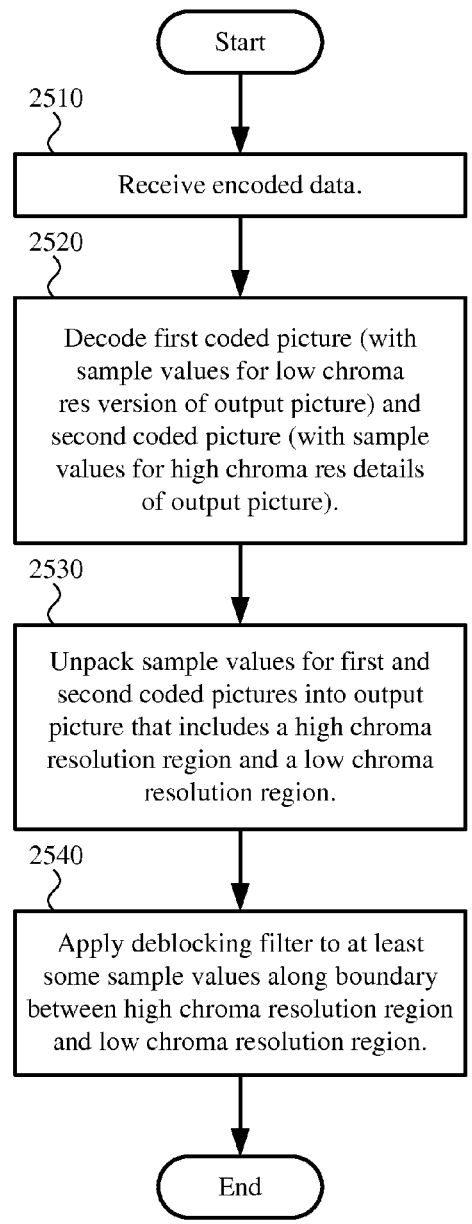

FIG. 24
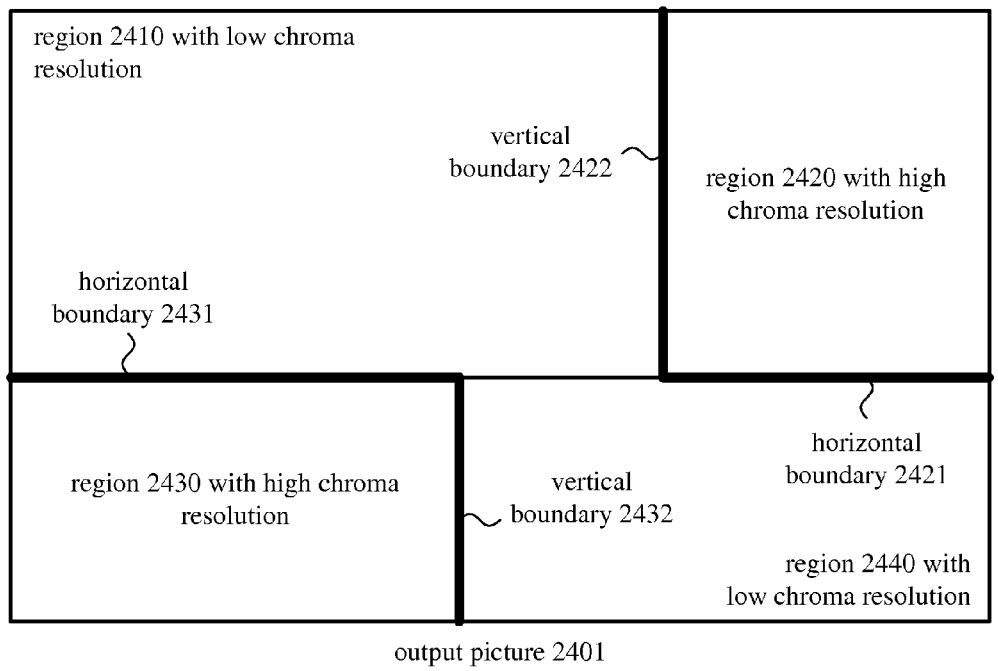
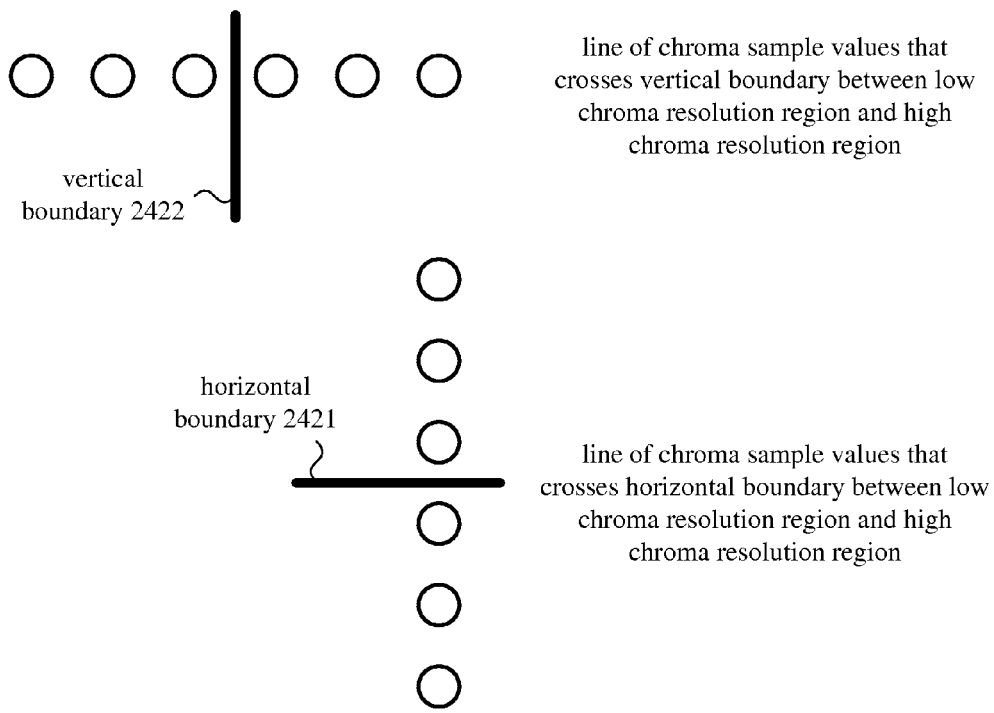

DYNAMICALLY UPDATING QUALITY TO HIGHER CHROMA SAMPLING RATE

BACKGROUND

Engineers use compression (also called source coding or source encoding) to reduce the bit rate of digital video. Compression decreases the cost of storing and transmitting video information by converting the information into a lower bit rate form. Compression can be lossless, in which case quality of the video when reconstructed does not suffer but decreases in bit rate are limited by the complexity of the video. Or, compression can be lossy, in which case quality of the reconstructed video suffers but decreases in bit rate are more dramatic. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263, H.264 (MPEG-4 AVC or ISO/IEC 14496-10), and H.265 (HEVC or ISO/IEC 23008-2) standards, the MPEG-1 (ISO/IEC 11172-2) and MPEG-4 Visual (ISO/IEC 14496-2) standards, and the SMPTE 421M standard. A video codec standard typically defines options for the syntax of an encoded video bitstream, detailing parameters in the bitstream when particular features are used in encoding and decoding. In many cases, a video codec standard also provides details about the decoding operations a decoder should perform to achieve conformant results in decoding. Aside from codec standards, various proprietary codec formats (such as VP8, VP9 and other VPx formats) define other options for the syntax of an encoded video bitstream and corresponding decoding operations.

For encoding, a video source such as a camera or screen capture module typically provides video that is converted to a format such as a YUV 4:4:4 chroma sampling format. A YUV format includes a luma (or Y) component with sample values representing approximate brightness values as well as multiple chroma (or U and V) components with sample values representing color difference values. In a YUV 4:4:4 format, chroma information is represented at the same spatial resolution as luma information.

Many commercially available video encoders and decoders support only a YUV 4:2:0 chroma sampling format. A YUV 4:2:0 format is a format that sub-samples chroma information compared to a YUV 4:4:4 format, so that chroma resolution is half that of luma resolution both horizontally and vertically. As a design principle, the decision to use a YUV 4:2:0 format for encoding/decoding is premised on the understanding that, for typical use cases such as encoding/decoding of natural, camera-captured video content, viewers do not ordinarily notice significant visual differences between video encoded/decoded in a YUV 4:2:0 format and video encoded/decoded in a YUV 4:4:4 format. (Human eyes are less sensitive to changes in color (chroma) compared to changes in brightness or intensity (luma).) The compression advantages for the YUV 4:2:0 format, which has fewer samples per picture, are therefore compelling.

There are some use cases, however, for which video has richer color information and higher color fidelity may be justified. In such use cases, the differences between YUV 4:4:4 and YUV 4:2:0 chroma sampling formats are more easily perceived by viewers. For example, for encoding/decoding of computer screen text content, animated video content with artificial hard-edged boundaries, color text, or certain features of video content more generally (such as scrolling titles and hard-edged graphics, or video with information concentrated in chroma channels), a YUV 4:4:4 format may be preferable to a YUV 4:2:0 format. Some codecs support direct encoding and decoding of video pictures in a YUV 4:4:4 format, but the lack of widespread support for codecs using YUV 4:4:4 formats (especially in terms of hardware implementations) is a hindrance. Other prior approaches providing video with YUV 4:4:4 quality are deficient, for many use case scenarios, in terms of rate-distortion efficiency and computational complexity.

SUMMARY

In summary, the detailed description presents innovations in encoding of video pictures in a high-resolution chroma sampling format (such as YUV 4:4:4) using a video encoder operating on coded pictures in a low-resolution chroma sampling format (such as YUV 4:2:0). For example, according to a set of decision rules, high chroma resolution details are selectively encoded on a region-by-region basis such that increases in bit rate (due to encoding of sample values for the high chroma resolution details) happen when and where corresponding increases in chroma resolution are likely to improve quality in noticeable ways. In this way, available encoders operating on coded pictures in the low-resolution chroma sampling format can be effectively used to provide high chroma resolution details.

According to one aspect of the innovations described herein, a video processing tool such as a video encoder system packs sample values of an input picture into first and second coded pictures. The input picture is organized according to an input picture format, e.g., having a chroma sampling rate such as 4:4:4. The first and second coded pictures are organized according to first and second coded picture formats, respectively. The first and second coded picture formats can be the same coded picture format or different coded picture formats (e.g., different chroma sampling rates). Compared to the input picture format, at least one of the first and second coded picture formats may have a lower chroma sampling rate such as 4:2:0. The first coded picture contains sample values for a low chroma resolution version of the input picture. The second coded picture contains sample values for high chroma resolution details of the input picture.

The video processing tool encodes the first and second coded pictures to produce encoded data. For the encoding, for each of one or more regions, the video processing tool evaluates one or more attributes of the region (e.g., extent of change in the region, quality of encoded data for the region, and/or content in the region). Based at least in part on results of the evaluation, the video processing tool determines whether to encode sample values in the region for the high chroma resolution details of the input picture as part of the second coded picture. The video processing tool can also, based at least in part on results of the evaluation, determine whether to encode sample values in the region for the low chroma resolution version of the input picture as part of the first coded picture. The video processing tool outputs the encoded data.

The innovations can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 8a-8e are diagrams illustrating example approaches to frame packing.

FIGS. 10a and 10b are diagrams illustrating temporal dependencies between coded pictures of a sub-sequence of YUV 4:2:0 pictures and temporal dependencies between coded pictures of a sub-sequence of UUV 4:2:0 pictures.

FIGS. 11 and 12 are flowcharts illustrating generalized techniques for encoding and decoding, respectively, of coded pictures in different sub-sequences for low chroma resolution versions and high chroma resolution details of input/output pictures.

FIGS. 15 and 16 are diagrams illustrating examples of region data used when selectively encoding and decoding sample values in regions of a low chroma resolution version and high chroma resolution details of an input/output picture.

FIGS. 17 and 18 are flowcharts illustrating generalized techniques for selectively encoding and decoding, respectively, of sample values in regions for high chroma resolution details.

FIGS. 20a-20e are flowcharts illustrating example decision rules for selective encoding of sample values in regions for low chroma resolution versions of input pictures and high chroma resolution details.

FIGS. 22a-22d are diagrams illustrating aspects of anti-alias filtering and corresponding recovery filtering for chroma sample values.

FIG. 23 is a flowchart illustrating a generalized technique for selectively applying a recovery filter in one or more high chroma resolution regions of an output picture.

FIG. 24 is a diagram illustrating aspects of deblock filtering at boundaries between low and high chroma resolution regions of an output picture.

FIG. 25 is a flowchart illustrating a generalized technique for applying a deblocking filter at one or more boundaries between low and high chroma resolution regions of an output picture.

DETAILED DESCRIPTION

Figure 1:
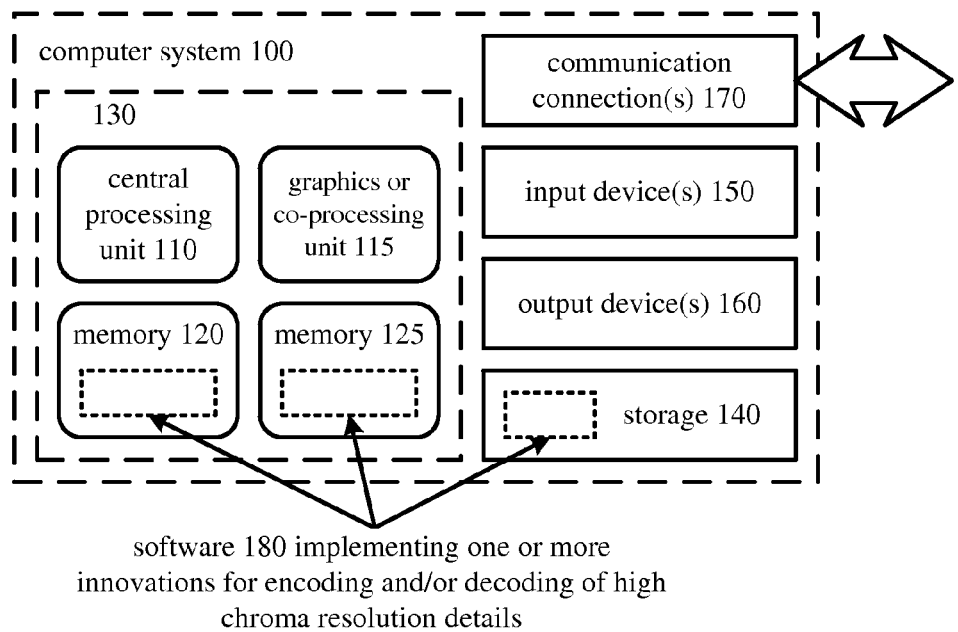
FIG. 1 is a diagram of an example computer system in which some described embodiments can be implemented.

The detailed description presents innovations in encoding of video pictures in a high-resolution chroma sampling format (such as YUV 4:4:4) using a video encoder operating on coded pictures in a low-resolution chroma sampling format (such as YUV 4:2:0). For example, according to a set of decision rules, high chroma resolution details are selectively encoded on a region-by-region basis such that increases in bit rate (due to encoding of sample values for the high chroma resolution details) happen when and where corresponding increases in chroma resolution are likely to improve quality in noticeable ways. In this way, available encoders operating on coded pictures in the low-resolution chroma sampling format can be effectively used to provide high chroma resolution details.

As used herein, the term "coded picture" indicates a picture that is encoded and decoded, which is typically in a coded picture format having a chroma sampling rate such as 4:2:0. The term "input picture" indicates a picture in an input picture format, which typically has a higher chroma sampling rate such as 4:4:4, before rearrangement of sample values into the coded picture format for encoding. Conversely, the term "output picture" indicates a picture in an output picture format, which typically has the same chroma sampling rate as the input picture format, after rearrangement of sample values from the coded picture format following decoding. Some examples described herein involve packing/unpacking for sample values of input/output pictures in a YUV 4:4:4 format for encoding/decoding using a codec adapted for a YUV 4:2:0 format. More generally, the described approaches can be used for other chroma sampling formats. For example, in addition to variations of YUV color spaces such as Y′UV, YIQ, Y′IQ, YdbDr, YCbCr, YCoCg, etc. in sampling ratios such as 4:4:4, 4:2:2, 4:2:0, 4:1:1, 4:0:0, etc., the described approaches can be used for color spaces such as RGB, GBR, etc. in sampling ratios such as 4:4:4, 4:2:2, 4:2:0, 4:1:1, 4:0:0, etc. as the chroma sampling formats. The term "pack" indicates any operations in which some or all sample values for a picture in a first picture format are separated, converted, rearranged, reformatted, filtered, or otherwise changed to one or more pictures in a second picture format. Conversely, the term "unpack" indicates any operations in which some or all sample values for one or more pictures in the second picture format are combined, composed, converted, rearranged, reformatted, filtered, or otherwise changed back to a picture in the first picture format.

In many of the examples described herein, an input picture in a YUV 4:4:4 format is packed into two coded pictures in a YUV 4:2:0 format, which are encoded. The two coded pictures in the YUV 4:2:0 format are decoded and (for at least some sample values) unpacked into an output picture in the YUV 4:4:4 format. More generally, an input picture in an input picture format can be packed into multiple coded pictures in coded picture formats, which can be the same coded picture format or different coded picture formats (e.g., different chroma sampling rates) for the respective coded pictures. For example, for an input picture in a YUV 4:4:4 format, one of the coded pictures is in a YUV 4:2:2 format, and the other coded picture is in a 4:0:0 format. In this configuration, the coded picture in the YUV 4:2:2 format can store a low chroma resolution version of the input picture, and the coded picture in the 4:0:0 can store high chroma resolution details.

Typically, when an input picture in an input picture format is packed into multiple coded pictures in coded picture formats, the coded pictures do not include overlapping data. For example, some sample values of an input picture in a YUV 4:4:4 format are packed into a first coded picture in a YUV 4:2:0 format (possibly after filtering of the sample values), and other sample values of the input picture are packed into a second coded picture in the YUV 4:2:0 format. Alternatively, coded pictures may include overlapping data, which potentially hurts compression efficiency. For example suppose sample values of an input picture in a YUV 4:4:4 format are packed into a first coded picture in a YUV 4:2:2 format or YUV 4:2:0 format. Some of the same sample values, as well as additional sample values, may be packed into a second coded picture in a YUV 4:2:0 format or a YUV 4:2:2 format.

Although operations presented herein are in places described as being performed by a video encoder or video decoder, in many cases the operations can be performed by another type of media encoder or media decoder (e.g., image encoder or image decoder) or other media processing tool. For example, the described techniques may be applied in still-image coding/decoding, medical scan content coding/decoding, multispectral imagery content coding/decoding, etc.

Some of the innovations presented herein are illustrated with reference to syntax elements and operations specific to the H.264/AVC standard or H.265/HEVC standard. The innovations presented herein can also be implemented for other standards or formats.

Many of the innovations presented herein can improve rate-distortion performance when encoding certain "artificially" created video content such as screen-capture content for remote desktop conferencing or another use case scenario. Screen-capture content typically includes repeated structures (e.g., graphics, text characters). Screen capture content is often encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video. Many of the innovations presented herein can also be used for natural video.

More generally, various alternatives to the examples presented herein are possible. For example, some of the methods presented herein can be altered by changing the ordering of the method acts described, by splitting, repeating, or omitting certain method acts, etc. The various aspects of the disclosed technology can be used in combination or separately. Different embodiments use one or more of the described innovations. Some of the innovations presented herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose CPU, processor in an ASIC or any other type of processor. In a multi-processing system, multiple processing units execute computer-executable instructions to increase processing power. For example, FIG. 1 shows a CPU (110) as well as a GPU or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoding and/or decoding of high chroma resolution details, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic disks, magnetic tapes or cassettes, optical storage media such as CD-ROMs or DVDs, or any other medium which can be used to store information and which can be accessed within the computer system (100). The storage (140) stores instructions for the software (180) implementing one or more innovations for encoding and/or decoding of high chroma resolution details.

The input device(s) (150) may be a touch input device such as a keyboard, mouse, pen, or trackball, a voice input device, a scanning device, or another device that provides input to the computer system (100). For video, the input device(s) (150) may be a camera, video card, TV tuner card, screen capture module, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

For the sake of presentation, the detailed description uses terms like "determine," "set," and "use" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
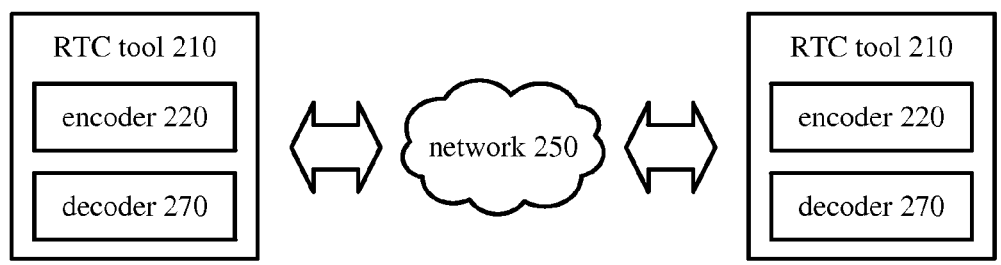
FIGS. 2a and 2b are diagrams of example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265 standard, SMPTE 421M standard, H.264 standard, another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 4:
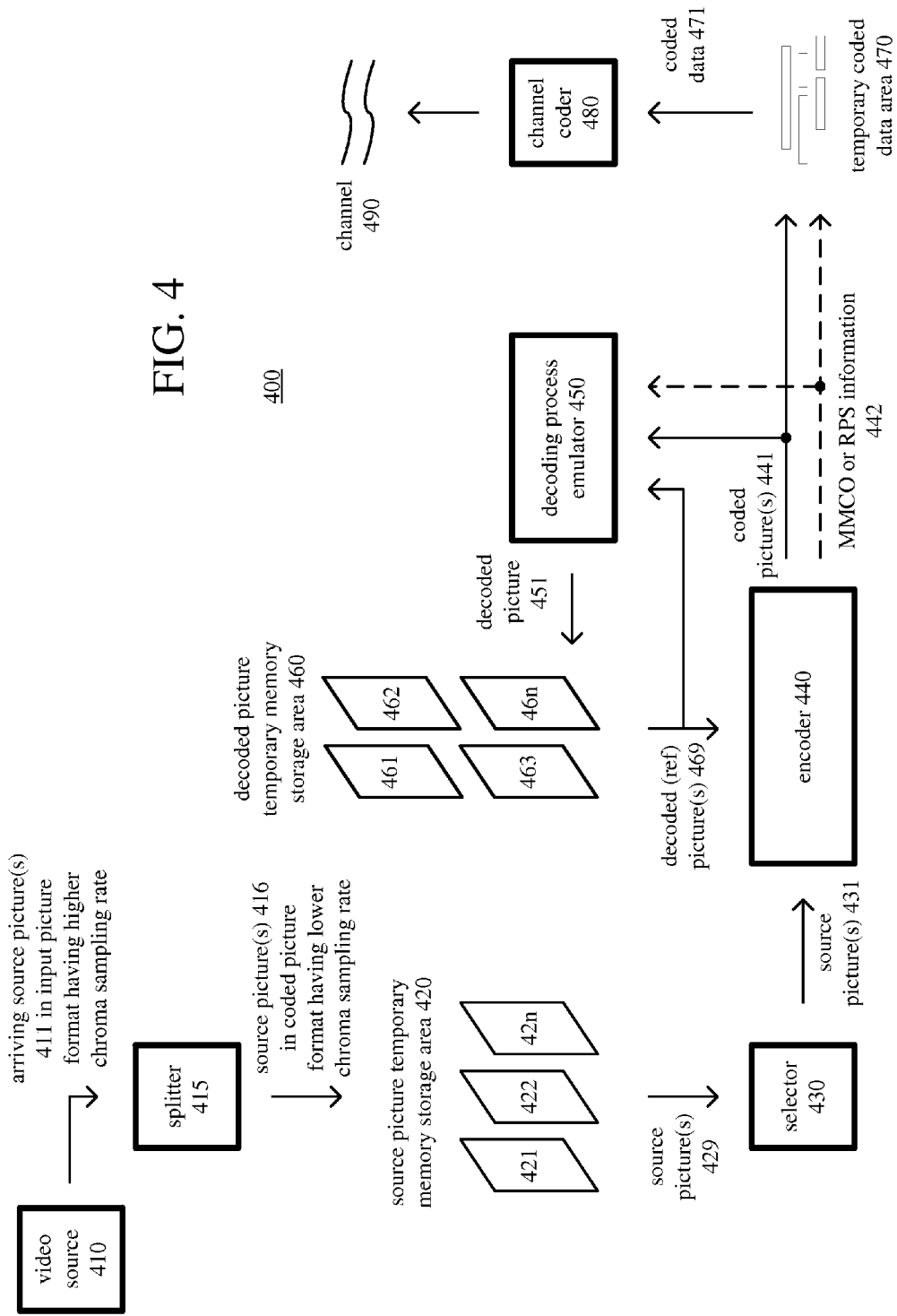
FIG. 4 is a diagram of an example encoder system in conjunction with which some described embodiments can be implemented.
Figure 5:
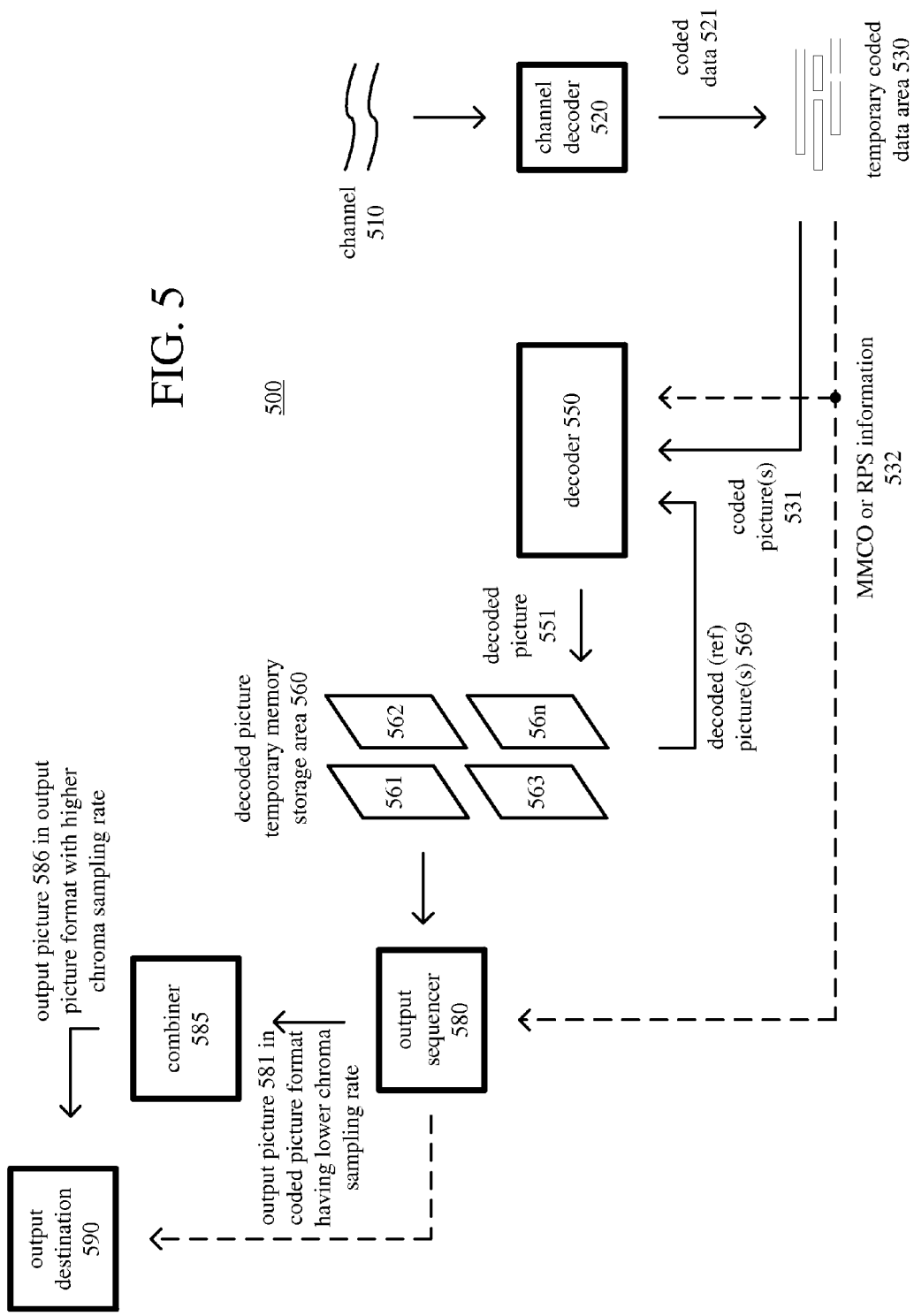
FIG. 5 is a diagram of an example decoder system in conjunction with which some described embodiments can be implemented.

A real-time communication tool (210) manages encoding by an encoder (220). FIG. 4 shows an example encoder system (400) that can be included in the real-time communication tool (210). Alternatively, the real-time communication tool (210) uses another encoder system. A real-time communication tool (210) also manages decoding by a decoder (270). FIG. 5 shows an example decoder system (500) that can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 4 shows an example encoder system (400) that can be included in the encoding tool (212). Alternatively, the encoding tool (212) uses another encoder system. The encoding tool (212) can also include server-side controller logic for managing connections with one or more playback tools (214). FIG. 5 shows an example decoder system (500) that can be included in a playback tool (214). Alternatively, the playback tool (214) uses another decoder system. A playback tool (214) can include client-side controller logic for managing connections with the encoding tool (212).

III. Example Frame Packing/Unpacking Systems.

Figure 3:
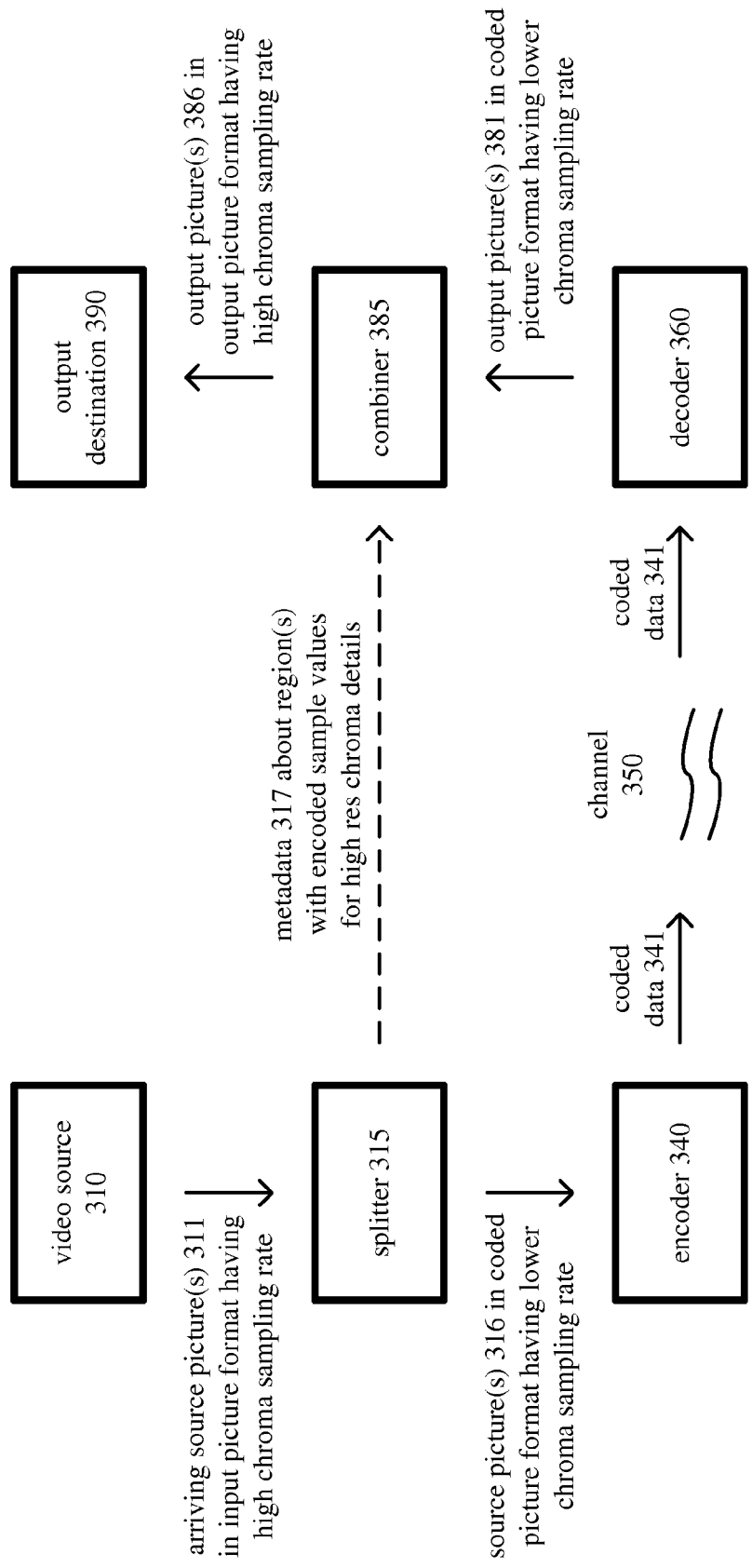
FIG. 3 is a diagram of a generalized frame packing/unpacking system in which some described embodiments can be implemented.

FIG. 3 is a block diagram of a generalized frame packing/unpacking system (300) in conjunction with which some described embodiments may be implemented.

The system (300) includes a video source (310), which produces source pictures (311) in an input picture format having a first, higher chroma sampling rate such as a YUV 4:4:4 format. The video source (310) can be a camera, tuner card, screen capture module, storage media, or other digital video source.

The splitter (315) rearranges the pictures (311) in the input picture format to produce source pictures (316) in a coded picture format having a second, lower chroma sampling rate such as a YUV 4:2:0 format. Example approaches to splitting the pictures (311) using frame packing are described below. Alternatively, the source pictures (316) can have different coded picture formats (e.g., a YUV 4:2:2 format for coded pictures of low chroma resolution versions of the pictures (311), and a YUV 4:0:0 format for coded pictures with high chroma resolution details), with at least one of the coded picture formats having a lower chroma sampling rate than the input picture format. The splitter (315) can signal metadata (317) about one or more regions that indicates whether and how splitting was performed, for use by the combiner (385) after decoding. Example approaches to signaling metadata about region(s) are described below.

The encoder (340) encodes the pictures (316) in the coded picture format having the lower chroma sampling rate. (If the pictures (316) have different coded picture formats, different encoders can be used for the different coded picture formats, or a single encoder supporting both formats can be used.) Example encoders are described below with reference to FIGS. 4, 6a, and 6b. The encoder (340) outputs coded data (341) over a channel (350), which represents storage, a communications connection, or another channel for the output.

In some examples described herein, the pictures (316) in the coded picture format are encoded as two different sub-sequences of pictures. In a first sub-sequence, pictures contain sample values for low chroma resolution versions of the pictures (311). In a second sub-sequence, pictures contain sample values for high chroma resolution details of the pictures (311). The coded data (341) includes encoded data for the first sub-sequence and encoded data for the second sub-sequence. Each sub-sequence is conformant for the format of the encoder (340) and decodable by a decoder (360) for that format. Between the encoder (340) and decoder (360), a bitstream editing tool (not shown) such as a demultiplexer or router can separate the encoded data for the first sub-sequence from the encoded data for the second sub-sequence. This enables the bitstream editing tool to send only the encoded data for the first sub-sequence to some playback devices (e.g., those that lack sufficient display resolution, computational resources, or network connection for playback with high chroma resolution), which reduces overall bit rate by eliminating the high chroma resolution details of the second sub-sequence. The encoded data for the first sub-sequence remains conformant for the format of the encoder (340) and decodable by the decoder (360) for that format. To other playback devices (e.g., those that have sufficient display resolution, computational resources, and network connection for playback with high chroma resolution), the bitstream editing tool can send all of the coded data (341), including encoded data for both sub-sequences.

The decoder (360) receives at least some of the encoded data (341) and decodes at least some of the pictures (316) in the coded picture format having the lower chroma sampling rate. (If the pictures (316) have different coded picture formats, different decoders can be used for the different coded picture formats, or a single decoder supporting both formats can be used.) Example decoders are described below with reference to FIGS. 5 and 7. The decoder (360) outputs reconstructed pictures (381) in the coded picture format having the lower chroma sampling rate. For example, the decoder (360) receives and decodes encoded data for a first sub-sequence of coded pictures which contain sample values for low chroma resolution versions of the pictures (311). Or, in addition to receiving and decoding the encoded data for the first sub-sequence, the decoder (360) receives and decodes encoded data for a second sub-sequence of coded pictures, which contain sample values for high chroma resolution details of the pictures (311).

The combiner (385) optionally rearranges the reconstructed pictures (381) in the coded picture format having the lower chroma sampling rate (or multiple different coded picture formats) to reconstruct the output pictures (386) in an output picture format having the higher chroma sampling rate. Example approaches to combining that use frame unpacking are described below. The combiner (385) can receive the metadata (317) about region(s) that indicates whether and how splitting was performed, and use such metadata (317) to guide combining operations. The combiner (385) outputs the reconstructed pictures in the output picture format to an output destination (390). Color space conversion on output pictures in the output picture format (such as a YUV 4:4:4 format) can convert sample values to another format (such as an RGB 4:4:4 format) for display.

IV. Example Encoder Systems.

FIG. 4 is a block diagram of an example encoder system (400) in conjunction with which some described embodiments may be implemented. The encoder system (400) can be a general-purpose encoding tool capable of operating in any of multiple encoding modes such as a low-latency encoding mode for real-time communication or remote desktop conferencing, a transcoding mode, and a higher-latency encoding mode for producing media for playback from a file or stream, or it can be a special-purpose encoding tool adapted for one such encoding mode. The encoder system (400) can be adapted for encoding of a particular type of content (e.g., screen capture content). The encoder system (400) can be implemented as part of an operating system module, as part of an application library, as part of a standalone application, or using special-purpose hardware. The encoder system (400) can use one or more general-purpose processors (e.g., one or more CPUs) for some or all encoding operations, use graphics hardware (e.g., a GPU) for certain encoding operations, or use special-purpose hardware such as an ASIC for certain encoding operations. Overall, the encoder system (400) receives a sequence of source video pictures (411) in an input picture format having a first, higher chroma sampling rate (such as YUV 4:4:4) from a video source (410), splits the input source pictures (411) into source pictures (416) in a coded picture format having a second, lower chroma sampling rate (such as YUV 4:2:0) or in multiple coded picture formats, and encodes the source pictures (416) in the coded picture format(s) to produce encoded data as output to a channel (490).

The video source (410) can be a camera, tuner card, storage media, screen capture module, or other digital video source. The video source (410) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene. After color space conversion from a capture format (e.g., an RGB format), the source pictures (411) are in the input picture format having the higher chroma sampling format (such as a YUV 4:4:4 format).

The splitter (415) (also called a formatter) rearranges the pictures (411) in the input picture format to produce source pictures (416) in the coded picture format having the lower chroma sampling rate (such as a YUV 4:2:0 format). Example approaches to splitting that use frame packing are described below. Alternatively, the source pictures (416) can have different coded picture formats (e.g., a YUV 4:2:2 format for coded pictures of low chroma resolution versions of the pictures (411), and a YUV 4:0:0 format for coded pictures with high chroma resolution details), with at least one of the coded picture formats having a lower chroma sampling rate than the input picture format. The splitter (415) can signal metadata (not shown) that indicates whether and how splitting was performed, for use by a combiner after decoding. Example approaches to signaling such metadata are described below. The splitter (415) can perform pre-processing operations, for example, as described below.

An arriving source picture (416) is stored in a source picture temporary memory storage area (420) that includes multiple picture buffer storage areas (421, 422, ..., 42n). A picture buffer (421, 422, etc.) holds one source picture in the source picture storage area (420). After one or more of the source pictures (416) have been stored in picture buffers (421, 422, etc.), a picture selector (430) selects an individual source picture from the source picture storage area (420). The order in which pictures are selected by the picture selector (430) for input to the encoder (440) may differ from the order in which the pictures are produced by the video source (410), e.g., the encoding of some pictures may be delayed in order, so as to allow some later pictures to be encoded first and to thus facilitate temporally backward prediction.

The order of the splitter (415) and the frame storage area (420) can be switched. Before the encoder (440), the encoder system (400) can include a pre-processor (not shown) that performs pre-processing (e.g., filtering) of the selected picture (431) before encoding. The pre-processing can include the color space conversion into primary (e.g., luma) and secondary (e.g., chroma differences toward red and toward blue) components and resampling processing (e.g., to reduce the spatial resolution of chroma components) for encoding.

The encoder (440) encodes the selected picture (431) (in a coded picture format) to produce a coded picture (441) and also produces memory management control operation ("MMCO") or reference picture set ("RPS") information (442). The RPS is the set of pictures that may be used for reference in motion compensation for a current picture or any subsequent picture. If the current picture is not the first picture that has been encoded, when performing its encoding process, the encoder (440) may use one or more previously encoded/decoded pictures (469) that have been stored in a decoded picture temporary memory storage area (460). Such stored decoded pictures (469) are used as reference pictures for inter-picture prediction of the content of the current source picture (431). The MMCO/RPS information (442) indicates to a decoder which reconstructed pictures may be used as reference pictures, and hence should be stored in a picture storage area.

Generally, the encoder (440) includes multiple encoding modules that perform encoding tasks such as partitioning into tiles, intra-picture prediction estimation and prediction, motion estimation and compensation, frequency transforms, quantization and entropy coding. The exact operations performed by the encoder (440) can vary depending on compression format. The format of the output encoded data can be a variation or extension of H.26x format (e.g., H.261, H.262, H.263, H.264, H.265), Windows Media Video format, VC-1 format, MPEG-x format (e.g., MPEG-1, MPEG-2, or MPEG-4), VPx format (e.g., VP8, VP9), or another format. In general, the encoder (440) is adapted for encoding coded pictures in the coded picture format having the lower chroma sampling rate. If the pictures (416) have different coded picture formats, different encoders can be used for the different coded picture formats, or a single encoder supporting all of the coded picture formats can be used.

The encoder (440) can partition a picture into multiple tiles of the same size or different sizes. For example, the encoder (440) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks for purposes of encoding and decoding.

For syntax according to the H.264 standard, the encoder (440) can partition a picture into multiple slices of the same size or different sizes. The encoder (440) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265 standard, the encoder (440) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. A CU also has one or more transform units for purposes of residual coding/decoding, where a transform unit ("TU") has a luma transform block ("TB") and two chroma TBs. The encoder decides how to partition video into CTUs, CUs, PUs, TUs, etc.

As used herein, the term "block" can indicate a macroblock, residual data unit, CB, PB or TB, or some other set of sample values, depending on context. The term "unit" can indicate a macroblock, CTU, CU, PU, TU or some other set of blocks, or it can indicate a single block, depending on context, or it can indicate a slice, tile, picture, group of pictures, or other higher-level area.

Returning to FIG. 4, the encoder (440) represents an intra-coded block of a source picture (431) in terms of prediction from other, previously reconstructed sample values in the picture (431). For intra spatial prediction for a block, the intra-picture estimator estimates extrapolation of the neighboring reconstructed sample values into the block. The intra-picture estimator can output prediction information (such as prediction mode/direction for intra spatial prediction), which is entropy coded. An intra-picture prediction predictor applies the prediction information to determine intra prediction values.

The encoder (440) represents an inter-picture coded, predicted block of a source picture (431) in terms of prediction from one or more reference pictures. A motion estimator estimates the motion of the block with respect to one or more reference pictures (469). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. According to some innovations described herein, coded pictures including sample values for low chroma resolution versions of input pictures and coded pictures including sample values for high chroma resolution details for the input pictures are organized in different sub-sequences. Motion estimation and compensation for the coded pictures including the sample values for low chroma resolution versions are performed within a first sub-sequence of coded pictures. Motion estimation and compensation for the coded pictures including the sample values for high chroma resolution details are performed within a second, different sub-sequence of coded pictures. The motion estimator outputs motion information such as MV information and reference picture indices, which is entropy coded. A motion compensator applies MVs to reference pictures (469) to determine motion-compensated prediction values for inter-picture prediction.

The encoder (440) can determine the differences (if any) between a block's prediction values (intra or inter) and corresponding original values. These prediction residual values are further encoded using a frequency transform (if the frequency transform is not skipped) and quantization. For example, the encoder (440) sets values for quantization parameter ("QP") for a picture, tile, slice, macroblock, CU and/or other portion of video, and quantizes transform coefficients accordingly. An entropy coder of the encoder (440) compresses quantized transform coefficient values as well as certain side information (e.g., MV information, reference picture indices, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. If the frequency transform is skipped, prediction residual values or input sample values can be quantized and entropy coded. If prediction is skipped for intra-picture coded content, transform coefficients computed from input sample values can be quantized and entropy coded.

An adaptive deblocking filter is included within the motion compensation loop (that is, "in-loop" filtering) in the encoder (440) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoder (440) produces encoded data in an elementary bitstream. The syntax of the elementary bitstream is typically defined in a codec standard or format, or extension or variation thereof. As the output of the encoder (440), the elementary bitstream is typically packetized or organized in a container format, as explained below. The encoded data in the elementary bitstream includes syntax elements organized as syntax structures. In general, a syntax element can be any element of data, and a syntax structure is zero or more syntax elements in the elementary bitstream in a specified order.

For syntax according to the H.264 standard or H.265 standard, a picture parameter set ("PPS") is a syntax structure that contains syntax elements that may be associated with a picture. A PPS can be used for a single picture, or a PPS can be reused for multiple pictures in a sequence. A PPS typically includes a default or initial value of QP for the picture(s) associated with the PPS. A PPS is typically signaled separate from encoded data for a picture. Within the encoded data for a picture, a syntax element indicates which PPS to use for the picture. Similarly, for syntax according to the H.264 standard or H.265 standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

With reference to FIG. 4, the coded pictures (441) and MMCO/RPS information (442) (or information equivalent to the MMCO/RPS information (442), since the dependencies and ordering structures for pictures are already known at the encoder (440)) are processed by a decoding process emulator (450). The decoding process emulator (450) implements some of the functionality of a decoder, for example, decoding tasks to reconstruct reference pictures. In a manner consistent with the MMCO/RPS information (442), the decoding processes emulator (450) determines whether a given coded picture (441) needs to be reconstructed and stored for use as a reference picture in inter-picture prediction of subsequent pictures to be encoded. If a coded picture (441) needs to be stored, the decoding process emulator (450) models the decoding process that would be conducted by a decoder that receives the coded picture (441) and produces a corresponding decoded picture (451). In doing so, when the encoder (440) has used decoded picture(s) (469) that have been stored in the decoded picture storage area (460), the decoding process emulator (450) also uses the decoded picture(s) (469) from the storage area (460) as part of the decoding process.

The decoded picture temporary memory storage area (460) includes multiple picture buffer storage areas (461, 462, ..., 46n). In a manner consistent with the MMCO/RPS information (442), the decoding process emulator (450) manages the contents of the storage area (460) in order to identify any picture buffers (461, 462, etc.) with pictures that are no longer needed by the encoder (440) for use as reference pictures. After modeling the decoding process, the decoding process emulator (450) stores a newly decoded picture (451) in a picture buffer (461, 462, etc.) that has been identified in this manner.

The coded pictures (441) and MMCO/RPS information (442) are buffered in a temporary coded data area (470) or other coded data buffer. The coded data that is aggregated in the coded data area (470) contains, as part of the syntax of the elementary bitstream, encoded data for one or more pictures. The coded data that is aggregated in the coded data area (470) can also include media metadata relating to the coded video data (e.g., as one or more parameters in one or more supplemental enhancement information ("SEI") messages or video usability information ("VUI") messages).

The aggregated data (471) from the temporary coded data area (470) is processed by a channel encoder (480). The channel encoder (480) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (480) can add syntax elements as part of the syntax of the media transmission stream. Or, the channel encoder (480) can organize the aggregated data for storage as a file (e.g., according to a media container format such as ISO/IEC 14496-12), in which case the channel encoder (480) can add syntax elements as part of the syntax of the media storage file. Or, more generally, the channel encoder (480) can implement one or more media system multiplexing protocols or transport protocols, in which case the channel encoder (480) can add syntax elements as part of the syntax of the protocol(s). The channel encoder (480) provides output to a channel (490), which represents storage, a communications connection, or another channel for the output. The channel encoder (480) or channel (490) may also include other elements (not shown), e.g., for forward-error correction ("FEC") encoding and analog signal modulation.

V. Example Decoder Systems.

FIG. 5 is a block diagram of an example decoder system (500) in conjunction with which some described embodiments may be implemented. The decoder system (500) can be a general-purpose decoding tool capable of operating in any of multiple decoding modes such as a low-latency decoding mode for real-time communication or remote desktop conferencing, a transcoding mode, and higher-latency decoding mode for media playback from a file or stream, or it can be a special-purpose decoding tool adapted for one such decoding mode. The decoder system (500) can be adapted for decoding of a particular type of content (e.g., screen capture content). The decoder system (500) can be implemented as an operating system module, as part of an application library, as a standalone application, or using special-purpose hardware. The decoder system (500) can use one or more general-purpose processors (e.g., one or more CPUs) for some or all decoding operations, use graphics hardware (e.g., a GPU) for certain decoding operations, or use special-purpose hardware such as an ASIC for certain decoding operations. Overall, the decoder system (500) receives coded data from a channel (510), decodes pictures in a coded picture format having a first, lower chroma sampling rate (such as a YUV 4:2:0 format) or in multiple coded picture formats, optionally combines sample values from the coded pictures in the coded picture format(s) into coded pictures in a second, output picture format having a higher chroma sampling rate (such as YUV 4:4:4), and produces reconstructed pictures (in the output picture format) as output for an output destination (590).

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (520) can parse syntax elements added as part of the syntax of the media transmission stream. Or, the channel decoder (520) separates coded video data that has been aggregated for storage as a file (e.g., according to a media container format such as ISO/IEC 14496-12), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). Such syntax elements for a media transmission stream, media storage stream, multiplexing protocols or transport protocols can include metadata about regions that include high chroma resolution details. The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) (in the coded picture format having the lower chroma sampling rate, or in multiple different coded picture formats) and MMCO/RPS information (432). The coded data (521) in the coded data area (530) contains, as part of the syntax of an elementary coded video bitstream, coded data for one or more coded pictures. The coded data (521) in the coded data area (530) can also include media metadata relating to the coded pictures (e.g., as one or more parameters in one or more SEI messages or VUI messages).

In general, the coded data area (530) temporarily stores coded data (521) until such coded data (521) is used by the decoder (550). At that point, coded data for a coded picture (531) and MMCO/RPS information (532) are transferred from the coded data area (530) to the decoder (550). As decoding continues, new coded data is added to the coded data area (530) and the oldest coded data remaining in the coded data area (530) is transferred to the decoder (550).

The decoder (550) decodes a coded picture (531) to produce a corresponding decoded picture (551) in the coded picture format having the lower chroma sampling rate (or one of multiple different coded picture formats). A picture can be partitioned into multiple tiles of the same size or different sizes. A picture can also be organized as one or more slices. The content of a slice or tile can be further partitioned into blocks or other sets of sample values.

As appropriate, when performing its decoding process, the decoder (550) may use one or more previously decoded pictures (569) as reference pictures for inter-picture prediction. The decoder (550) reads such previously decoded pictures (569) from a decoded picture temporary memory storage area (560). Generally, the decoder (550) includes multiple decoding modules that perform decoding tasks such as entropy decoding, intra-picture prediction, motion-compensated inter-picture prediction, inverse quantization, inverse frequency transforms (if not skipped), and merging of tiles. The exact operations performed by the decoder (550) can vary depending on compression format. In general, the decoder (550) is adapted for decoding pictures in the coded picture format having the lower chroma sampling rate. If the pictures (569) have different coded picture formats, different decoders can be used for the different coded picture formats, or a single decoder supporting all of the coded picture formats can be used.

For example, the decoder (550) receives encoded data for a coded picture or sequence of coded pictures and produces output including decoded picture (551). In the decoder (550), a buffer receives encoded data for a coded picture and, at an appropriate time, makes the received encoded data available to an entropy decoder. The entropy decoder entropy decodes entropy-coded quantized data as well as entropy-coded side information, typically applying the inverse of entropy encoding performed in the encoder.

A motion compensator applies motion information to one or more reference pictures to form motion-compensated prediction values for any inter-coded blocks of the picture being reconstructed. According to some innovations described herein, coded pictures including sample values for low chroma resolution versions of input pictures and coded pictures including sample values for high chroma resolution details for the input pictures are organized in different sub-sequences. Motion compensation for the coded pictures including the sample values for low chroma resolution versions is performed within a first sub-sequence of coded pictures. Motion compensation for the coded pictures including the sample values for high chroma resolution details is performed within a second, different sub-sequence of coded pictures. An intra-picture prediction module can spatially predict sample values of a current block from neighboring, previously reconstructed sample values.

The decoder (550) also reconstructs prediction residual values. An inverse quantizer inverse quantizes entropy-decoded data. For example, the decoder (550) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-picture predicted block, the decoder (550) combines reconstructed prediction residual values with motion-compensated prediction values. The decoder (550) can similarly combine prediction residual values with prediction values from intra-picture prediction.

An adaptive deblocking filter is included within the motion compensation loop in the video decoder (550) to smooth discontinuities across block boundary rows and/or columns in the decoded picture (551). Other filtering (such as de-ringing filtering, ALF, or SAO filtering; not shown) can alternatively or additionally be applied as in-loop filtering operations.

The decoded picture temporary memory storage area (560) includes multiple picture buffer storage areas (561, 562, . . . , 56n). The decoder (550) uses the MMCO/RPS information (532) to identify a picture buffer (561, 562, etc.) in which it can store a decoded picture (551). The decoder (550) stores the decoded picture (551) in that picture buffer.

An output sequencer (580) identifies when the next picture to be produced in output order is available in the decoded picture storage area (560). When the next picture (581) in a coded picture format to be produced in output order is available in the decoded picture storage area (560), it is read by the output sequencer (580) and output to either (a) the output destination (590) (e.g., display) for display of the picture in the coded picture format, or (b) the combiner (585). In general, the order in which pictures are output from the decoded picture storage area (560) by the output sequencer (580) may differ from the order in which the pictures are decoded by the decoder (550).

The combiner (585) rearranges the pictures (581) in the coded picture format (having the lower chroma sampling rate) or coded picture formats to produce output pictures (586) in the output picture format having the higher chroma sampling rate (such as a YUV 4:4:4 format). Example approaches to combining that use frame unpacking are described below. The combiner (585) can use metadata (not shown) that indicates whether and how splitting was performed, to guide combining operations. The combiner (585) can perform post-processing operations, for example, as described below. The decoder system (500) can also perform color space conversion on output pictures in the output picture format (such as a YUV 4:4:4 format) or coded picture format (such as a YUV 4:2:0 format), converting sample values to another format (such as an RGB 4:4:4 format) for display.

VI. Example Video Encoders.

Figure 6A:
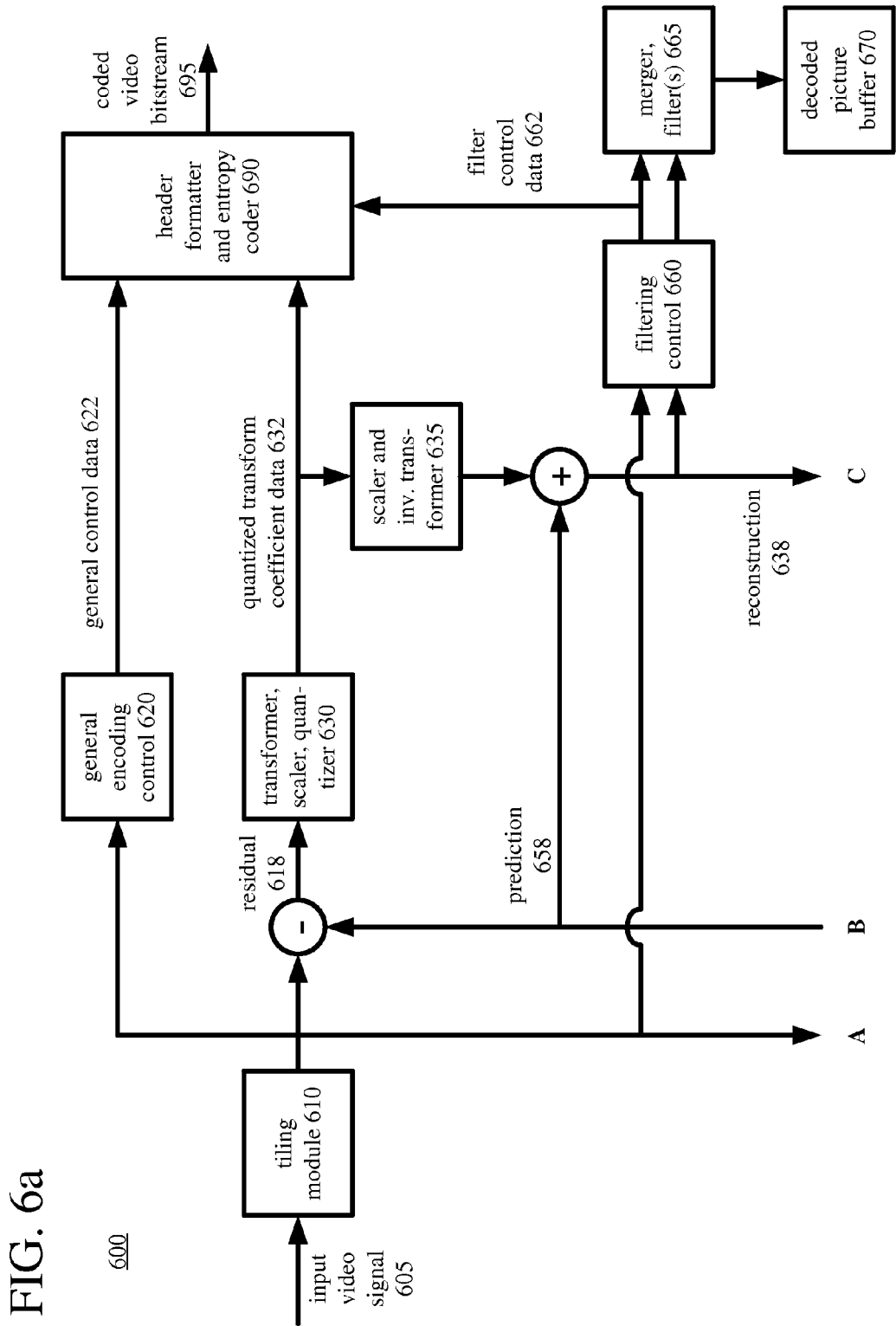
FIGS. 6a and 6b are diagrams illustrating an example video encoder in conjunction with which some described embodiments can be implemented.
Figure 6B:
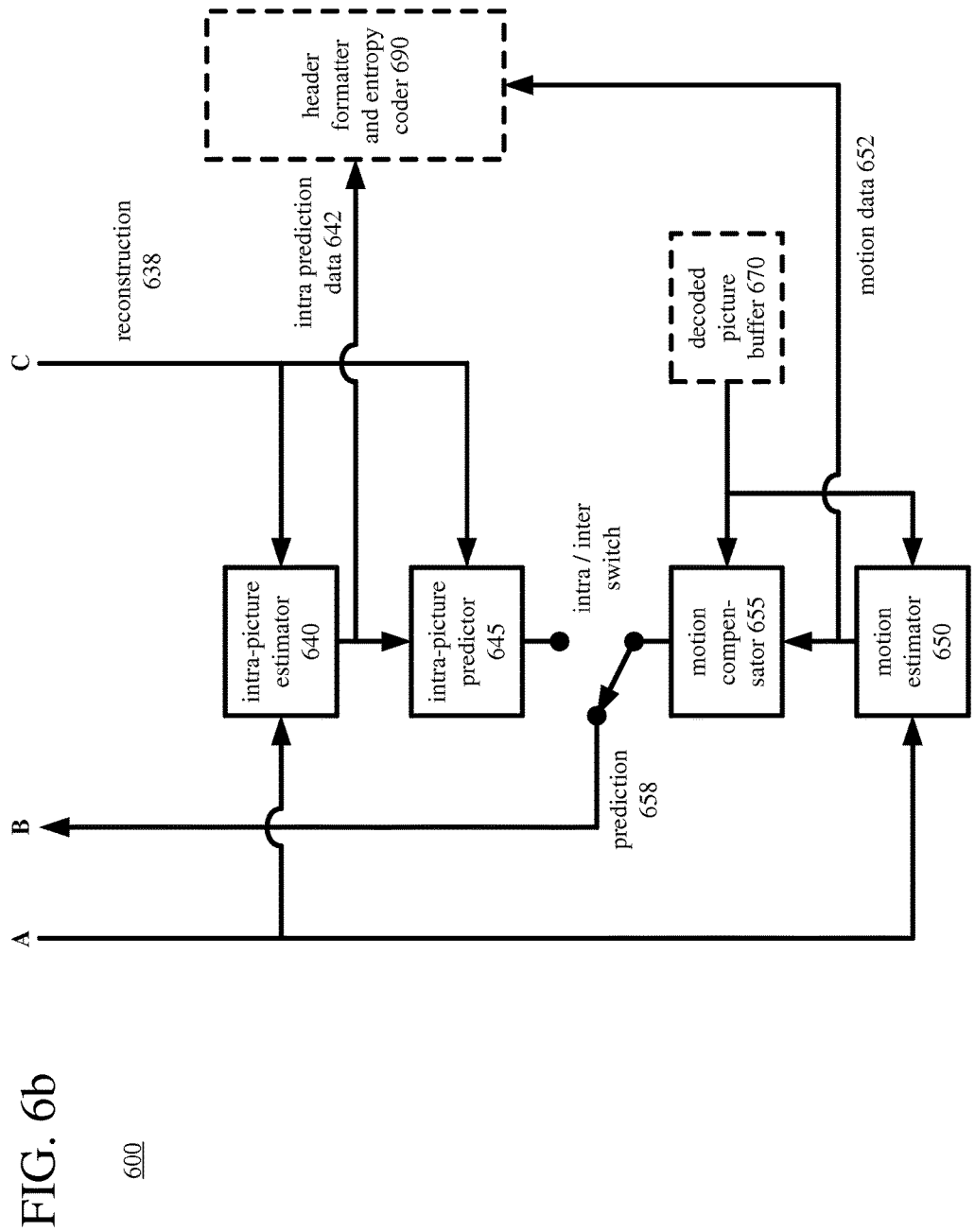

FIGS. 6a and 6b are a block diagram of a generalized video encoder (600) in conjunction with which some described embodiments may be implemented. As an input video signal (605), the encoder (600) receives a sequence of coded pictures in a coded picture format, e.g., having a lower chroma sampling rate (such as YUV 4:2:0), including a current picture. The encoder (600) produces encoded data in a coded video bitstream (695) as output.

The encoder (600) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding. In implementations of encoding for the H.264 standard, for example, the encoder partitions a picture into macroblocks, blocks, partitions (for inter-picture prediction), and residual data units. In implementations of encoding for the H.265 standard, for example, the encoder partitions a picture into CTUs (CTBs), CUs (CBs), PUs (PBs) and TUs (TBs).

The encoder (600) compresses pictures using intra-picture coding and/or inter-picture coding. Many of the components of the encoder (600) are used for both intra-picture coding and inter-picture coding. The exact operations performed by those components can vary depending on the type of information being compressed.

A tiling module (610) optionally partitions a picture into multiple tiles of the same size or different sizes. For example, the tiling module (610) splits the picture along tile rows and tile columns that, with picture boundaries, define horizontal and vertical boundaries of tiles within the picture, where each tile is a rectangular region. The encoder (600) can also partition a picture into one or more slices, where each slice includes one or more slice segments.

The general encoding control (620) receives pictures for the input video signal (605) as well as feedback (not shown) from various modules of the encoder (600). Overall, the general encoding control (620) provides control signals (not shown) to other modules (such as the tiling module (610), transformer/scaler/quantizer (630), scaler/inverse transformer (635), intra-picture estimator (640), motion estimator (650) and intra/inter switch) to set and change coding parameters during encoding. In particular, the general encoding control (620) can control decisions about regions in which sample values for high chroma resolution details for input pictures are encoded, as described below. The general encoding control (620) can also control decisions about regions in which sample values for low chroma resolution versions of the input pictures are encoded, as described below. As another example, the general encoding control (620) can vary QP values to control quantization of regions of coded pictures including sample values of low chroma resolution versions of input pictures and/or control quantization of regions of coded pictures including sample values of high chroma resolution details. More generally, the general encoding control (620) can manage decisions about encoding modes during encoding. The general encoding control (620) produces general control data (622) that indicates decisions made during encoding, so that a corresponding decoder can make consistent decisions. The general control data (622) is provided to the header formatter/entropy coder (690).

If the current picture is predicted using inter-picture prediction, a motion estimator (650) estimates the motion of blocks of sample values of the current picture with respect to one or more reference pictures. The decoded picture buffer (670) buffers one or more reconstructed previously coded pictures for use as reference pictures. When multiple reference pictures are used, the multiple reference pictures can be from different temporal directions or the same temporal direction. The motion estimator (650) produces as side information motion data (652) such as MV data, merge mode index values, and reference picture selection data. The motion data (652) is provided to the header formatter/entropy coder (690) as well as the motion compensator (655). The motion compensator (655) applies MVs to the reconstructed reference picture(s) from the decoded picture buffer (670). The motion compensator (655) produces motion-compensated predictions for the current picture.

Coded pictures including sample values for low chroma resolution versions of input pictures and coded pictures including sample values for high chroma resolution details for the input pictures can be organized in different sub-sequences for purposes of motion estimation and compensation. For example, for the coded pictures including the sample values for low chroma resolution versions of the input pictures, motion estimation and compensation are performed within a first sub-sequence of coded pictures. Similarly, for the coded pictures including the sample values for high chroma resolution details, motion estimation and compensation are performed within a second, different sub-sequence of coded pictures. The encoder (600) can use reference picture reordering and/or different sets of reference picture indices to manage temporal dependencies within each of the different sub-sequences of coded pictures.

In a separate path within the encoder (600), an intra-picture estimator (640) determines how to perform intra-picture prediction for blocks of sample values of a current picture of the input video signal (605). The current picture can be entirely or partially coded using intra-picture coding. Using values of a reconstruction (638) of the current picture, for intra spatial prediction, the intra-picture estimator (640) determines how to spatially predict sample values of a current block of the current picture from neighboring, previously reconstructed sample values of the current picture (e.g., determine the direction of spatial prediction to use for a current block). The intra-picture estimator (640) produces as side information intra prediction data (642), such as information indicating whether intra prediction uses spatial prediction or another type of intra coding, and prediction mode/direction (for intra spatial prediction). The intra prediction data (642) is provided to the header formatter/entropy coder (690) as well as the intra-picture predictor (645). According to the intra prediction data (642), the intra-picture predictor (645) spatially predicts sample values of a current block of the current picture from neighboring, previously reconstructed sample values of the current picture.

The intra/inter switch selects whether the prediction (658) for a given block will be a motion-compensated prediction or intra-picture prediction.

The difference (if any) between a block of the prediction (658) and a corresponding part of the original current picture of the input video signal (605) provides values of the residual (618), for a non-skip-mode block. During reconstruction of the current picture, for a non-skip-mode block, reconstructed residual values are combined with the prediction (658) to produce an approximate or exact reconstruction (638) of the original content from the video signal (605). (In lossy compression, some information is lost from the video signal (605).)

In the transformer/scaler/quantizer (630), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (658) is null), producing blocks of frequency transform coefficients. The transformer/scaler/quantizer (630) can apply a transform with variable block sizes. In this case, the transformer/scaler/quantizer (630) can determine which block sizes of transforms to use for the residual values for a current block. The encoder (600) can also skip the transform step in some cases.

The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, macroblock-by-macroblock basis, CU-by-CU basis, block-by-block basis, or other basis. Transform coefficients can also be scaled or otherwise quantized using other scale factors (e.g., weights in a weight matrix). The quantized transform coefficient data (632) is provided to the header formatter/entropy coder (690).

In the scaler/inverse transformer (635), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. For a non-skip-mode block, the encoder (600) combines reconstructed residual values with values of the prediction (658) (e.g., motion-compensated prediction values, intra-picture prediction values) to form the reconstruction (638). For a skip-mode block, the encoder (600) uses the values of the prediction (658) as the reconstruction (638).

For intra-picture prediction, the values of the reconstruction (638) can be fed back to the intra-picture estimator (640) and intra-picture predictor (645). Also, the values of the reconstruction (638) can be used for motion-compensated prediction of subsequent pictures. The values of the reconstruction (638) can be further filtered. A filtering control (660) determines how to perform deblock filtering and SAO filtering on values of the reconstruction (638), for a given picture of the video signal (605). Filtering can be adaptively disabled for some types of coded pictures (e.g., coded pictures including sample values of high chroma resolution details). The filtering control (660) produces filter control data (662), which is provided to the header formatter/entropy coder (690) and merger/filter(s) (665).

In the merger/filter(s) (665), the encoder (600) merges content from different tiles into a reconstructed version of the picture. The encoder (600) selectively performs deblock filtering and SAO filtering according to the filter control data (662), so as to adaptively smooth discontinuities across boundaries in the pictures. Other filtering (such as deringing filtering or ALF; not shown) can alternatively or additionally be applied. Tile boundaries can be selectively filtered or not filtered at all, depending on settings of the encoder (600), and the encoder (600) may provide syntax within the coded bitstream to indicate whether or not such filtering was applied. The decoded picture buffer (670) buffers the reconstructed current picture for use in subsequent motion-compensated prediction.

The header formatter/entropy coder (690) formats and/or entropy codes the general control data (622), quantized transform coefficient data (632), intra prediction data (642), motion data (652) and filter control data (662). The header formatter/entropy coder (690) provides the encoded data in the coded video bitstream (695). The format of the coded video bitstream (695) can be a variation or extension of H.26x format (e.g., H.261, H.262, H.263, H.264, H.265), Windows Media Video format, VC-1 format, MPEG-x format (e.g., MPEG-1, MPEG-2, or MPEG-4), VPx format (e.g., VP8, VP9), or another format.

Depending on implementation and the type of compression desired, modules of an encoder (600) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (600). The relationships shown between modules within the encoder (600) indicate general flows of information in the encoder; other relationships are not shown for the sake of simplicity.

VII. Example Video Decoders.

Figure 7:
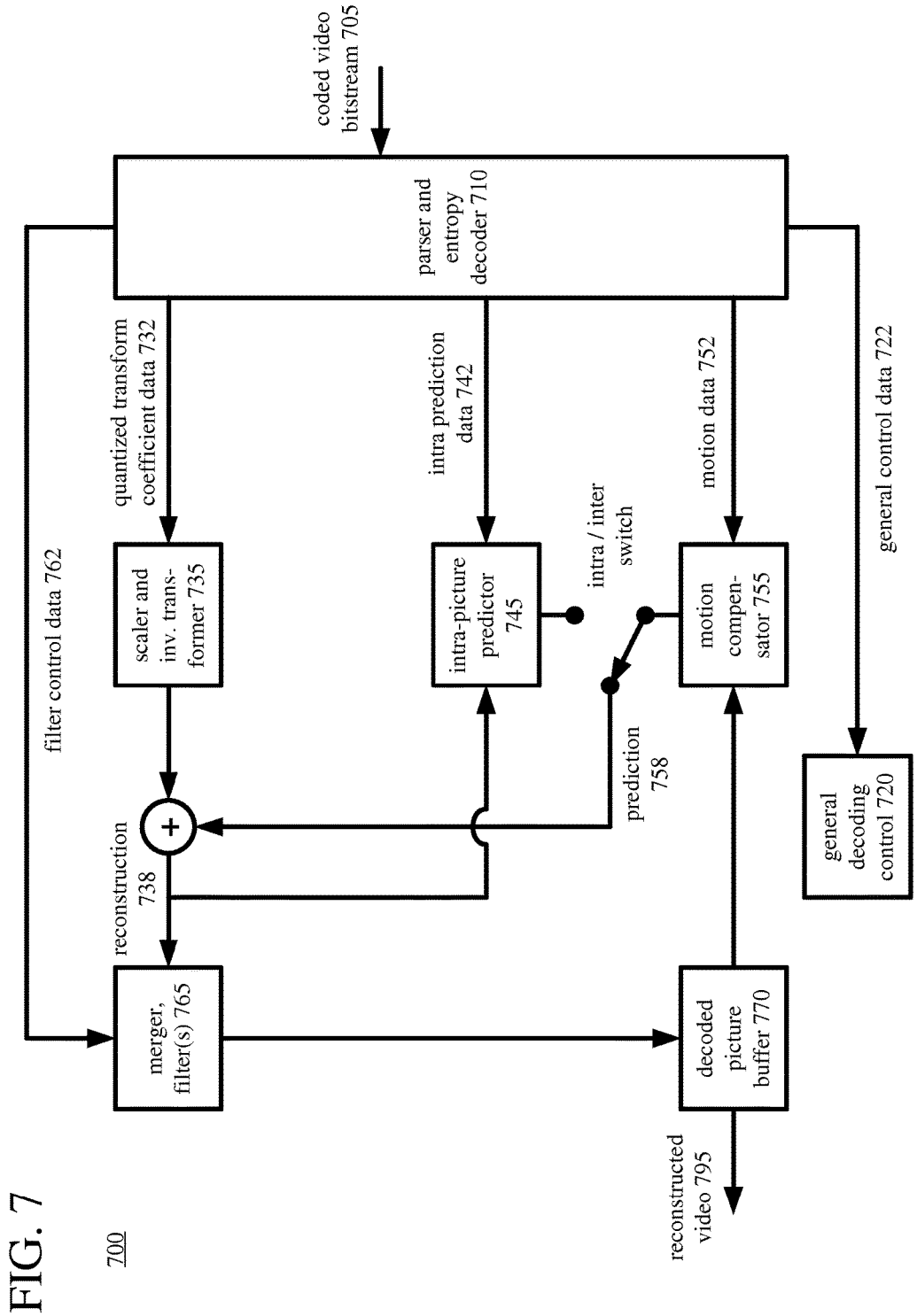
FIG. 7 is a diagram illustrating an example video decoder in conjunction with which some described embodiments can be implemented.

FIG. 7 is a block diagram of a generalized decoder (700) in conjunction with which some described embodiments may be implemented. The decoder (700) receives encoded data in a coded video bitstream (705) and produces output including coded pictures in a coded picture format, e.g., having the lower chroma sampling rate (such as YUV 4:2:0) for reconstructed video (795). The format of the coded video bitstream (705) can be a variation or extension of Windows Media Video format, VPx format (e.g., VP8, VP9), VC-1 format, MPEG-x format (e.g., MPEG-1, MPEG-2, or MPEG-4), H.26x format (e.g., H.261, H.262, H.263, H.264, H.265), or another format.

A picture can be organized as multiple tiles of the same size or different sizes. A picture can also be organized as one or more slices. The content of a slice or tile can be further organized as blocks. The decoder (700) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TUs (TBs).

The decoder (700) decompresses pictures using intra-picture decoding and/or inter-picture decoding. Many of the components of the decoder (700) are used for both intra-picture decoding and inter-picture decoding. The exact operations performed by those components can vary depending on the type of information being decompressed.

A buffer receives encoded data in the coded video bitstream (705) and makes the received encoded data available to the parser/entropy decoder (710). The parser/entropy decoder (710) entropy decodes entropy-coded data, typically applying the inverse of entropy coding performed in the encoder (600) (e.g., context-adaptive binary arithmetic decoding). As a result of parsing and entropy decoding, the parser/entropy decoder (710) produces general control data (722), quantized transform coefficient data (732), intra prediction data (742), motion data (752) and filter control data (762).

The general decoding control (720) receives the general control data (722) and provides control signals (not shown) to other modules (such as the scaler/inverse transformer (735), intra-picture predictor (745), motion compensator (755) and intra/inter switch) to set and change decoding parameters during decoding. In particular, the general decoding control (720) can determine regions in which sample values for high chroma resolution details for output pictures are decoded, as described below. The general decoding control (720) can also determine regions in which sample values for low chroma resolution versions of the output pictures are decoded, as described below. As another example, the general decoding control (720) can vary QP values to control inverse quantization of regions of coded pictures including sample values of low chroma resolution versions of input pictures and/or control inverse quantization of regions of coded pictures including sample values of high chroma resolution details. More generally, the general decoding control (720) can manage decisions about decoding modes during decoding.

If the current picture is predicted using inter-picture prediction, a motion compensator (755) receives the motion data (752), such as MV data, reference picture selection data and merge mode index values. The motion compensator (755) applies MVs to the reconstructed reference picture(s) from the decoded picture buffer (770). The motion compensator (755) produces motion-compensated predictions for inter-coded blocks of the current picture. The decoded picture buffer (770) stores one or more previously reconstructed pictures for use as reference pictures.

Coded pictures including sample values for low chroma resolution versions of input pictures and coded pictures including sample values for high chroma resolution details for the input pictures can be organized in different sub-sequences for purposes of motion compensation. For example, for the coded pictures including the sample values for low chroma resolution versions of the input pictures, motion compensation is performed within a first sub-sequence of coded pictures. Similarly, for the coded pictures including the sample values for high chroma resolution details, motion compensation is performed within a second, different sub-sequence of coded pictures. The decoder (700) can use reference picture reordering and/or different sets of reference picture indices to manage temporal dependencies within each of the different sub-sequences of coded pictures.

In a separate path within the decoder (700), the intra-picture predictor (745) receives the intra prediction data (742), such as information indicating whether intra-picture prediction uses spatial prediction, as well as prediction mode direction (for intra spatial prediction). For intra spatial prediction, using values of a reconstruction (738) of the current picture, according to prediction mode data, the intra-picture predictor (745) spatially predicts sample values of a current block of the current picture from neighboring, previously reconstructed sample values of the current picture.

The intra/inter switch selects values of a motion-compensated prediction or intra-picture prediction for use as the prediction (758) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the decoder (700) combines the prediction (758) with reconstructed residual values to produce the reconstruction (738) of the content from the video signal. When residual values have not been encoded/signaled, the decoder (700) uses the values of the prediction (758) as the reconstruction (738).

To reconstruct the residual when residual values have been encoded/signaled, the scaler/inverse transformer (735) receives and processes the quantized transform coefficient data (732). In the scaler/inverse transformer (735), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (738) can be fed back to the intra-picture predictor (745). For inter-picture prediction, the values of the reconstruction (738) can be further filtered. In the merger/filter(s) (765), the decoder (700) merges content from different tiles into a reconstructed version of the picture. The decoder (700) selectively performs deblock filtering and SAO filtering according to the filter control data (762) and rules for filter adaptation, so as to adaptively smooth discontinuities across boundaries in the pictures. Other filtering (such as de-ringing filtering or ALF; not shown) can alternatively or additionally be applied. Filtering can be adaptively disabled for some types of coded pictures (e.g., coded pictures including sample values of high chroma resolution details). Tile boundaries can be selectively filtered or not filtered at all, depending on settings of the decoder (700) or a syntax element within the encoded bitstream data. The decoded picture buffer (770) buffers the reconstructed current picture for use in subsequent motion-compensated prediction.

The decoder (700) can also include a post-processing filter. The post-processing filter (708) can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter (708) is applied to reconstructed sample values outside of the motion compensation loop, before output for display.

Depending on implementation and the type of decompression desired, modules of the decoder (700) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (700). The relationships shown between modules within the decoder (700) indicate general flows of information in the decoder; other relationships are not shown for the sake of simplicity.

VIII. Rearranging Sample Values Between Input/Output Picture Format and Coded Picture Format.

A video source such as a camera or screen capture module typically provides video that is converted to a format such as a YUV 4:4:4 chroma sampling format. For example, some video sources provide uncompressed video pictures in an RGB format and, before encoding, the pictures are converted to a YUV format expected by a video encoder. A YUV format includes a luma (or Y) component with sample values representing approximate brightness values as well as multiple chroma (or U and V) components with sample values representing color difference values. The precise definitions of the color difference values (and conversion operations to/from a YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The component signal measures that are used may be adjusted through the application of a non-linear transfer characteristics function (generally known as "gamma pre-compensation" and often denoted by the use of a prime symbol, although the prime symbol is often omitted for typographical convenience). Or, the component signal measures may be in a domain that has a linear relationship with light amplitude. The luma and chroma component signals may be well aligned with the perception of brightness and color for the human visual system, or the luma and chroma component signals may somewhat deviate from such measures (e.g., as in the YCoCg variation, in which formulas are applied that simplify the computation of the color component values). Examples of YUV formats as described herein include those described in the international standards known as ITU-R BT.601, ITU-R BT.709, and ITU-R BT.2020. Examples of chroma sample types are shown in Figure E-1 of the H.264/AVC standard. A 4:4:4 format can be a YUV 4:4:4 format or format for another color space, such as RGB or GBR.

Many commercially available video encoders and decoders support only a YUV 4:2:0 chroma sampling format. YUV 4:2:0 is a format that sub-samples chroma information compared to a YUV 4:4:4 format, which preserves full-resolution chroma information (that is, chroma information is represented at the same resolution as luma information). There are some use cases, however, for which visual deficiencies of video in YUV 4:2:0 format are more easily perceived by viewers. For example, for encoding/decoding of computer screen text content (especially text rendered using ClearType technology), animated video content with artificial hard-edged boundaries, color text, or certain features of video content more generally (such as scrolling titles and hard-edged graphics, or video with information concentrated in chroma channels), a 4:4:4 format may be preferable to a 4:2:0 format.

This section describes various approaches to rearranging sample values between an input picture format having a first, higher chroma sampling rate and a coded picture format having a second, lower chroma sampling rate. The pictures in the coded picture format can then be encoded using an encoder adapted for the coded picture format. After decoding (using a decoder adapted for the coded picture format), the pictures in the coded picture format can be output for further processing and display. Or, after such decoding, pictures in an output picture format having the higher chroma sampling rate can be recovered for output and display by rearranging sample values from pictures in the coded picture format into an output picture in the output picture format. Alternatively, instead of using a single coded picture format, different coded pictures can have different coded picture formats, including at least one having a lower chroma sampling rate than the input picture format.

Various approaches described herein can be used to preserve chroma information for frames of a YUV 4:4:4 format when encoding/decoding uses a YUV 4:2:0 format, as one specific example. In these approaches, for example, a YUV 4:4:4 frame is packed into two YUV 4:2:0 frames. A typical 4:4:4 frame contains 12 sample values for every 4 pixel positions, while a 4:2:0 frame contains only 6 sample values for every 4 pixel positions. So, all the sample values contained in a 4:4:4 frame can be packed into two 4:2:0 frames.

Figure 8A:
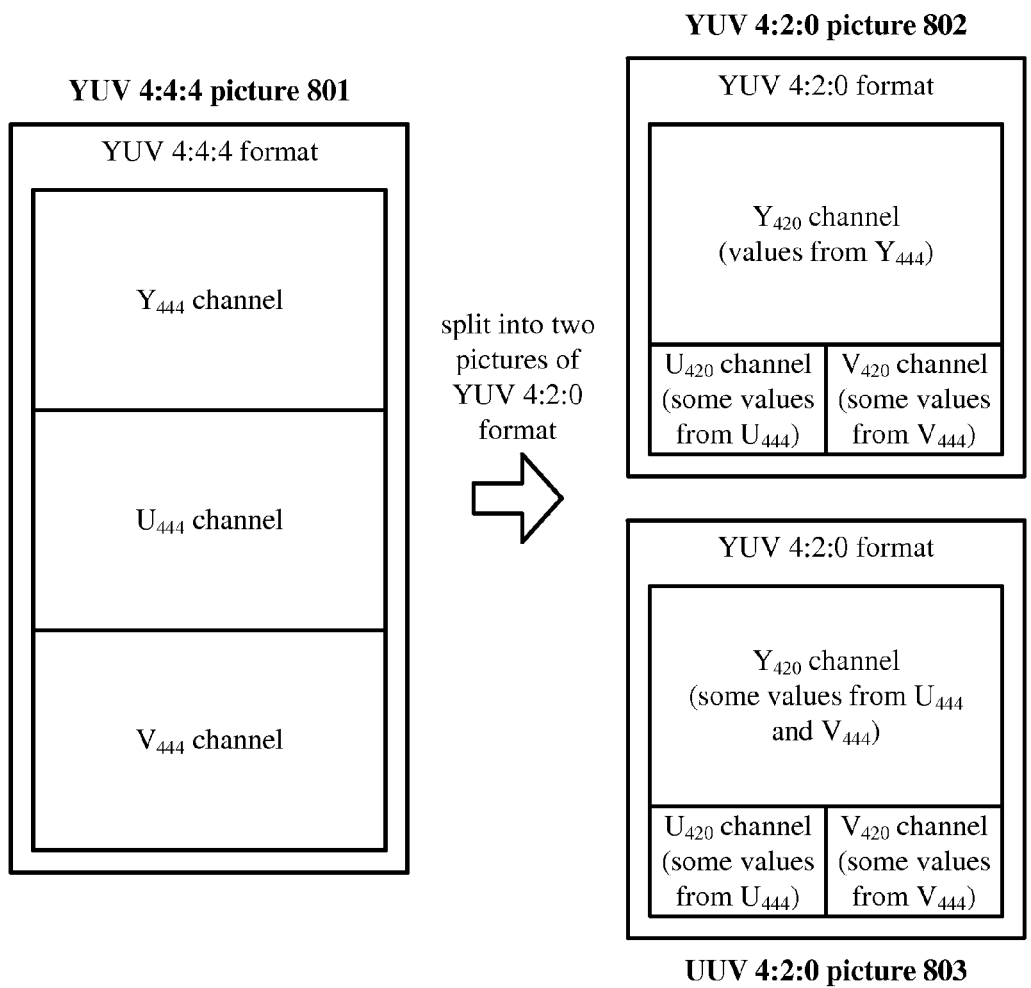

FIG. 8a shows a generalized approach (800) to rearranging the sample values of a single YUV 4:4:4 picture (801). The single YUV 4:4:4 picture (801) includes sample values in a $Y_{444}$ channel, $U_{444}$ channel, and $V_{444}$ channel as the three component planes for the YUV 4:4:4 picture (801). Each component plane has the resolution of width W and height H. For convenience in describing some of the examples used herein, both W and H are divisible by 4, without implying that this is a limitation of the approach.

The sample values of the single YUV 4:4:4 picture (801) are split into two pictures in a YUV 4:2:0 format, which are labeled YUV 4:2:0 picture (802) and the UUV 4:2:0 picture (803). The YUV 4:2:0 picture (802) includes sample values in a $Y_{420}$ channel, $U_{420}$ channel, and $V_{420}$ channel. The $Y_{420}$ channel includes sample values from the $Y_{444}$ channel of the single YUV 4:4:4 picture (801). The $U_{420}$ channel includes some sample values from the $U_{444}$ channel of the single YUV 4:4:4 picture (801), and the $V_{420}$ channel includes some sample values from the $V_{444}$ channel of the single YUV 4:4:4 picture (801). The UUV 4:2:0 picture (803) includes other chroma sample values from the $U_{444}$ channel and the $V_{444}$ channel of the single YUV 4:4:4 picture (801), which are arranged in the $Y_{420}$ channel, $U_{420}$ channel, and $V_{420}$ channel of the UUV 4:2:0 picture (803).

Example approaches to rearranging chroma sample values of the single YUV 4:4:4 picture (801) are described with reference to FIGS. 8b-8e. In the example approaches, sample values of the single YUV 4:4:4 picture (801) are rearranged into the YUV 4:2:0 picture (802) and UUV 4:2:0 picture (803) while maintaining geometric correspondence for chroma information of the YUV 4:4:4 picture (801). Pictures in a YUV 4:2:0 format with good geometric correspondence among their Y, U and V components can be compressed better because they fit the model expected by a typical encoder adapted to encode pictures in the YUV 4:2:0 format. Also, in the example approaches, the YUV 4:2:0 picture (802) represents the complete scene being represented by the YUV 4:4:4 picture (801), albeit with chroma sample values at a lower resolution. This provides options in decoding. A decoder that cannot, or chooses not to, reverse the rearrangement of sample values can finish a reconstructed version of the YUV 4:2:0 picture (802) that represents the scene and directly feed it to the display.

FIG. 8b shows a first example (810) of rearranging the sample values of the single YUV 4:4:4 picture (801). In this approach (810), the sample values of the YUV 4:4:4 picture (801) are packed into two pictures (812, 813) in a YUV 4:2:0 format. The YUV 4:2:0 picture (812) provides a main view in YUV 4:2:0 format—a lower chroma resolution version of the complete scene represented by the YUV 4:4:4 picture (801). The UUV 4:2:0 picture (813) provides higher chroma resolution details in YUV 4:2:0 format.

In FIG. 8b, areas A1 ... A6 are different areas within the respective pictures (812, 813) in the YUV 4:2:0 format. The sample values of the $Y_{444}$ channel of the YUV 4:4:4 picture (801) are assigned to area A1 in the YUV 4:2:0 picture (812). The sample values of the even columns of the even rows of the $U_{444}$ channel of the YUV 4:4:4 picture (801) are assigned to area A2 in the YUV 4:2:0 picture (812), and the sample values of the even columns of the even rows of the $V_{444}$ channel of the YUV 4:4:4 picture (801) are assigned to area A3 in the YUV 4:2:0 picture (812). The sample values assigned to areas A2 and A3 may be filtered to mitigate artifacts such as aliasing artifacts. For additional details about options for filtering, see section XII; see also U.S. Pat. App. Pub. Nos. 2014/0092998 A1 and 2014/0112394 A1.

For the UUV 4:2:0 picture (813), the sample values from the odd columns of the $U_{444}$ channel and $V_{444}$ channel of the YUV 4:4:4 picture (801) are assigned to area A4 in the UUV 4:2:0 picture (813). The columns of U sample values and V sample values can alternate on a column-by-column basis, e.g., $U_{444}$ column 1, $V_{444}$ column 1, $U_{444}$ column 3, $V_{444}$ column 3, and so on. The sample values of the even columns of the odd rows of the $U_{444}$ channel of the YUV 4:4:4 picture (801) are assigned to area A5 in the UUV 4:2:0 picture (813), and the sample values of the even columns of the odd rows of the $V_{444}$ channel of the YUV 4:4:4 picture (801) are assigned to area A6 in the UUV 4:2:0 picture (813). The approach illustrated in FIG. 8b is "hardware-friendly" for implementations such as those using the NV12 format, which pack U and V sample values together.

Thus, for the example approach shown in FIG. 8b:

For area A1, $$Y_{420}^{YUV}(x, y) = Y_{444}(x, y),$$

in the $(x, y)$ range of $[0, W-1] \times [0, H-1]$

For area A2, $$U_{420}^{YUV}(x, y) = U_{444}(2x, 2y),$$

in the $(x, y)$ range of $\left[0, \frac{W}{2}-1\right] \times \left[0, \frac{H}{2}-1\right]$.

For area A3, $$V_{420}^{YUV}(x, y) = V_{444}(2x, 2y),$$

in the $(x, y)$ range of $\left[0, \frac{W}{2}-1\right] \times \left[0, \frac{H}{2}-1\right]$.

For area A4, $$Y_{420}^{UUV}(2x, y) = U_{444}(2x+1, y),$$

in the $(x, y)$ range of $\left[0, \frac{W}{2}-1\right] \times [0, H-1]$, and $Y_{420}^{UUV}(2x+1, y) = V_{444}(2x+1, y)$, in the $(x, y)$ range of $\left[0, \frac{W}{2}-1\right] \times [0, H-1]$.

-continued

For area $A5$, $U_{420}^{UUV}(x, y) = U_{444}(2x, 2y+1)$, in the $(x, y)$ range of $\left[0, \frac{W}{2}-1\right] \times \left[0, \frac{H}{2}-1\right]$.

For area $A6$, $V_{420}^{YUV}(x, y) = V_{444}(2x, 2y+1)$, in the $(x, y)$ range of $\left[0, \frac{W}{2}-1\right] \times \left[0, \frac{H}{2}-1\right]$.

FIG. 8c shows a second example (820) of rearranging the sample values of the single YUV 4:4:4 picture (801) into two pictures in a YUV 4:2:0 format. The YUV 4:2:0 picture (822) provides a main view in YUV 4:2:0 format—a lower chroma resolution version of the complete scene represented by the YUV 4:4:4 picture (801)—and the UUV 4:2:0 picture (823) provides higher chroma resolution details in YUV 4:2:0 format.

In FIG. 8c, areas B1 . . . B6 are different areas within the respective pictures (822, 823) in the YUV 4:2:0 format. For areas B1 . . . B3, sample values are assigned as in the first example approach shown in FIG. 8b. For the UUV 4:2:0 picture (823), the sample values from the odd rows of the $U_{444}$ channel and $V_{444}$ channel of the YUV 4:4:4 picture (801) are assigned to area B4 in the UUV 4:2:0 picture (823). The rows of U sample values and V sample values can alternate on a row-by-row basis, e.g., $U_{444}$ row 1, $V_{444}$ row 1, $U_{444}$ row 3, $V_{444}$ row 3, and so on. The sample values of the odd columns of the even rows of the $U_{444}$ channel of the YUV 4:4:4 picture (801) are assigned to area B5 in the UUV 4:2:0 picture (823), and the sample values of the odd columns of the even rows of the $V_{444}$ channel of the YUV 4:4:4 picture (801) are assigned to area B6 in the UUV 4:2:0 picture (823).

Thus, for the example approach shown in FIG. 8c:

For area $B1$, $Y_{420}^{YUV}(x, y) = Y_{444}(x, y)$, in the $(x, y)$ range of $[0, W-1] \times [0, H-1]$.

For area $B2$, $U_{420}^{YUV}(x, y) = U_{444}(2x, 2y)$, in the $(x, y)$ range of $\left[0, \frac{W}{2}-1\right] \times \left[0, \frac{H}{2}-1\right]$.

For area $B3$, $V_{420}^{YUV}(x, y) = V_{444}(2x, 2y)$, in the $(x, y)$ range of $\left[0, \frac{W}{2}-1\right] \times \left[0, \frac{H}{2}-1\right]$.

For area $B4$, $Y_{420}^{UUV}(x, 2y) = U_{444}(x, 2y+1)$, in the $(x, y)$ range of $[0, W-1] \times \left[0, \frac{H}{2}-1\right]$, and $Y_{420}^{UUV}(x, 2y+1) = V_{444}(x, 2y+1)$, in the $(x, y)$ range of $[0, W-1] \times \left[0, \frac{H}{2}-1\right]$.

For area $B5$, $U_{420}^{UUV}(x, y) = U_{444}(2x+1, 2y)$, in the $(x, y)$ range of $\left[0, \frac{W}{2}-1\right] \times \left[0, \frac{H}{2}-1\right]$.

For area $B6$, $V_{420}^{YUV}(x, y) = V_{444}(2x+1, 2y)$, in the $(x, y)$ range of $\left[0, \frac{W}{2}-1\right] \times \left[0, \frac{H}{2}-1\right]$.

FIG. 8d shows a third example (830) of rearranging the sample values of the single YUV 4:4:4 picture (801) into two pictures in a YUV 4:2:0 format. The YUV 4:2:0 picture (832) provides a main view in YUV 4:2:0 format—a lower chroma resolution version of the complete scene represented by the YUV 4:4:4 picture (801)—and the UUV 4:2:0 picture (833) provides higher chroma resolution details in YUV 4:2:0 format.

In FIG. 8d, areas C1 . . . C9 are different areas within the respective pictures (832, 833) in the YUV 4:2:0 format. For areas C1 . . . C3, sample values are assigned as in the first example approach shown in FIG. 8b. For the UUV 4:2:0 picture (833), sample values from the $U_{444}$ channel and $V_{444}$ channel of the YUV 4:4:4 picture (801) are assigned to areas C4 . . . C9 in the UUV 4:2:0 picture (833) as follows.

For area $C1$, $Y_{420}^{YUV}(x, y) = Y_{444}(x, y)$, in the $(x, y)$ range of $[0, W-1] \times [0, H-1]$.

For area $C2$, $U_{420}^{YUV}(x, y) = U_{444}(2x, 2y)$, in the $(x, y)$ range of $\left[0, \frac{W}{2}-1\right] \times \left[0, \frac{H}{2}-1\right]$.

For area $C3$, $V_{420}^{YUV}(x, y) = V_{444}(2x, 2y)$, in the $(x, y)$ range of $\left[0, \frac{W}{2}-1\right] \times \left[0, \frac{H}{2}-1\right]$.

For area $C4$, $Y_{420}^{UUV}(x, y) = U_{444}(2x+1, y)$, in the $(x, y)$ range of $\left[0, \frac{W}{2}-1\right] \times [0, H-1]$.

For area $C5$, $Y_{420}^{UUV}\left(\frac{W}{2}+x, y\right) = V_{444}(2x+1, y)$, in the $(x, y)$ range of $\left[0, \frac{W}{2}-1\right] \times [0, H-1]$.

For area $C6$, $U_{420}^{UUV}(x, y) = U_{444}(4x, 2y+1)$, in the $(x, y)$ range of $\left[0, \frac{W}{4}-1\right] \times \left[0, \frac{H}{2}-1\right]$.

For area $C7$, $U_{420}^{UUV}\left(\frac{W}{4}+x, y\right) = V_{444}(4x, 2y+1)$, in the $(x, y)$ range of $\left[0, \frac{W}{4}-1\right] \times \left[0, \frac{H}{2}-1\right]$.

For area $C8$, $V_{420}^{UUV}(x, y) = U_{444}(4x+2, 2y+1)$, in the $(x, y)$ range of $\left[0, \frac{W}{4}-1\right] \times \left[0, \frac{H}{2}-1\right]$.

For area $C9$, $V_{420}^{UUV}\left(\frac{W}{4}+x, y\right) = V_{444}(4x+2, 2y+1)$, in the $(x, y)$ range of $\left[0, \frac{W}{4}-1\right] \times \left[0, \frac{H}{2}-1\right]$.

The sample values in the $Y_{444}$ channel, $U_{444}$ channel, and $V_{444}$ channel of the YUV 4:4:4 picture (801) can instead be assigned to areas C1 . . . C9 in a different way. For example, the sample values of even columns of the $U_{444}$ channel and $V_{444}$ channel of the YUV 4:4:4 picture (801) are assigned to areas C4 and C5, and the sample values of odd columns of the $U_{444}$ channel and $V_{444}$ channel of the YUV 4:4:4 picture (801) are distributed between areas C2, C3 and C6 . . . C9.

FIG. 8e shows a fourth example (840) of rearranging the sample values of the single YUV 4:4:4 picture (801) into two pictures in a YUV 4:2:0 format. The YUV 4:2:0 picture (842) provides a main view in YUV 4:2:0 format—a lower chroma resolution version of the complete scene represented by the YUV 4:4:4 picture (801)—and the UUV 4:2:0 picture (843) provides higher chroma resolution details in YUV 4:2:0 format.

In FIG. 8e, areas D1 . . . D9 are different areas within the respective pictures (842, 843) in the YUV 4:2:0 format. For areas D1 . . . D3, sample values are assigned as in the first example approach shown in FIG. 8b. For the UUV 4:2:0 picture (843), sample values from the $U_{444}$ channel and $V_{444}$ channel of the YUV 4:4:4 picture (801) are assigned to areas D4 . . . D9 in the UUV 4:2:0 picture (843) as follows.

For area D1, $$Y_{420}^{YUV}(x, y) = Y_{444}(x, y),$$

in the $(x, y)$ range of $[0, W-1] \times [0, H-1]$.

For area D2, $$U_{420}^{YUV}(x, y) = U_{444}(2x, 2y),$$

in the $(x, y)$ range of $\left[0, \frac{W}{2}-1\right] \times \left[0, \frac{H}{2}-1\right]$.

For area D3, $$V_{420}^{YUV}(x, y) = V_{444}(2x, 2y),$$

in the $(x, y)$ range of $\left[0, \frac{W}{2}-1\right] \times \left[0, \frac{H}{2}-1\right]$.

For area D4, $$Y_{420}^{UUV}(x, y) = U_{444}(x, 2y+1),$$

in the $(x, y)$ range of $[0, W-1] \times \left[0, \frac{H}{2}-1\right]$.

For area D5, $Y_{420}^{UUV}\left(x, \frac{H}{2}+y\right) = V_{444}(x, 2y+1),$ in the $(x, y)$ range of $[0, W-1] \times \left[0, \frac{H}{2}-1\right]$.

For area D6, $U_{420}^{UUV}(x, y) = U_{444}(2x+1, 4y),$ in the $(x, y)$ range of $\left[0, \frac{W}{2}-1\right] \times \left[0, \frac{H}{4}-1\right]$.

For area D7, $U_{420}^{UUV}\left(x, \frac{H}{4}+y\right) = V_{444}(2x+1, 4y),$ in the $(x, y)$ range of $\left[0, \frac{W}{2}-1\right] \times \left[0, \frac{H}{4}-1\right]$.

For area D8, $V_{420}^{UUV}(x, y) = U_{444}(2x+1, 4y+2),$ in the $(x, y)$ range of $\left[0, \frac{W}{2}-1\right] \times \left[0, \frac{H}{4}-1\right]$.

For area D9, $V_{420}^{UUV}\left(x, \frac{H}{4}+y\right) = V_{444}(2x+1, 4y+2),$ in the $(x, y)$ range of $\left[0, \frac{W}{2}-1\right] \times \left[0, \frac{H}{4}-1\right]$.

The sample values in the $Y_{444}$ channel, $U_{444}$ channel, and $V_{444}$ channel of the YUV 4:4:4 picture (801) can instead be assigned to areas D1 . . . D9 in a different way. For example, the sample values of even rows of the $U_{444}$ channel and $V_{444}$ channel of the YUV 4:4:4 picture (801) are assigned to areas D4 and D5, and the sample values of odd rows of the $U_{444}$ channel and $V_{444}$ channel of the YUV 4:4:4 picture (801) are distributed between areas D2, D3 and D6 . . . D9.

Alternatively, the sample values of the single YUV 4:4:4 picture (801) can be rearranged into a YUV 4:2:0 picture and UUV 4:2:0 picture in some other way.

The process of rearranging sample values of coded pictures in a coded picture format (such as a YUV 4:2:0 format) into an output picture in an output picture format (such as a YUV 4:4:4 format) can simply mirror one of the approaches described with reference to FIGS. 8a-8e. Sample values assigned to areas of coded pictures in the YUV 4:2:0 format are assigned back to original locations of those sample values in the output picture in the YUV 4:4:4 format. Filtering performed when rearranging sample values from the input picture format into the coded picture format can be reversed when rearranging sample values back to the output picture format. For additional details, see section XII; see also U.S. Pat. App. Pub. Nos. 2014/0092998 A1 and 2014/0112394 A1.

In previous approaches to rearranging sample values from pictures in a YUV 4:4:4 format to pictures in a YUV 4:2:0 format for encoding and decoding, all sample values of the pictures in the YUV 4:2:0 format are encoded and decoded. Such approaches can increase the bit rate of encoded video significantly when high chroma resolution details are complex or otherwise difficult to compress, even doubling bit rate in some instances, compared to encoding only the low chroma resolution versions of the pictures in the YUV 4:2:0 format. High chroma resolution details may improve quality in ways that a viewer is unlikely to notice, especially in areas in which coding quality is low or motion is significant. In some implementations, however, the prior approaches do not scale gracefully in terms of quality and bit rate, which makes the approaches unsuitable for adaptive streaming, and do not permit simply discarding coded pictures of high chroma resolution details. Prior approaches can also significantly increase the computational complexity of encoding and decoding, compared to encoding only the low chroma resolution versions of the pictures.

IX. Separating Low Chroma Resolution Versions and High Chroma Resolution Details into Different Sub-Sequences of Coded Pictures.

This section presents a first set of innovations in the area of encoding and decoding of high chroma resolution details for pictures. Specifically, this section describes approaches to encoding and decoding of coded pictures with sample values for low chroma resolution versions of input pictures in a separate sub-sequence than coded pictures with sample values for high chroma resolution details of the input pictures. In some example implementations, coded pictures in the different sub-sequences (alternatively called sub-streams) are interleaved in a single sequence of coded pictures (alternatively called a stream of coded pictures), which enables efficient encoding and decoding with conventional codec tools using conformant syntax according to a given standard or format for those codec tools.

A. Examples of Different Sub-Sequences of Coded Pictures for Low Chroma Resolution Versions and High Chroma Resolution Details.

For a given input picture in an input picture format, a video encoding tool splits the input picture into multiple coded pictures in a coded picture format (or coded picture formats). For example, the video encoding tool can rearrange sample value of the input picture into two coded pictures using any of the approaches described with reference to FIGS. 8a-8e, or using another approach. One of the coded pictures includes sample values for a low chroma resolution version of the input picture (e.g., a YUV 4:2:0 picture). The other coded picture includes sample values for high chroma resolution details of the input picture (e.g., a UUV 4:2:0 picture).

The video encoding tool assigns the two coded pictures to two different sub-sequences of coded pictures within a given sequence of coded pictures. One sub-sequence of coded pictures includes coded pictures with sample values for low chroma resolution versions of input pictures. The other sub-sequence includes coded pictures with sample values for high chroma resolution details of the input pictures.

Figure 9:
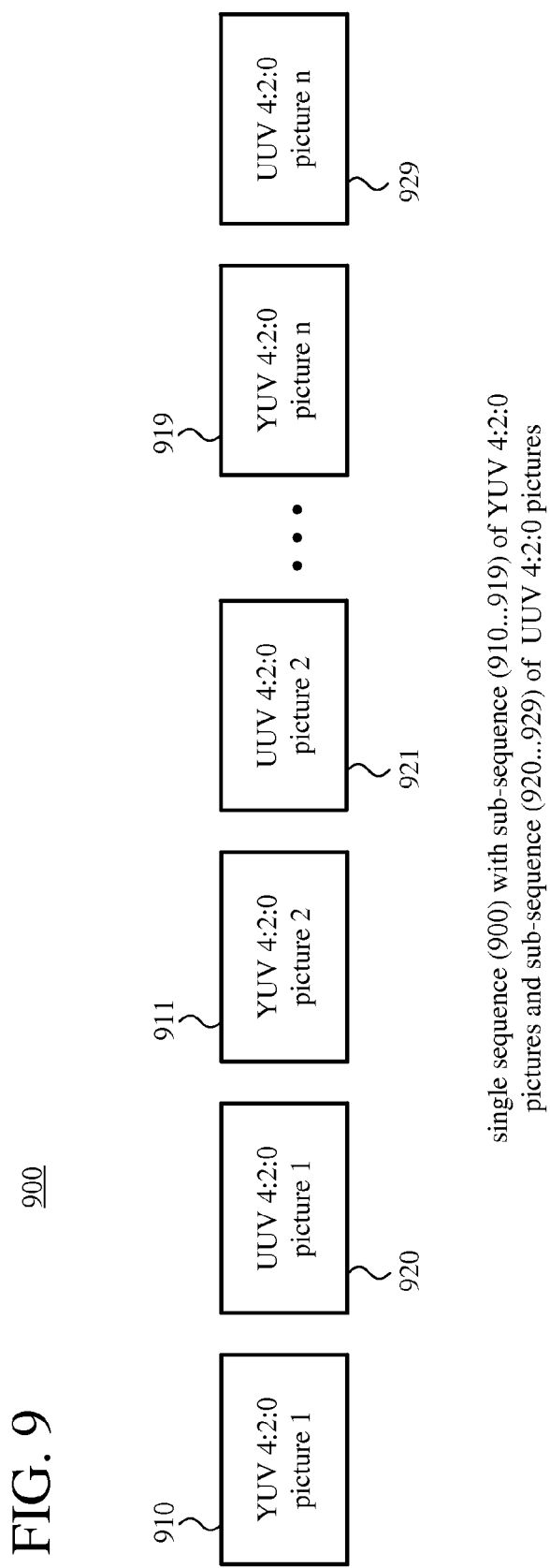
FIG. 9 is a diagram illustrating a sequence of coded pictures that includes a sub-sequence of YUV 4:2:0 pictures and a sub-sequence of UUV 4:2:0 pictures.

FIG. 9 shows a sequence (900) of coded pictures that includes a sub-sequence of YUV 4:2:0 pictures and a sub-sequence of UUV 4:2:0 pictures. The sub-sequence of YUV 4:2:0 pictures includes coded pictures (910, 911, . . . , 919) in YUV 4:2:0 format with sample values for low chroma resolution versions of input pictures. The sub-sequence of UUV 4:2:0 pictures includes coded pictures (920, 921, . . . , 929) in YUV 4:2:0 format with sample values for high chroma resolution details of the input pictures. As shown in FIG. 9, the YUV 4:2:0 pictures and UUV 4:2:0 pictures can be interleaved, alternating between YUV 4:2:0 picture and UUV 4:2:0 picture. Or, the YUV 4:2:0 pictures and UUV 4:2:0 pictures can be organized in a single sequence according to some other pattern.

The video encoding tool encodes the coded pictures in the coded picture format (or coded picture formats). As part of the encoding, the video encoding tool manages motion compensation dependencies. In particular, when performing motion estimation and/or motion compensation for a block of a coded picture with sample values for a low chroma resolution version of an input picture, the video encoding tool limits the set of available reference pictures to coded pictures with sample values for low chroma resolution versions of other input pictures. Similarly, when performing motion estimation and/or motion compensation for a block of a coded picture with sample values for high chroma resolution details of an input picture, the video encoding tool limits the set of available reference pictures to coded pictures with sample values for high chroma resolution details of other input pictures.

The video encoding tool can manage motion compensation dependencies for the different sub-sequences of coded pictures using multiple reference pictures, reference picture reordering, and/or long-term reference pictures. For example, the H.264 standard and H.265 standard include coding tools that support multiple reference pictures, reference picture reordering, and long-term reference pictures. A decoded picture buffer can store multiple reference pictures (e.g., one or more YUV 4:2:0 pictures and one or more UUV 4:2:0 pictures). A long-term reference picture can be buffered for an arbitrary period in the decoded picture buffer, for use as a reference picture. The video encoding tool can reorder reference pictures so that the most commonly referenced pictures have a lower reference picture index, which can make entropy coding of reference picture indices more efficient. Also, the video encoding tool can use one set of reference picture indices for reference pictures in one sub-sequence of coded pictures, and use a different set of reference picture indices for reference pictures in the other sub-sequence of coded pictures.

To illustrate, FIG. 10*a* shows a simple example (1000) of temporal dependencies between coded pictures of a sub-sequence of YUV 4:2:0 pictures and temporal dependencies between coded pictures of a sub-sequence of UUV 4:2:0 pictures. A sequence (1005) of coded pictures includes a sub-sequence of YUV 4:2:0 pictures (1010, 1030) and a sub-sequence of UUV 4:2:0 pictures (1020, 1040). The first YUV 4:2:0 picture (1010) is marked as a long-term reference picture (e.g., indexed by a reference picture index 0). The first UUV 4:2:0 picture (1020) is also marked as a long-term reference picture (e.g., indexed by a reference picture index 1). The second YUV 4:2:0 picture (1030) uses the first YUV 4:2:0 picture (1010) as a reference picture (e.g., constraining motion estimation and compensation to use reference picture index 0), but is not allowed to use the first UUV 4:2:0 picture (1020) as a reference picture even when the first UUV 4:2:0 picture (1020) has already been reconstructed. The second UUV 4:2:0 picture (1040) uses the first UUV 4:2:0 picture (1020) as a reference picture (e.g., constraining motion estimation and compensation to use reference picture index 1), but is not allowed to use the first YUV 4:2:0 picture (1010) as a reference picture even when the first YUV 4:2:0 picture (1010) has already been reconstructed. The use of long-term reference pictures facilitates composition of the two sub-sequences in a single sequence.

FIG. 10*b* shows a more complicated example (1001) of temporal dependencies between coded pictures of a sub-sequence of YUV 4:2:0 pictures and temporal dependencies between coded pictures of a sub-sequence of UUV 4:2:0 pictures. Again, a given YUV 4:2:0 picture can use only another coded picture in the sub-sequence of YUV 4:2:0 pictures as a reference picture, and a given UUV 4:2:0 picture can use only another coded picture in the sub-sequence of UUV 4:2:0 pictures as a reference picture. FIG. 10*b* shows an example of long-term prediction across multiple intervening coded pictures in the sequence (1005). The final UUV 4:2:0 picture (1090) uses the first UUV 4:2:0 picture (1020) as a reference picture, which is separated by an arbitrary number of YUV 4:2:0 pictures. The final UUV 4:2:0 picture (1090) is not allowed to use any of the intervening YUV 4:2:0 pictures as a reference picture.

As explained in the next section, a coded picture can be dropped from a sub-sequence. For example, for a coded picture with sample values for high chroma resolution details, if no region includes sample values that are encoded, the coded picture is dropped from its sub-sequence. Also, a coded picture (or region thereof) in either sub-sequence may be skipped with zero motion, such that no encoded data for the coded picture (or region) is output, and the coded picture (or region) is repeated from the previous coded picture in the sub-sequence.

During corresponding decoding, a video decoding tool decodes the coded pictures in the coded picture format (or coded picture formats). When a coded picture (or region thereof) in either sub-sequence is skipped with zero motion, such that no encoded data for the coded picture (or region) is received, the coded picture (or region) can be decoded by repeating from the previous coded picture in the sub-sequence. As part of the decoding, the video decoding tool performs motion compensation consistent with the motion compensation dependencies enforced by the encoder. In particular, when performing motion compensation for a block of a coded picture with sample values for a low chroma resolution version of an output picture, the set of available reference pictures is limited to coded pictures with sample values for low chroma resolution versions of other output pictures. Similarly, when performing motion compensation for a block of a coded picture with sample values for high chroma resolution details of an output picture, the set of available reference pictures is limited to coded pictures with sample values for high chroma resolution details of other output pictures.

In the video decoding tool, motion compensation dependencies for the different sub-sequences of coded pictures can be managed using multiple reference pictures, reference picture reordering, and/or long-term reference pictures. For example, the H.264 standard and H.265 standard include coding tools that support multiple reference pictures, reference picture reordering, and long-term reference pictures.

For a given output picture in an output picture format, the video decoding tool can combine multiple coded pictures in the coded picture format (or coded picture formats). For example, the video decoding tool can rearrange sample value of two coded pictures into an output picture by reversing any of the approaches described with reference to FIGS. 8a-8e, or using another approach. One of the coded pictures includes sample values for a low chroma resolution version of the output picture (e.g., a YUV 4:2:0 picture). The other coded picture includes sample values for high chroma resolution details of the output picture (e.g., a UUV 4:2:0 picture). If either of the coded pictures (or a region therein) has been skipped with zero motion, a previous coded picture (or co-located region) in the same sub-sequence can provide sample values (for the current coded picture or its region) used when composing the output picture.

B. Techniques for Encoding/Decoding of Different Sub-Sequences for Low Chroma Resolution Versions and High Chroma Resolution Details.

FIG. 11 illustrates a generalized technique (1100) for encoding of coded pictures in different sub-sequences for low chroma resolution versions and high chroma resolution details of input pictures. A video encoding tool such as the encoder system (400) described with reference to FIG. 4 or another encoding tool can perform the technique (1100).

The encoding tool packs (1110) sample values of an input picture organized according to an input picture format into first and second coded pictures organized according to first and second coded picture formats, respectively. The first and second coded picture formats can be the same coded picture format or different coded picture formats (e.g., different chroma sampling rates). In general, the input picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0. The first coded picture contains sample values for a low chroma resolution version of the input picture. The second coded picture contains sample values for high chroma resolution details of the input picture. For example, the encoding tool uses any of the approaches described with reference to FIGS. 8a-8e, or another approach, to pack sample values into the first and second coded pictures.

The encoding tool encodes (1120) the first and second coded pictures as separate coded pictures in a sequence of coded pictures, thereby producing encoded data. As part of the encoding, the first coded picture is encoded as part of a first sub-sequence of the sequence, and the second coded picture is encoded as part of a second sub-sequence of the sequence. The first sub-sequence is different than the second sub-sequence. For purposes of motion compensation (and, by extension, motion estimation), no coded picture in the first sub-sequence is allowed to reference any coded picture in the second sub-sequence, and no coded picture in the second sub-sequence is allowed to reference any coded picture in the first sub-sequence.

For example, the encoding tool manages motion compensation dependencies within the first sub-sequence by using a first set of long-term reference picture indices that identify coded pictures in the first sub-sequence. Similarly, the encoding tool manages motion compensation dependencies within the second sub-sequence by using a second set of long-term reference picture indices that identify coded pictures in the second sub-sequence. The encoding tool can also reorder reference pictures such that no coded picture in the first sub-sequence references any coded picture in the second sub-sequence, and such that no coded picture in the second sub-sequence references any coded picture in the first sub-sequence. Encoded data for the first sub-sequence and encoded data for the second sub-sequence can later be separated by a bitstream editing tool such as a demultiplexer or router, as described in section III. This allows the bitstream editing tool to send only the encoded data for the first sub-sequence to a playback device (for decoding and playback at low chroma resolution) or send encoded data for both sub-sequences to the playback device (for potential decoding and playback at high chroma resolution). For additional details, see section III.

Returning to FIG. 11, the encoding tool outputs (1130) the encoded data, which includes encoded data for one or both of the first and second coded pictures. In some cases, the encoded data, for the first coded picture and/or the second coded picture, includes encoded data for only part of that coded picture (e.g., for one or more regions of the coded picture, as described below, but not all regions of the coded picture). The encoding tool can repeat the technique (1100) for each of one or more other input pictures. In some cases, the second coded picture may be dropped (and hence not encoded), such that no encoded data for the second coded picture is output. Also, the first coded picture or second coded picture (or a region thereof) may be skipped with zero motion, such that no encoded data for the coded picture (or region) is output, and the coded picture (or region) is repeated from the previous coded picture in the sub-sequence. Thus, when first and second coded pictures from an input picture are encoded, the encoding tool may produce encoded data for none of the first coded picture, some regions of the first coded picture, or all of the first coded picture, and the encoding tool may produce encoded data for none of the second coded picture, some regions of the second coded picture, or all of the second coded picture.

FIG. 12 illustrates a generalized technique (1200) for decoding of coded pictures in different sub-sequences for low chroma resolution versions and high chroma resolution details of output pictures. A video decoding tool such as the decoder system (500) described with reference to FIG. 5 or another decoding tool can perform the technique (1200).

The decoding tool receives (1210) encoded data and decodes (1220) first and second coded pictures in first and second coded picture formats (which can be the same coded picture format or different coded picture formats). The first coded picture contains sample values for a low chroma resolution version of an output picture in an output picture format. The second coded picture contains sample values for high chroma resolution details of the output picture. In general, the output picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0.

The decoding tool decodes (1220) the first and second coded pictures as separate coded pictures in a sequence of coded pictures. As part of the decoding (1220), the first coded picture is decoded as part of a first sub-sequence of the sequence, and the second coded picture is decoded as part of a second sub-sequence of the sequence. The first sub-sequence is different than the second sub-sequence. When a coded picture (or region thereof) in either sub-sequence is skipped with zero motion, such that no encoded data for the coded picture (or region) is received, the coded picture (or region) can be decoded by repeating from the previous coded picture in the sub-sequence. For purposes of motion compensation, no coded picture in the first sub-sequence references any coded picture in the second sub-sequence, and no coded picture in the second sub-sequence references any coded picture in the first sub-sequence.

For example, motion compensation dependencies within the first sub-sequence are managed using a first set of long-term reference picture indices that identify coded pictures in the first sub-sequence. Similarly, motion compensation dependencies within the second sub-sequence are managed using a second set of long-term reference picture indices that identify coded pictures in the second sub-sequence. Reference pictures can also be reordered such that no coded picture in the first sub-sequence references any coded picture in the second sub-sequence, and such that no coded picture in the second sub-sequence references any coded picture in the first sub-sequence.

The decoding tool unpacks (1230) sample values for the first and second coded pictures into the output picture. For example, the decoding tool reverses any of the approaches described with reference to FIGS. 8a-8e, or another approach, to unpack sample values from the first and second coded pictures. In some cases, the encoded data, for the first coded picture and/or the second coded picture, includes encoded data for only part of that coded picture (e.g., for one or more regions of the coded picture, as described below, but not all regions of the coded picture), which affects which sample values are rearranged during the unpacking. For example, if either of the coded pictures (or a region therein) has been skipped with zero motion, a previous coded picture (or co-located region) in the same sub-sequence can provide sample values (for the current coded picture or its region) used when composing the output picture.

The decoding tool can repeat the technique (1200) for each of one or more other output pictures. In some cases, the second coded picture may have been dropped (and hence not encoded), such that no encoded data for the second coded picture is received or decoded. Also, the first coded picture or second coded picture (or a region thereof) may have been skipped with zero motion, such that no encoded data for the coded picture (or region) is received, and the coded picture (or region) is instead repeated from the previous coded picture in the sub-sequence. Thus, when first and second coded pictures for an output picture are decoded, the decoding tool may use encoded data for none of the first coded picture, some regions of the first coded picture, or all of the first coded picture, and the decoding tool may use encoded data for none of the second coded picture, some regions of the second coded picture, or all of the second coded picture.

X. Selectively Encoding/Decoding Regions of High Chroma Resolution Details.

This section presents a second set of innovations in the area of encoding and decoding of high chroma resolution details for pictures. Specifically, this section describes approaches to selectively encoding/decoding regions of high chroma resolution details, such that sample values for high chroma resolution details are encoded/decoded for some regions but not for other regions. The regions in which sample values for high chroma resolution details are encoded can change, which facilitates adaptation of bit rate and quality.

A. Examples of Different Regions of Coded Pictures for Low Chroma Resolution Versions and High Chroma Resolution Details.

For a given input picture in an input picture format, a video encoding tool splits the input picture into multiple coded pictures in a coded picture format (or coded picture formats). For example, the video encoding tool can rearrange sample value of the input picture into two coded pictures using any of the approaches described with reference to FIGS. 8a-8e, or using another approach. One of the coded pictures includes sample values for a low chroma resolution version of the input picture (e.g., a YUV 4:2:0 picture). The other coded picture includes sample values for high chroma resolution details of the input picture (e.g., a UUV 4:2:0 picture).

The video encoding tool splits the first and/or second coded pictures into regions (alternatively called sub-areas). The size of regions depends on implementation. For example, the size of a region is a multiple of 16×16 (e.g., 16×16, 32×32, or 64×64) to facilitate implementation with conventional codec tools. Alternatively, the regions have some other size. Regions in a given coded picture can have the same size or different sizes.

For the first coded picture, the video encoding tool decides the regions, if any, in which sample values for the low chroma resolution version of the input picture are to be encoded. For the second coded picture, the video encoding tool decides the regions, if any, in which sample values for the high chroma resolution details of the input picture are to be encoded. Section XI presents example approaches to deciding the regions in which sample values are to be encoded. For a given coded picture, the video encoding tool may encode no regions, some regions, or all regions of the coded picture. When sample values are not coded in a region, the region may be skipped or dropped, depending on context, as explained below.

For a coded picture, the video encoding tool generates and outputs data that identifies the regions in which sample values of the coded picture are encoded. Examples of such region data are presented below. The region data can be entropy coded by a video encoding tool and entropy decoded by a video decoding tool. The region data can be signaled as metadata, as described with reference to FIGS. 3-5.

During corresponding decoding, a video decoding tool receives and processes the region data that identifies the regions in which sample values of the coded pictures have been encoded. The video decoding tool decodes the coded pictures, including decoding of encoded data at least for regions in which sample values have been encoded. When a coded picture (or region thereof) is skipped with zero motion, such that no encoded data for the coded picture (or region) is received, the coded picture (or region) can be decoded by repeating from the previous coded picture. For a given output picture in an output picture format, the video decoding tool can combine multiple coded pictures in the coded picture format (or coded picture formats). For example, the video decoding tool can rearrange sample value of two coded pictures (for a low chroma resolution version and high chroma resolution details, respectively) into an output picture by reversing any of the approaches described with reference to FIGS. 8a-8e, or using another approach. If either of the coded pictures (or a region therein) has been skipped with zero motion, a previous coded picture (or co-located region) in the same sub-sequence can provide sample values (for the current coded picture or its region) used when composing the output picture.

Figure 13:
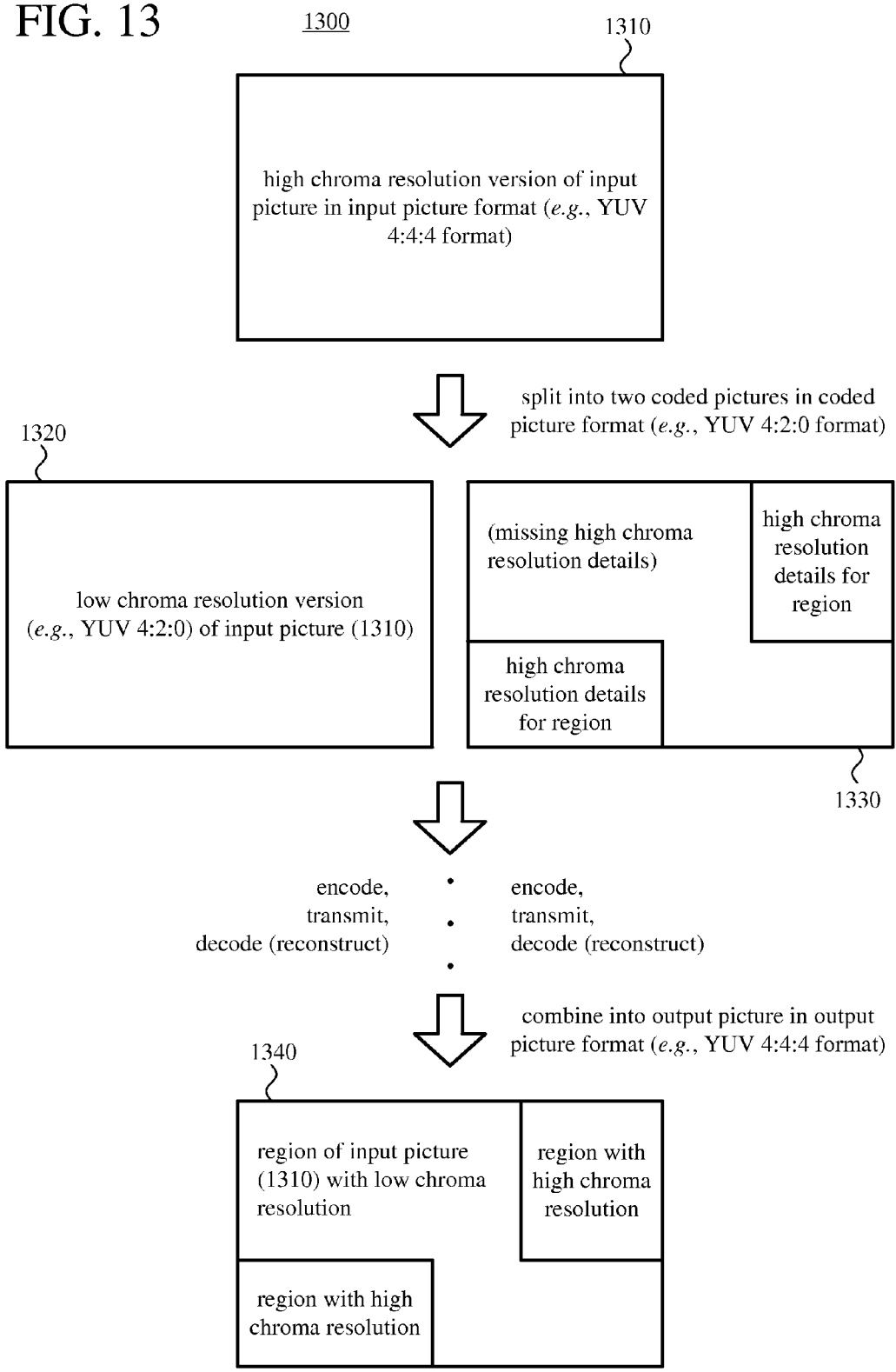
FIG. 13 is a diagram illustrating selective encoding and decoding of sample values in regions for high chroma resolution details of input/output pictures.

To illustrate, FIG. 13 shows a simple example (1300) of selective encoding and decoding of sample values in regions for high chroma resolution details. A video encoding tool receives a high chroma resolution version of an input picture (1310) in an input picture format (e.g., a YUV 4:4:4 format). The video encoding tool rearranges sample values of the input picture (1310) into two coded pictures (1320, 1330) in a coded picture format (e.g., a YUV 4:2:0 format) or coded picture formats. The first coded picture (1320) includes sample values for a low chroma resolution version of the input picture (1310). The second coded picture (1330) includes sample values in two regions for high chroma resolution details of the input picture (1310). For the rest of the second coded picture (1330), high chroma resolution details are missing.

The coded pictures (1320, 1330) are encoded by the video encoding tool, transmitted over a network, and decoded by a video decoding tool. The video decoding tool also combines sample values from the reconstructed coded pictures (1320, 1330) into an output picture (1340) in an output picture format (e.g., a YUV 4:4:4 format). The output picture (1340) includes a region with low chroma resolution, which incorporates sample values from the first coded picture (1320). For that region, high chroma resolution details were missing from the second coded picture (1330). The output picture (1340) also includes regions with high chroma resolution, which incorporate sample values from the first coded picture (1320) and sample values from the second coded picture (1330).

Although FIG. 13 shows two regions having high chroma resolution details, in other examples, the second coded picture (1330) has more or fewer regions with high chroma resolution details. At different extremes, the second coded picture (1330) has no regions with high chroma resolution details (and hence can be dropped) or has all regions with high chroma resolution details.

Figure 14:
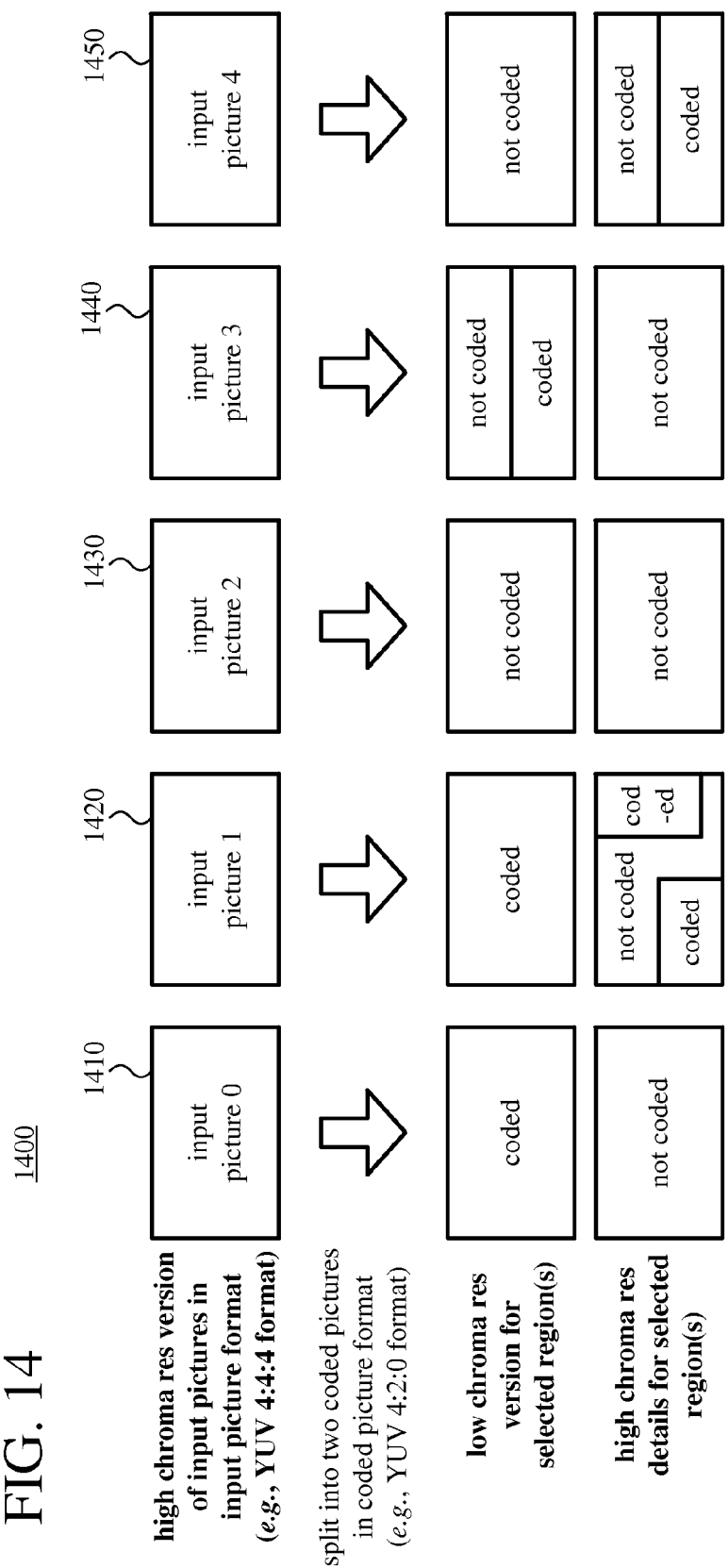
FIG. 14 is a diagram illustrating selective encoding of sample values in regions for low chroma resolution versions and high chroma resolution details of input pictures.

FIG. 14 shows an example (1400) of selective encoding of sample values in regions for low chroma resolution versions of input pictures and in regions for high chroma resolution details of the input pictures. A sequence of input pictures (1410, 1420, 1430, 1440, 1450) in an input picture format (e.g., a YUV 4:4:4 format) includes sample values for high chroma resolution versions of the input pictures, respectively. A video encoding tool splits each of the input pictures (1410, 1420, 1430, 1440, 1450) into two coded pictures in an coded picture format (e.g., a YUV 4:2:0 format) or coded picture formats. For each input picture, one of the two coded pictures represents a low chroma resolution version of the input picture, or at least selected regions thereof, and the other coded picture represents high chroma resolution details for the input picture, or at least selected regions thereof.

For the various coded pictures, the video encoding tool selects regions in which sample values are encoded. Regions can be selected independently for the low chroma resolution version of an input picture and high chroma resolution details. For example, for the first input picture (1410), all regions of the low chroma resolution version of the input picture are coded, but no regions of the high chroma resolution details are coded. For the second input picture (1420), all regions of the low chroma resolution version of the input picture are coded, and two different regions of the high chroma resolution details are coded. For the third input picture (1430), no regions of the low chroma resolution version of the input picture or high chroma resolution details are coded. For the fourth input picture (1440), one region of the low chroma resolution version of the input picture is coded (and one is not coded), but no regions of the high chroma resolution details are coded. Finally, for the fifth input picture (1450), no regions of the low chroma resolution version of the input picture are coded, but one region of the high chroma resolution details is coded (and one is not coded). Thus, for the low chroma resolution version of an input picture, sample values can be encoded for no regions, some regions, or all regions. Separately, for the high chroma resolution details of the input picture, sample values can be encoded for no regions, some regions, or all regions.

Thus, a coded picture can be dropped from a sub-sequence. For example, for the first input picture (1410), the coded picture with sample values for high chroma resolution details, in which no region includes sample values that are encoded, is dropped from its sub-sequence. Also, a coded picture (or region thereof) in either sub-sequence may be skipped with zero motion, such that no encoded data for the coded picture (or region) is output, and the coded picture (or region) is repeated from the previous coded picture in the sub-sequence. For example, for the third input picture (1430), the coded picture with sample values for the low chroma resolution version of the input picture might be skipped with zero motion, such that no encoded data for the coded picture is output, and the coded picture is repeated from the previous coded picture in the sub-sequence. Or, for the third input picture (1430), two regions of the coded picture with sample values for high chroma resolution details might be skipped with zero motion, such that no encoded data for the coded picture is output, and the two regions are repeated from the previous coded picture in the sub-sequence in which the two regions were coded.

B. Examples of Region Data.

Region data for a coded picture indicates regions of the coded picture in which sample values are encoded. Regions can be pre-defined partitions in the coded picture (e.g., having pre-defined sizes and locations, such as MBs in H.264 implementations or CTUs in H.265 implementations). Alternatively, the sizes and/or locations of regions can be specified in the region data. For example, for each of one or more regions, the region data includes (a) one or more parameters that specify a corner of the region as well as parameters that specify width and height of the region, (b) parameters that specify multiple corners of the region, or (c) parameters that specify a list of macroblocks or coding units in the region.

Aside from parameters (if any) of region data that define the sizes and locations of regions, the region data includes a map of index values indicating any regions in which sample values are encoded as part of a coded picture. For example, the map includes an index value per region. A map can indicate any regions for which the encoded data for the second coded picture includes encoded sample values for the high chroma resolution details of the input (or output) picture. When regions are also selected for the first coded picture, another map can indicate any regions for which the encoded data for the first coded picture includes encoded sample values for the low chroma resolution version of the input (or output) picture. When sample values are encoded in a region of a coded picture, the encoded data for the coded picture directly represents the sample values of the region. On the other hand, when sample values are not coded in the region, the region may be skipped or dropped, depending on context.

For a given region of a coded picture, an index value indicates information about the region. FIGS. 15 and 16 show examples of index values. Alternatively, an index value indicates other information. In any case, an encoding tool or decoding tool can use the index values in maps for coded pictures to determine any regions in which sample values are encoded as part of the coded pictures.

FIG. 15 shows example region data (1500) that can be used when selectively encoding and decoding sample values in regions of a low chroma resolution version and high chroma resolution details of an input picture (or output picture). During encoding, a video encoding tool can use the region data (1500) to control which regions have sample values encoded for them. In corresponding decoding, a video decoding tool can use the region data (1500) to determine regions in which sample values have been encoded. In FIG. 15, a first coded picture (1510) (labeled YUV 4:2:0 picture) includes a low chroma resolution version of the input picture x. A second coded picture (1520) (labeled UUV 4:2:0 picture) includes high chroma resolution details of the input picture x.

Each of the coded pictures (1510, 1520) is partitioned into 12 regions. For the first coded picture (1510), a first map (1512) of index values indicates regions in which sample values are changed ("dirty") compared to the co-located region of the most recent preceding YUV 4:2:0 picture for which sample values in the co-located region were encoded. Sample values in regions 0-4 and 8 of the first coded picture (1510) are dirty, but sample values in regions 5-7 and 9-11 are not dirty. For the second coded picture (1520), another map (1522) of index values indicates regions in which sample values are changed ("dirty") compared to the co-located region of the most recent preceding UUV 4:2:0 picture for which sample values in the co-located region were encoded. Sample values in regions 1-8 of the second coded picture (1520) are dirty, but sample values in regions 9-11 are not dirty. In each of the maps (1512, 1522), for a given region, the index value 0x00 (or one-bit value 0) indicates the region is dirty, and the index value 0x01 (or one-bit value 1) indicates the region is not dirty.

From the index values in the maps (1512, 1522), the video encoding tool and video decoding tool infer the regions of coded pictures in which sample values are encoded. For example, according to one approach to interpreting region data defined as shown in FIG. 15, for the first coded picture (1510), sample values of a dirty region are encoded, and sample values of a non-dirty region are not encoded. Instead, the non-dirty region of the first coded picture (1510) is encoded as a skipped region with zero motion, which is copied from the co-located region in the previous YUV 4:2:0 picture. Thus, there is always some representation available for a region of the low chroma resolution version of an input/output picture, either encoded or copied (skipped). For the second coded picture (1520), sample values of a dirty region are encoded, and sample values of a non-dirty region are not encoded. Instead, the non-dirty region of the second coded picture (1520) is encoded as a skipped region with zero motion (copied from the co-located region in the previous UUV 4:2:0 picture, if there have been no changes to the co-located region since it was encoded) or is dropped (otherwise). Thus, a region of high chroma resolution details of an input/output picture may be directly encoded with sample values of the region, copied (skipped), or dropped.

According to another approach to interpreting region data defined as shown in FIG. 15, regions of the second coded picture (1520) are coded or not coded according to slightly different rules. In particular, for the second coded picture (1520), sample values of a dirty region are encoded only if the co-located region of the first coded picture (1510) is not dirty; otherwise the sample values of the dirty region of the second coded picture (1520) are not encoded. As in the first approach, a non-dirty region of the second coded picture (1520) is encoded as a skipped region with zero motion or is dropped. Thus, a dirty region of high chroma resolution details may remain dirty for several coded pictures, until it is finally encoded. This approach is consistent with the decision rules described in section XI.A.1.

FIG. 16 shows other example region data (1600) that can be used when selectively encoding and decoding sample values in regions of a low chroma resolution version and high chroma resolution details of an input picture. A first coded picture (1610) (labeled as a YUV 4:2:0 picture) includes a low chroma resolution version of the input picture x, and a second coded picture (1620) (labeled as a UUV 4:2:0 picture) includes high chroma resolution details of the input picture x.

Each of the coded pictures (1610, 1620) is partitioned into 12 regions and has a corresponding map (1612, 1622) of index values. An index value for a region is a two-bit value in which the first bit indicates whether or not sample values in the region are changed ("dirty") compared to the co-located region in the most recent preceding coded picture for which sample values in the co-located region were encoded, and the second bit indicates (at least for a non-dirty region) whether or not sample values in the region have already been encoded with high quality (that is, in the co-located region in a preceding coded picture). Thus, the value 0x00 (or two-bit value 00) indicates a non-dirty region not previously encoded with high quality, and the value 0x01 (or two-bit value 01) indicates a non-dirty region previously encoded with high quality. The value 0x02 (or two-bit value 10) indicates a dirty region. From such index values, the video encoding tool and video decoding tool can infer whether a given region is coded or not coded using rules as described in section XI.A.3.

Index values in a map can be entropy coded by the video encoding tool (e.g., using run length coding or context-adaptive binary arithmetic coding). In this case, the video decoding tool performs corresponding entropy decoding. The region data can be signaled, for example, as part of a new type of SEI message for the H.264 standard or H.265 standard, as a field of a container structure, as a field of a transport protocol message, or as some other type of metadata.

In FIGS. 15 and 16, each of the regions has the same size. Alternatively, regions can have different sizes within a coded picture or from picture to picture.

C. Techniques for Encoding/Decoding Selected Regions of Coded Pictures for Low Chroma Resolution Versions and High Chroma Resolution Details.

FIG. 17 illustrates a generalized technique (1700) for selectively encoding sample values in regions for high chroma resolution details. A video encoding tool such as the encoder system (400) described with reference to FIG. 4 or another encoding tool can perform the technique (1700).

The encoding tool packs (1710) sample values of an input picture organized according to an input picture format into first and second coded pictures organized according to first and second coded picture formats. The first and second coded picture formats can be the same coded picture format or different coded picture formats (e.g., different chroma sampling rates). In general, the input picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0. The first coded picture contains sample values for a low chroma resolution version of the input picture. The second coded picture contains sample values for high chroma resolution details of the input picture. For example, the encoding tool uses any of the approaches described with reference to FIGS. 8a-8e, or another approach, to pack sample values into the first and second coded pictures.

The encoding tool encodes (1720) the first and second coded pictures, thereby producing encoded data. As part of the encoding, the encoding tool selects one or more regions in which corresponding sample values for high chroma resolution details of the input picture are encoded as part of the second coded picture. As part of the encoding, the encoding tool can also select one or more regions in which corresponding sample values for the low chroma resolution version of the input picture are encoded as part of the first coded picture. The first and second coded pictures can be encoded as part of different sub-sequences of coded pictures, as described in section IX.

The encoding tool outputs (1730) the encoded data, which includes encoded data for one or both of the first and second coded pictures. In some cases, the encoded data, for the first coded picture and/or the second coded picture, includes encoded data for only part of that coded picture (e.g., for one or more regions of the coded picture, but not all regions of the coded picture). The encoded data can be output as part of one bitstream. Syntax for the bitstream permits the first coded picture and/or the second coded picture to lack encoded sample values for at least part of the input picture.

The encoding tool also outputs (1740) region data that identifies the region(s) in which corresponding sample values for high chroma resolution details of the input picture are encoded as part of the second coded picture. When the encoding tool also selects region(s) in which corresponding sample values for the low chroma resolution version of the input picture are encoded as part of the first coded picture, the region data also identifies such region(s). For example, the region data is formatted as described in section X.B. Alternatively, the region data is formatted in some other way.

The encoding tool can repeat the technique (1700) for each of one or more other input pictures. In some cases, the second coded picture may be dropped (and hence not encoded), such that no encoded data for the second coded picture is output. Also, the first coded picture or second coded picture (or a region thereof) may be skipped with zero motion, such that no encoded data for the coded picture (or region) is output, and the coded picture (or region) is repeated from the previous coded picture in the sub-sequence. Thus, when first and second coded pictures from an input picture are encoded, the encoding tool may produce encoded data for none of the first coded picture, some regions of the first coded picture, or all of the first coded picture, and the encoding tool may produce encoded data for none of the second coded picture, some regions of the second coded picture, or all of the second coded picture.

FIG. 18 illustrates a generalized technique (1800) for selectively decoding sample values in regions for high chroma resolution details. A video decoding tool such as the decoder system (500) described with reference to FIG. 5 or another decoding tool can perform the technique (1800).

The decoding tool receives (1810) encoded data and decodes (1820) first and second coded pictures in first and second coded picture formats (which can be the same coded picture format or different coded picture formats). The first coded picture contains sample values for a low chroma resolution version of an output picture in an output picture format. The second coded picture contains sample values for high chroma resolution details of the output picture. In general, the output picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0. The encoded data can be received as part of one bitstream. Syntax for the bitstream permits the first coded picture and/or the second coded picture to lack encoded sample values for at least part of the output picture. The first and second coded pictures can be decoded as part of different sub-sequences of coded pictures, as described in section IX. When a coded picture (or region thereof) is skipped with zero motion, such that no encoded data for the coded picture (or region) is received, the coded picture (or region) can be decoded by repeating from the previous coded picture.

The decoding tool also receives (1830) region data that identifies one or more regions in which corresponding sample values for high chroma resolution details of the output picture have been encoded as part of the second coded picture. In some example implementations, the region data also identifies one or more regions in which corresponding sample values for the low chroma resolution version of the output picture have been encoded as part of the first coded picture. For example, the region data is formatted as described in section X.B. Alternatively, the region data is formatted in some other way.

Based at least in part on the region data, the decoding tool unpacks (1840) sample values for the first and second coded pictures into the output picture. For example, the decoding tool reverses any of the approaches described with reference to FIGS. 8a-8e, or another approach, to unpack sample values from regions of the first and second coded pictures. In some cases, the second coded picture includes sample values for only part of that coded picture (e.g., for one or more regions of the coded picture, but not all regions of the coded picture), which affects which sample values are rearranged during the unpacking. If either of the coded pictures (or a region therein) has been skipped with zero motion, a previous coded picture (or co-located region) in the same sub-sequence can provide sample values (for the current coded picture or its region) used when composing the output picture.

The decoding tool can repeat the technique (1800) for each of one or more other output pictures. In some cases, the second coded picture may have been dropped (and hence not encoded), such that no encoded data for the second coded picture is received or decoded. Also, as explained in this section, the first coded picture or second coded picture (or a region thereof) may have been skipped with zero motion, such that no encoded data for the coded picture (or region) is received, and the coded picture (or region) is instead repeated from the previous coded picture in the sub-sequence. Thus, when first and second coded pictures for an output picture are decoded, the decoding tool may use encoded data for none of the first coded picture, some regions of the first coded picture, or all of the first coded picture, and the decoding tool may use encoded data for none of the second coded picture, some regions of the second coded picture, or all of the second coded picture.

XI. Decision Rules for Selectively Encoding Regions.

This section presents innovations in the area of encoding regions of low chroma resolution versions and high chroma resolution details for pictures. Specifically, this section describes decision rules used when selectively encoding regions of high chroma resolution details, such that sample values for high chroma resolution details are encoded for some regions but not for other regions. For example, according to a set of decision rules, high chroma resolution details are selectively encoded on a region-by-region basis. The decision rules can also control selection of regions to encode for low chroma resolution versions of pictures. In this way, available encoders operating on coded pictures in a low-resolution chroma sampling format can be effectively used to provide low chroma resolution versions of pictures as well as high chroma resolution details.

With region-by-region decisions about which regions of high chroma resolution details to encode, increases in bit rate (due to encoding of sample values for the high chroma resolution details) happen when and where corresponding increases in chroma resolution are likely to improve quality in noticeable ways. For example, a region of high chroma resolution details is not encoded when motion is heavy or coding quality is low, since the added chroma resolution details are unlikely to be noticed by a viewer. On the other hand, when a region is stationary and coding quality is high, a region of chroma resolution details is encoded since the added chroma resolution details are more likely to improve quality in noticeable ways.

In addition to judiciously allocating bitrate to increase chroma resolution, region-by-region decisions as described herein can save computational resources during encoding and decoding. For regions in which high chroma resolutions details are unlikely to improve quality in noticeable ways, resources are not consumed encoding or decoding the details.

A. Example Decision Rules for Region Selection for Low Chroma Resolution Versions of Input Pictures and High Chroma Resolution Details.

Figure 19:
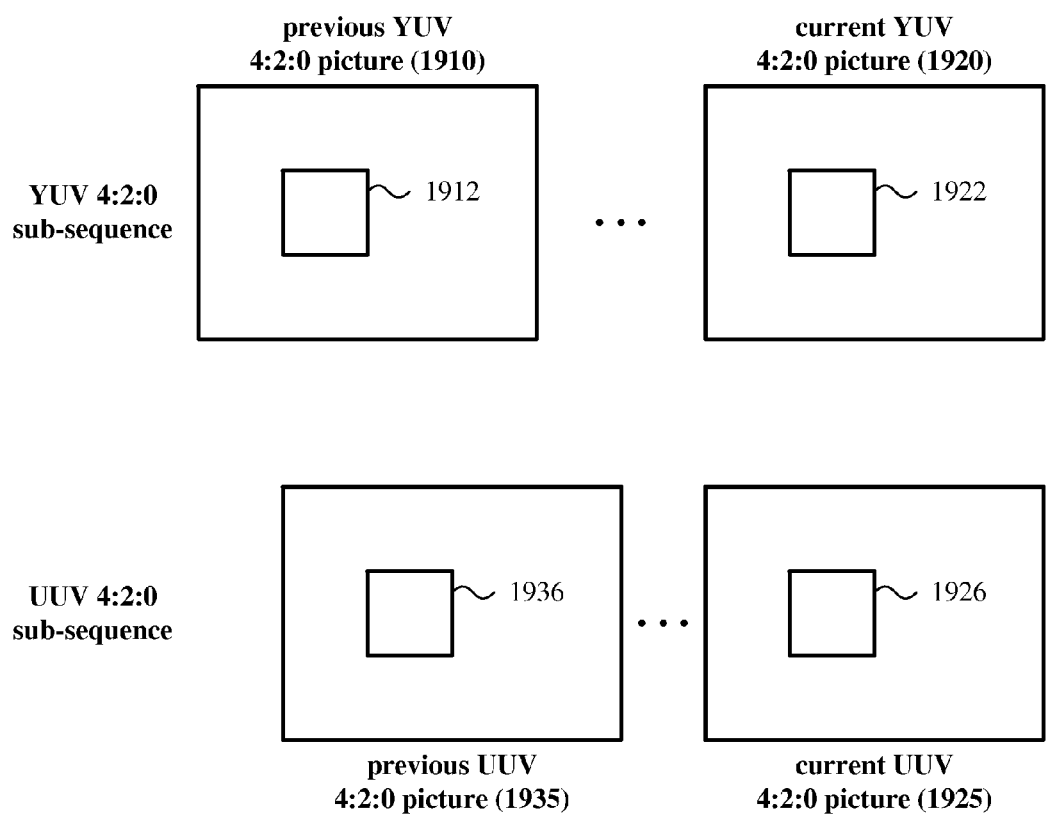
FIG. 19 is a diagram illustrating regions considered in example decision rules for selective encoding of sample values in regions for low chroma resolution versions of input pictures and high chroma resolution details.

FIG. 19 shows coded pictures that may be considered in example decision rules for selective encoding of sample values in regions for low chroma resolution versions of input pictures and high chroma resolution details. In FIG. 19, sample values of input pictures are rearranged into two sub-sequences of coded pictures—a YUV 4:2:0 sub-sequence of coded pictures and a UUV 4:2:0 sub-sequence of coded pictures. In the YUV 4:2:0 sub-sequence, the coded pictures include sample values for low chroma resolution versions of the input pictures. In the UUV 4:2:0 sub-sequence, the coded pictures include sample values for high chroma resolution details of the input pictures.

The current YUV 4:2:0 picture (1920) is a low chroma resolution version of a current input picture, and the current UUV 4:2:0 picture (1925) includes high chroma resolution details of the current input picture. The previous YUV 4:2:0 picture (1910) is a low chroma resolution version of a previous input picture. The current YUV 4:2:0 picture (1920) includes a region (1922). The previous YUV 4:2:0 picture (1910) is the most recent previous coded picture in the YUV 4:2:0 sub-sequence in which the corresponding, co-located region (1912) was encoded. The previous UUV 4:2:0 picture (1935) includes high chroma resolution details of a previous input picture. The current UUV 4:2:0 picture (1925) also includes a region (1926). The previous UUV 4:2:0 picture (1935) is the most recent previous coded picture in the UUV 4:2:0 sub-sequence in which the corresponding, co-located region (1936) was encoded. The previous YUV 4:2:0 picture (1910) and previous UUV 4:2:0 picture (1935) may include sample values from the same input picture, or they may include sample values from different input pictures. Also, for different regions of the current YUV 4:2:0 picture (1920), the previous YUV 4:2:0 picture (1910) may be different (e.g., if the regions change at different times). Similarly, for different regions of the current UUV 4:2:0 picture (1925), the previous YUV 4:2:0 picture (1935) may be different (e.g., if the regions change at different times).

The YUV 4:2:0 pictures (1910, 1920) and UUV 4:2:0 pictures (1925, 1935) are partitioned into regions (also called sub-areas). The size of regions depends on implementation. For example, the size of a region is a multiple of 16×16 (e.g., 16×16, 32×32, or 64×64) to facilitate implementation with conventional codec tools (e.g., using MBs or CTUs). Alternatively, regions have some other size.

FIGS. 20*a*-20*e* illustrate example decision rules (2000-2004) for selective encoding of sample values in regions for low chroma resolution versions of input pictures and high chroma resolution details. In the example decision rules (2000-2004), one or more attributes of a region are evaluated in multiple coded pictures and, in some cases, a current input picture. When an attribute for a given region is evaluated between multiple pictures, the attribute for a co-located region in each of the pictures is evaluated. That is, in each of the pictures, the attribute for a region at a corresponding location in the picture and having a corresponding size is evaluated. For example, as shown in FIG. 19, attributes for co-located regions (1922, 1912) in the YUV 4:2:0 pictures (1920, 1910) can be evaluated. Or, as another example, attributes for co-located regions (1926, 1936) in the UUV 4:2:0 pictures (1925, 1935) can be evaluated. Or, when making a decision about the region (1926) of the current UUV 4:2:0 picture (1925), an attribute for the co-located region in the input picture can be evaluated.

FIGS. 20*a*-20*e* illustrate example decision rules for decisions made on a region-by-region basis for the regions in a YUV 4:2:0 picture and current UUV 4:2:0 picture. Alternatively, the decision rules are applied on a region-by-region basis for the regions in the current YUV 4:2:0 picture, and then the decision rules are applied on a region-by-region basis for the regions in the current UUV 4:2:0 picture.

1. First Example Decision Rules—Checking for Changes.

Figure 20A:
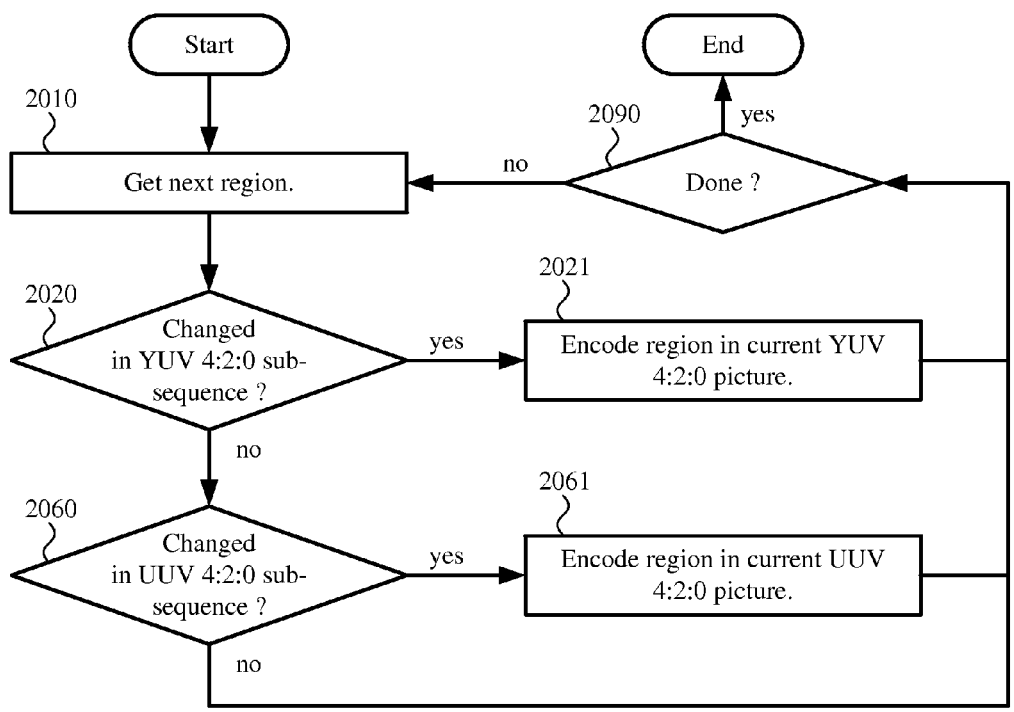

FIG. 20*a* shows first example decision rules (2000). In several stages of the first example decision rules (2000), an encoding tool checks whether a given region is stationary (not changing over time). High chroma resolution details for the region are encoded after the region is stationary for the low chroma resolution versions of the input pictures. By limiting increases in chroma resolution to stationary regions, the encoding tool can reduce the bit rate associated with encoding high chroma resolution details and also increase overall encoding/decoding speed.

The encoding tool can check whether a region is stationary using any of several approaches. For example, the encoding tool computes differences between sample values in the region (1922) of the current YUV 4:2:0 picture (1920) and sample values in the region (1912) of the previous YUV 4:2:0 picture (1910), and evaluates the magnitude of the differences (e.g., checking if any of the differences is non-zero). Similarly, the encoding tool can compute differences between sample values in the region (1926) of the current UUV 4:2:0 picture (1925) and sample values in the region (1936) of the previous UUV 4:2:0 picture (1935), and evaluate the magnitude of the differences (e.g., checking if any of the differences is non-zero). Or, as another example, the encoding tool compares one or more motion vector ("MV") values in the region (1922) of the current YUV 4:2:0 picture (1920) to a MV threshold (e.g., checking if any of the MV values is non-zero). Similarly, the encoding tool can compare one or more MV values in the region (1926) of the current UUV 4:2:0 picture (1925) to a MV threshold (e.g., checking if any of the MV values is non-zero).

With reference to FIG. 20*a*, according to the first example decision rules (2000), the encoding tool gets (2010) the next region. The encoding tool checks (2020) whether the region has changed in the YUV 4:2:0 sub-sequence of coded pictures. If so, the encoding tool encodes (2021) sample values in the region for the low chroma resolution version of the current input picture (that is, for the current YUV 4:2:0 picture). Thus, as long as the region is non-stationary in the YUV 4:2:0 sub-sequence, the low chroma resolution version for the region is encoded. The encoding tool checks (2090) whether it is done and, if not, continues with the next region.

If the region has not changed in the YUV 4:2:0 sub-sequence, the encoding tool checks (2060) whether the region has changed in the UUV 4:2:0 sub-sequence of coded pictures. If so, the encoding tool encodes (2061) sample values in the region for the high chroma resolution details of the current input picture (that is, for the current UUV 4:2:0 picture). Thus, after the region is stationary in the YUV 4:2:0 sub-sequence, the high chroma resolution details for the region are encoded. After the high chroma resolution details have been encoded, however, they are not re-encoded so long as the region is unchanged for the high chroma resolution details.

After the encoding (2061), or if the region has not changed in the UUV 4:2:0 sub-sequence, the encoding tool checks (2090) whether it is done. If not, the encoding tool continues by getting (2010) the next region.

Referring back to the region data (1500) shown in FIG. 15, the map (1512) for the YUV 4:2:0 picture (1510) indicates for each of the regions of the YUV 4:2:0 picture (1510) whether the region is changed ("dirty") or not changed ("not dirty") compared to the co-located region of the most recent preceding YUV 4:2:0 picture for which sample values in the co-located region were encoded. For the first example decision rules (2000), such a map (1512) can represent whether the respective regions of the current YUV 4:2:0 picture (1920) are changed or unchanged. Similarly, the map (1522) for the UUV 4:2:0 picture (1520) indicates for each of the regions of the UUV 4:2:0 picture (1520) whether the region is changed ("dirty") or not changed ("not dirty") compared to the co-located region of the most recent preceding UUV 4:2:0 picture for which sample values in the co-located region were encoded. For the first example decision rules (2000), such a map (1522) can represent whether the respective regions of the current UUV 4:2:0 picture (1925) are changed or unchanged.

For the first example decision rules (2000), the encoding tool can encode regions of coded pictures in a manner consistent with the index values in the maps (1512, 1522), as described with reference to FIG. 20*a*. A corresponding decoding tool can decode the regions in a manner consistent with the index values in the maps (1512, 1522).

2. Second Example Decision Rules—Checking Quality for YUV 4:2:0 Pictures.

Figure 20B:
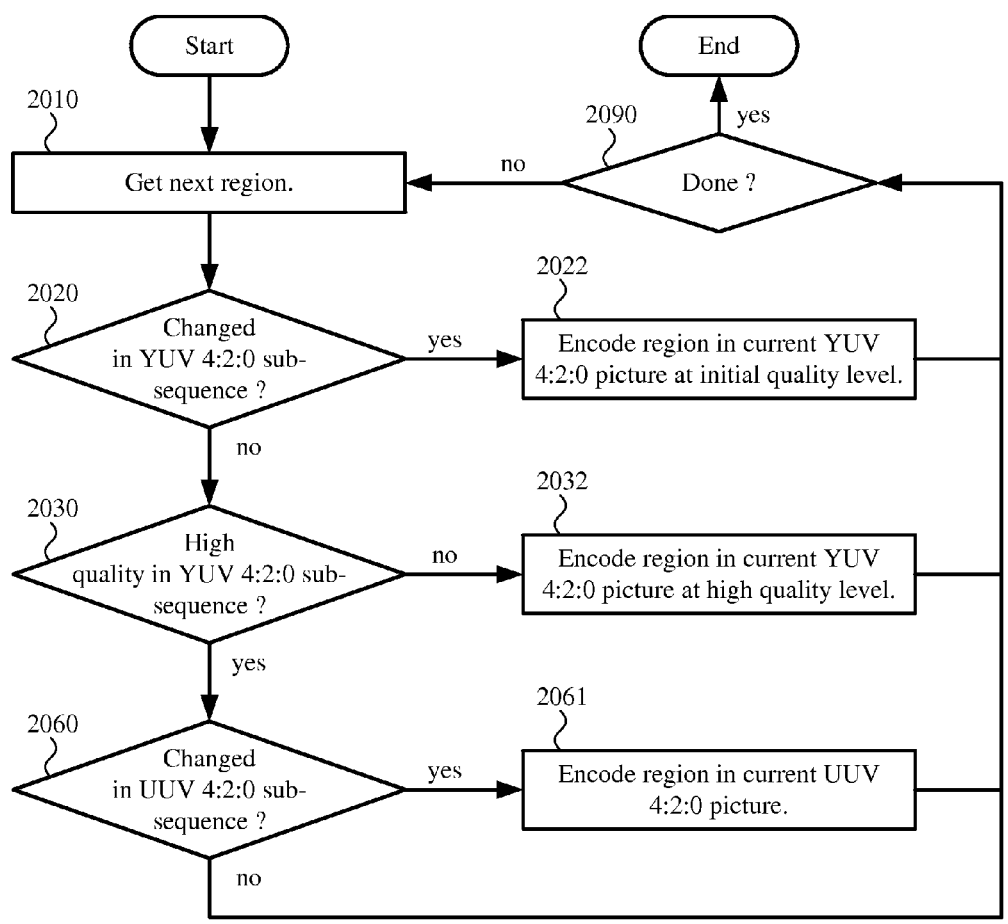

FIG. 20*b* shows second example decision rules (2001). In addition to checking whether a given region is stationary over time, in the second example decision rules (2001), an encoding tool checks whether coding quality is high for the region in the low chroma resolution versions of the input pictures. High chroma resolution details for the given region are encoded after the region is stationary and quality is sufficiently high for the low chroma resolution versions of the input pictures. By further limiting increases in chroma resolution to stationary regions with high quality, the encoding tool can further reduce the bit rate associated with encoding high chroma resolution details and further increase overall encoding/decoding speed.

According to the second example decision rules (2001), the encoding tool gets (2010) the next region. The encoding tool checks (2020) whether the region has changed in the YUV 4:2:0 sub-sequence (see section XI.A.1). If so, the encoding tool encodes (2022) sample values in the region for the low chroma resolution version of the current input picture (that is, for the current YUV 4:2:0 picture) at an initial quality level (e.g., QP=30 for H.264 encoding or H.265 encoding). Thus, as long as the region is non-stationary in the YUV 4:2:0 sub-sequence, the low chroma resolution version for the region is encoded at an initial quality level. The encoding tool checks (2090) whether it is done and, if not, continues with the next region.

If the region has not changed in the YUV 4:2:0 sub-sequence of coded pictures, the encoding tool checks (2030) whether the coding quality for the region is high in the YUV 4:2:0 sub-sequence. For example, the encoding tool compares one or more QP values for the region in the previous YUV 4:2:0 picture to a QP threshold. The QP threshold depends on implementation (e.g., 16 for H.264 encoding or H.265 encoding). If the coding quality for the region is not high in the YUV 4:2:0 sub-sequence, the encoding tool encodes (2032) sample values in the region for the low chroma resolution version of the current input picture (that is, for the current YUV 4:2:0 picture) at a high quality level (e.g., QP=16 for H.264 encoding or H.265 encoding). Thus, if the region is stationary in the YUV 4:2:0 sub-sequence but not yet encoded at a high quality level, the encoding tool increases the coding quality of the region for the low chroma resolution version of the current input picture. The encoding tool checks (2090) whether it is done and, if not, continues with the next region.

On the other hand, if the coding quality of the (stationary) region for the YUV 4:2:0 sub-sequence is high, the encoding tool checks (2060) whether the region has changed in the UUV 4:2:0 sub-sequence (see section XI.A.1). If so, the encoding tool encodes (2061) sample values in the region for the high chroma resolution details of the current input picture (that is, for the current UUV 4:2:0 picture). Thus, after the region is stationary and encoded at a high quality level in the YUV 4:2:0 sub-sequence, the high chroma resolution details for the region are encoded. After the high chroma resolution details have been encoded, however, they are not re-encoded so long as the region is unchanged for the high chroma resolution details.

After the encoding (2061), or if the region has not changed in the UUV 4:2:0 sub-sequence, the encoding tool checks (2090) whether it is done. If not, the encoding tool continues by getting (2010) the next region.

According to the second example decision rules (2001), sample values in the region for the high chroma resolution details of the current input picture (that is, for the current UUV 4:2:0 picture) are encoded at a default, fixed quality level. For example, the default quality level is a high quality level. Alternatively, as described below for the third example decision rules (2002), sample values in the region for high chroma resolution details can be encoded at different quality gradations.

According to the second example decision rules (2001), sample values in the region for the low chroma resolution versions of the input pictures can be encoded at two different quality gradations—initial quality and high quality. Alternatively, sample values in the region for the low chroma resolution versions of the input pictures can be encoded at more quality gradations, with additional checkpoints progressively increasing quality until full quality is reached, at which point high chroma resolution details for the region are encoded.

3. Third Example Decision Rules—Checking Quality for YUV 4:2:0 Pictures and for UUV 4:2:0 Pictures.

FIG. 20c shows third example decision rules (2002). The third example decision rules (2002) extend the second example decision rules (2001) by supporting multiple quality gradations when encoding sample values in the region for high chroma resolution details.

The initial stages (2010, 2020, 2022, 2030, 2032) of the third example decision rules (2002) operate as in the second example decision rules (2001). If the coding quality of the (stationary) region for the YUV 4:2:0 sub-sequence is high, the encoding tool checks (2060) whether the region has changed in the UUV 4:2:0 sub-sequence (see section XI.A.1). If so, the encoding tool encodes (2062) sample values in the region for the high chroma resolution details of the current input picture (that is, for the current UUV 4:2:0 picture) at an initial quality level (e.g., QP=30 for H.264 encoding or H.265 encoding). Thus, after the region is stationary and encoded at a high quality level in the YUV 4:2:0 sub-sequence, the high chroma resolution details for the region are first encoded at an initial quality level.

If the region has not changed in the UUV 4:2:0 sub-sequence, the encoding tool checks (2070) whether the coding quality for the region is high in the UUV 4:2:0 sub-sequence. For example, the encoding tool compares one or more QP values for the region in the previous UUV 4:2:0 picture to a QP threshold. The QP threshold depends on implementation (e.g., 16 for H.264 encoding or H.265 encoding). If the coding quality for the region is not high in the UUV 4:2:0 sub-sequence, the encoding tool encodes (2072) sample values in the region for the high chroma resolution details (that is, for the current UUV 4:2:0 picture) at a high quality level (e.g., QP=16 for H.264 encoding or H.265 encoding). Thus, if the region is stationary in the UUV 4:2:0 sub-sequence but not yet encoded at a high quality level, the encoding tool increases the coding quality of the region for the high chroma resolution details. The encoding tool checks (2090) whether it is done and, if not, continues with the next region.

On the other hand, if the coding quality of the (stationary) region for the UUV 4:2:0 sub-sequence is high, the encoding tool skips further encoding for the region. After the high chroma resolution details have been encoded at a high quality level, they are not re-encoded so long as the region is unchanged for the high chroma resolution details. The encoding tool checks (2090) whether it is done. If not, the encoding tool continues by getting (2010) the next region.

For example, in the progression embodied in the third example decision rules (2002), a changed region is first encoded at an initial quality level in a YUV 4:2:0 picture. If the region becomes stationary, the coding quality of the region is increased in the YUV 4:2:0 sub-sequence. After the stationary region has been encoded at a high quality level in the YUV 4:2:0 sub-sequence, the region is encoded at an initial quality level in a UUV 4:2:0 picture. So long as the region is stationary, the coding quality of the region is further increased in the UUV 4:2:0 sub-sequence, until a high quality level is reached in the UUV 4:2:0 sub-sequence.

According to the third example decision rules (2002), sample values in the region for high chroma resolution details can be encoded at two different quality gradations—initial quality and high quality. Alternatively, sample values in the region for high chroma resolution details can be encoded at more quality gradations, with additional checkpoints progressively increasing quality until full quality is reached.

Referring back to the region data (1600) shown in FIG. 16, the map (1612) for the YUV 4:2:0 picture (1610) indicates, for each of the regions of the YUV 4:2:0 picture (1610), (1) whether the region is changed ("dirty") or not changed ("not dirty") compared to the co-located region of the most recent preceding YUV 4:2:0 picture for which sample values in the co-located region were encoded, and (2) whether the region has been encoded at a high quality level. For the third example decision rules (2002), such a map (1612) can represent whether the respective regions of the current YUV 4:2:0 picture (1920) are changed or unchanged, and whether the respective regions have been encoded at a high quality level. Similarly, the map (1622) for the UUV 4:2:0 picture (1620) indicates, for each of the regions of the UUV 4:2:0 picture (1620), (1) whether the region is changed ("dirty") or not changed ("not dirty") compared to the co-located region of the most recent preceding UUV 4:2:0 picture for which sample values in the co-located region were encoded, and (2) whether the region has been encoded at a high quality level. For the third example decision rules (2002), such a map (1622) can represent whether the respective regions of the current UUV 4:2:0 picture (1925) are changed or unchanged, and whether the respective regions have been encoded at a high quality level.

For the third example decision rules (2002), the encoding tool can encode regions of coded pictures in a manner consistent with the index values in the maps (1612, 1622), as described with reference to FIG. 20c. A corresponding decoding tool can decode the regions in a manner consistent with the index values in the maps (1612, 1622). For example, sample values for a region of a current UUV 4:2:0 picture are encoded/decoded at an initial quality if the region is stationary in the YUV 4:2:0 sub-sequence, has been encoded at high quality in the YUV 4:2:0 sub-sequence, and is non-stationary in the UUV 4:2:0 sub-sequence.

4. Fourth Example Decision Rules—Checking Content Classification.

FIG. 20d shows fourth example decision rules (2003). The fourth example decision rules (2003) extend the first example decision rules (2000) by also checking content classification for a region.

Some stages (2010, 2020, 2021, 2060, 2061) of the fourth example decision rules (2003) operate as in the first example decision rules (2000). A new condition is checked, however, to make encoding of high chroma resolution details even more selective. By further limiting increases in chroma resolution to regions with certain types of content, the encoding tool can further reduce the bit rate associated with encoding high chroma resolution details and further increase overall encoding/decoding speed.

In the fourth example decision rules (2003), if the region has not changed in the YUV 4:2:0 sub-sequence, the encoding tool checks (2040) whether the region includes text content or high chroma content. If so, the encoding tool proceeds to the next stage (2060). Otherwise, the encoding tool checks (2090) whether it is done and, if not, continues by getting (2010) the next region. Thus, high chroma resolution details for the region are encoded only if classification for the region indicates the region includes text content or other high chroma content.

To assess whether the region includes text content, the encoding tool can use any available approach for text classification. For example, the encoding tool uses an approach that classifies the region as including text content or image content. Encoding high chroma resolution details for text content (but not for image content) exploits the observation that higher chroma resolution is typically beneficial for text content, but less likely to be noticeable for image content.

To assess whether the region otherwise includes high chroma content, the encoding tool can evaluate whether chroma sample values are significant compared to a significance threshold (e.g., comparing mean absolute value of the chroma sample values to a threshold). In this way, the encoding tool can consider the blend of colors in the region. If the region includes mostly black and white values, chroma sample values will have low magnitude. On the other hand, if the region includes mostly red and green values, chroma sample values will typically have higher magnitude. Encoding high chroma resolution details for high chroma content (but not for low chroma content) exploits the observation that higher chroma resolution is typically beneficial for high chroma content, but less likely to be helpful for low chroma content.

In FIG. 20d, the fourth example decision rules (2003) extend the first example decision rules (2000). Alternatively, the second example decision rules (2001) or third example decision rules (2002) are extended to check content classification for a region, as described in this section.

5. Fifth Example Decision Rules—Checking Period of Stability.

Figure 20E:
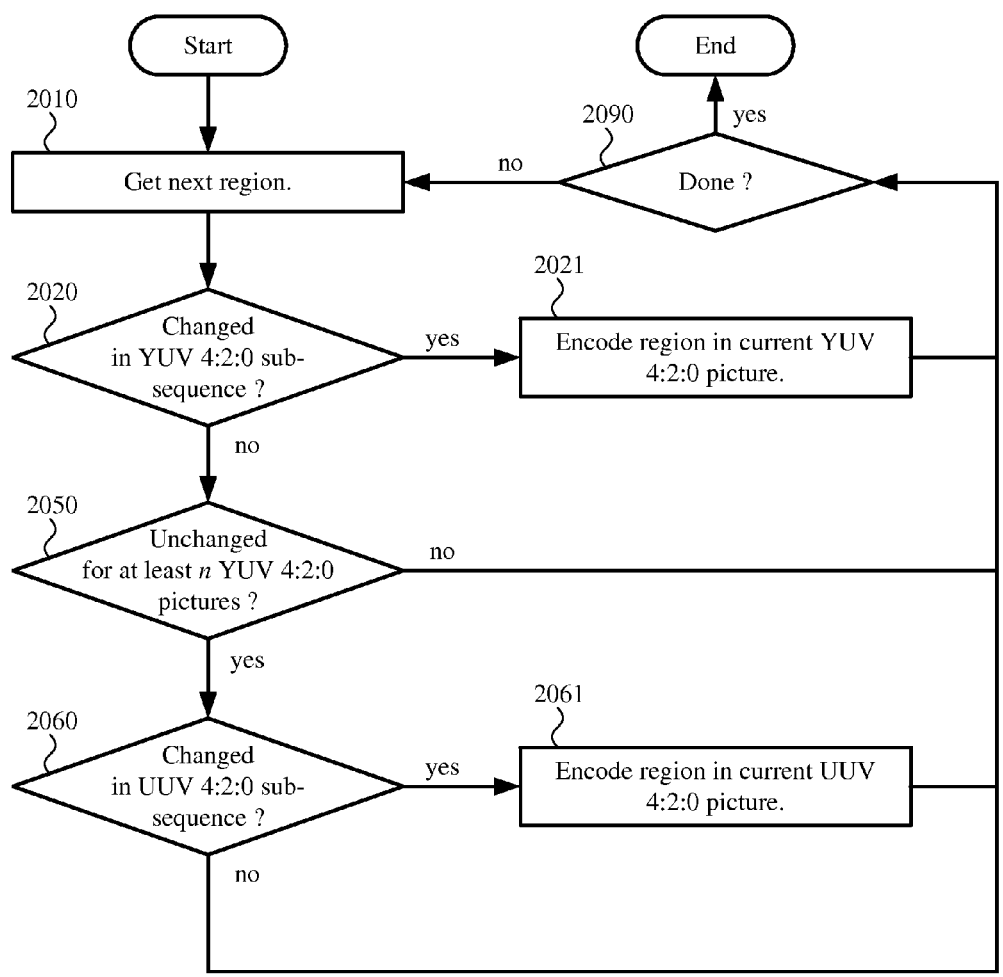

FIG. 20e shows fifth example decision rules (2004). The fifth example decision rules (2004) extend the first example decision rules (2000) by also checking that a region has been stationary for a threshold period of time (e.g., count of pictures) before high chroma resolution details are encoded.

Some stages (2010, 2020, 2021, 2060, 2061) of the fifth example decision rules (2004) operate as in the first example decision rules (2000). A new condition is checked, however, to make encoding of high chroma resolution details even more selective. By further limiting increases in chroma resolution to regions that are stationary over a threshold count of pictures, the encoding tool can further reduce the bit rate associated with encoding high chroma resolution details and further increase overall encoding/decoding speed.

In the fifth example decision rules (2004), if the region has not changed in the YUV 4:2:0 sub-sequence, the encoding tool checks (2050) whether the region has been unchanged for at least n YUV 4:2:0 pictures, where n indicates a threshold count of pictures. If so, the encoding tool proceeds to the next stage (2060). Otherwise, the encoding tool checks (2090) whether it is done and, if not, continues by getting (2010) the next region. Thus, high chroma resolution details for the region are encoded only if the region is stationary for the threshold count of pictures in the YUV 4:2:0 sub-sequence.

The threshold count of pictures depends on implementation. For example, the threshold count of pictures is 1 picture, 3 pictures, 5 pictures, 10 pictures, or some other number of pictures. Waiting for the threshold count to be satisfied imposes a lag time between encoding of sample values for low chroma resolution versions of input pictures and encoding of sample values for high chroma resolution details. The lag time can smooth demands for available bit rate and smooth demands for computational resources during encoding and decoding. Also, encoding high chroma resolution details after a region is stationary for a threshold duration exploits the observation that higher chroma resolution is typically beneficial for stationary content, but less likely to be noticeable for moving content.

In FIG. 20e, the fifth example decision rules (2004) extend the first example decision rules (2000). Alternatively, the second example decision rules (2001) or third example decision rules (2002) are extended to check that a region has been stationary for a threshold period of time (e.g., count of pictures) before high chroma resolution details are encoded, as described in this section. Also, the encoding tool can check content classification (as described in the fourth example decision rules (2003)) in combination with checking a new condition as described in this section.

B. Example Techniques for Region Selection.

Figure 21:
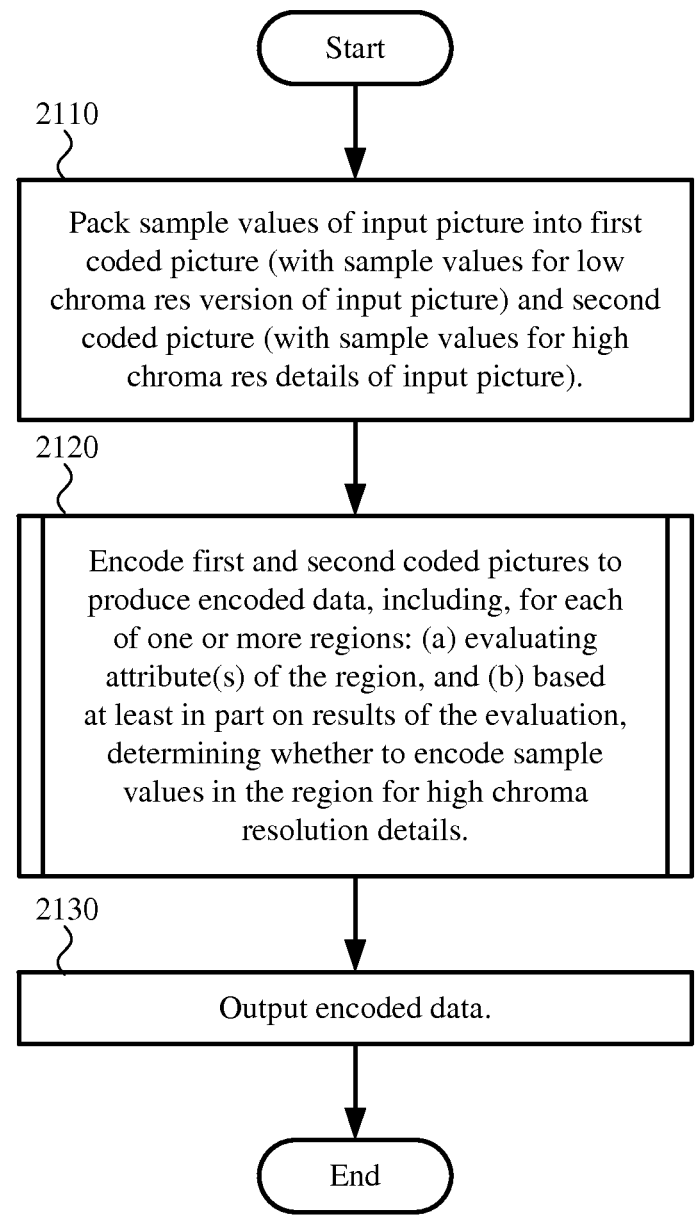
FIG. 21 is a flowchart illustrating a generalized technique for applying decision rules when selectively encoding sample values in regions for high chroma resolution details.

FIG. 21 illustrates a generalized technique (2100) for applying decision rules when selectively encoding sample values in regions for high chroma resolution details. A video encoding tool such as the encoder system (400) described with reference to FIG. 4 or another encoding tool can perform the technique (2100).

The encoding tool packs (2110) sample values of an input picture organized according to an input picture format into first and second coded pictures organized according to first and second coded picture formats, respectively. The first and second coded picture formats can be the same coded picture format or different coded picture formats (e.g., different chroma sampling rates). In general, the input picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0. The first coded picture contains sample values for a low chroma resolution version of the input picture. The second coded picture contains sample values for high chroma resolution details of the input picture. For example, the encoding tool uses any of the approaches described with reference to FIGS. 8a-8e, or another approach, to pack sample values into the first and second coded pictures.

The encoding tool encodes (2120) the first and second coded pictures, thereby producing encoded data. For the encoding, for each of one or more regions, the encoding tool evaluates one or more attributes of the region. For example, the encoding tool evaluates the extent of change in the region, quality of encoded data for the region, and/or content classification for the region. Alternatively, the encoding tool evaluates other and/or additional attributes of the region. Based at least in part on results of the evaluation, the encoding tool determines whether to encode, as part of the second coded picture, sample values in the region for the high chroma resolution details of the input picture. The encoding tool can also, based at least in part on results of the evaluation, determine whether to encode, as part of the first coded picture, sample values in the region for the low chroma resolution version of the input picture. The first and second coded pictures can be encoded as part of different sub-sequences of coded pictures, as described in section IX. In an extreme case, each of the first and second coded pictures is handled as a single region. The encoding tool outputs (2130) the encoded data, which includes encoded data for one or both of the first and second coded pictures.

For example, for one attribute of a region, the encoding tool evaluates the extent of change in the region between one of the first and second coded pictures and a most recent previous picture for which the region was encoded. To evaluate the extent of change in the region, the encoding tool can, for example: (a) compute differences between sample values in the region for the coded picture and sample values in the region for the most recent previous picture for which the region was encoded (e.g., for YUV 4:2:0 pictures, or for UUV 4:2:0 pictures), and evaluate the magnitude of the differences; and/or (b) compare one or more MV values in the region (e.g., for a YUV 4:2:0 picture) to a MV threshold. Alternatively, in some other way, the encoding tool can evaluate the extent of change in the region.

When it evaluates the extent of change in the region, the encoding tool can compare, to a threshold count, a count of pictures over which the region is unchanged for low chroma resolution versions. Thus, the encoder can determine whether the region has been unchanged for the last 3 pictures, 5 pictures, 10 pictures, or some other number of pictures.

As another example, for another attribute of the region, the encoding tool evaluates whether quality of encoded data for the region satisfies a threshold level of quality. To evaluate the quality of encoded data in the region, the encoding tool can compare one or more QP values in the region (e.g., for a low chroma resolution version of a most recent previous picture for which the region was encoded) to a QP threshold. If the QP value(s) are at or below the QP threshold, the encoded data for the region satisfies the threshold level of quality. Otherwise, the encoded data for the region does not satisfy the threshold level of quality. Alternatively, in some other way, the encoding tool can evaluate whether quality of encoded data for the region satisfies a threshold level of quality.

As still another example, for another attribute of the region, the encoding tool classifies content in the region. For example, the encoding tool classifies the content in the region as text content or non-text content. Or, the encoding tool classifies the content in the region as high chroma content (in which chroma sample values are significant compared to a significance threshold, which depends on implementation) or low chroma content (in which chroma sample values are insignificant compared to the significance threshold). Alternatively, in some other way, the encoding tool can classify the content in the region.

The various attributes of the region can be considered in combination, for the YUV 4:2:0 sub-sequence and/or the UUV 4:2:0 sub-sequence. For example, the encoding tool applies one of the sets of decision rules described in section XI.A.

Returning to FIG. 21, the encoding tool can repeat the technique (2100) for each of one or more other input pictures. In some cases, the second coded picture may be dropped (and hence not encoded), such that no encoded data for the second coded picture is output. Also, the first coded picture or second coded picture (or a region thereof) may be skipped with zero motion, such that no encoded data for the coded picture (or region) is output, and the coded picture (or region) is repeated from the previous coded picture in the sub-sequence. Thus, when first and second coded pictures from an input picture are encoded, the encoding tool may produce encoded data for none of the first coded picture, some regions of the first coded picture, or all of the first coded picture, and the encoding tool may produce encoded data for none of the second coded picture, some regions of the second coded picture, or all of the second coded picture.

XII. Filtering of Chroma Sample Values.

This section presents innovations in the area of filtering in and around high chroma resolution regions of output pictures. For example, this section describes approaches to applying a recovery filter to a high chroma resolution region of an output picture, which compensates for anti-aliasing filtering previously performed during chroma sub-sampling, but skipping application of the recovery filter to a low chroma resolution region of the output picture. This section also describes approaches to applying a deblocking filter to chroma sample values of the output picture, which can improve visual quality by mitigating perceptible artifacts at a boundary between a low chroma resolution region and high chroma resolution region. Finally, this section describes approaches to applying a deringing filter to chroma sample values of the output picture, which can improve visual quality by mitigating perceptible artifacts due to low quality coding of high chroma resolution details.

A. Anti-Aliasing Filter and Corresponding Recovery Filter.

Simple sub-sampling of the chroma sample values of frames of a higher-resolution chroma sampling format can introduce aliasing artifacts in the downsampled chroma sample values. To mitigate aliasing, packing (see section VIII) can include operations to filter chroma sample values. Such filtering can be termed anti-alias filtering. Corresponding unpacking can then include recovery operations to compensate for the anti-aliasing filtering of the chroma sample values. This section describes examples of anti-aliasing filtering and recovery filtering operations.

When a YUV 4:4:4 picture is split into two pictures in YUV 4:2:0 format (that is, split into a YUV 4:2:0 picture and UUV 4:2:0 picture, as explained in section VIII), anti-aliasing filtering can help improve quality when only the YUV 4:2:0 picture is used for display. This can permit a decoder to ignore the UUV 4:2:0 picture without running the risk of aliasing artifacts caused by simple sub-sampling of chroma information. Without anti-aliasing filtering (that is, when the chroma sample values for the YUV 4:2:0 picture are obtained by direct sub-sampling of the chroma sample values from the YUV 4:4:4 picture), aliasing artifacts can be seen on some content (e.g., distortions in thickness of ClearType text content) when only the YUV 4:2:0 picture is used to generate output. On the other hand, when a decoder combines the UUV 4:2:0 picture and YUV 4:2:0 picture, the decoder can perform recovery filtering operations as part of unpacking to recover original chroma sample values for the YUV 4:4:4 picture (within limits of approximation due to lossy compression) from the filtered chroma sample values (of the YUV 4:2:0 picture) and other chroma sample values (of the UUV 4:2:0 picture).

In some example implementations, the anti-aliasing filtering operations and recovery filtering operations are limited such that they affect only the chroma sample values that are part of the YUV 4:2:0 picture. That is, the filtered sample values are part of the chroma components of the YUV 4:2:0 picture, and sample values that are part of the UUV 4:2:0 picture are not filtered.

Details of filtering operations can depend on chroma sample location type (indicating chroma sample grid alignment with luma sample grid). Many different types of filters can be used during chroma sub-sampling. For a given chroma sample location type, if the chroma sample value aligns with the luma sample values for a particular direction (horizontal or vertical), then an odd-tap symmetric filter (such as [1 2 1]/4, or [0.25 0.5 0.25], along with a rounding operation) is used to filter chroma in that direction. On the other hand, if the chroma sample value does not align with the luma sample values for a particular direction (horizontal or vertical), and the chroma sample grid positions are centered between the luma sample positions for a particular direction (horizontal/vertical), then an even-tap symmetric filter (typically [1 1]/2, or [0.5 0.5], along with a rounding operation) is used to filter chroma in that direction. Another possible filter choice for the latter case is [1 3 3 1]/8, or [0.125 0.375 0.375 0.125], along with a rounding operation.

The examples presented later in this section use an even tap symmetric filter, but alternatively, an odd-tap symmetric filter or other filter can be used.

The choice of recovery filtering operation is usually made such that the recovery filtering operation compensates for the anti-aliasing filtering operation. In some cases recovery filtering directly inverts anti-aliasing filtering, while in other cases recovery filtering only approximately inverts anti-aliasing filtering, as explained below.

In FIGS. 22a and 22b, after anti-aliasing filtering, a chroma sample value does not align with luma sample values in either horizontal or vertical direction, and hence the filter [0.5 0.5] is applied in both the horizontal and vertical directions for the anti-aliasing filtering. FIG. 22a shows a process flow (2201) applying an anti-aliasing filter and corresponding recovery filter that use chroma sample values at four positions. FIG. 22b shows a process flow (2202) applying an alternative anti-aliasing filter and corresponding recovery filter that use chroma sample values at three positions.

FIG. 22a shows four chroma sample values U0, U1, U2, and U3 from the $U_{444}$ channel of a YUV 4:4:4 picture. The positions of the four chroma sample values are U0=$U_{444}$(2x, 2y), U1=$U_{444}$(2x+1, 2y), U2=$U_{444}$(2x, 2y+1), and U3=$U_{444}$(2x+1, 2y+1). As part of packing operations, an anti-aliasing filter is applied to determine a filtered pixel value that will replace U0 in the YUV 4:2:0 picture. Due to this filtering, the sample value U0 at position $U_{444}$(2x, 2y) from the YUV 4:4:4 picture is not represented directly in the YUV 4:2:0 picture; instead, a filtered sample value UF is assigned at the corresponding position in the YUV 4:2:0 picture. The chroma sample values U1, U2, and U3 at positions $U_{444}$(2x+1,2y), $U_{444}$(2x, 2y+1), and $U_{444}$(2x+1,2y+1), respectively, in the YUV 4:4:4 picture are still represented directly in the UUV 4:2:0 picture.

In general, for the anti-aliasing filtering operation, different weights can be assigned for different sample positions. The filtered sample value UF for position $U_{444}$(2x, 2y) of the YUV 4:4:4 picture can be generated as follows:

$$UF_{444}(2x,2y)=(\alpha*U_{444}(2x,2y)+\beta*U_{444}(2x+1,2y)+\gamma*U_{444}(2x,2y+1)+\delta*U_{444}(2x+1,2y+1))/(\alpha+\beta+\gamma+\delta),$$

where the range of (x, y) is $$\left[0, \frac{W}{2}-1\right] \times \left[0, \frac{H}{2}-1\right]$$

for the width W and height H of the YUV 4:4:4 picture, and where α, β, γ, and δ are weighting factors that depend on implementation. If the weighting factors are all equal to 1, the filtered sample value UF is simply $UF_{444}$(2x, 2y)=($U_{444}$(2x, 2y)+$U_{444}$(2x+1,2y)+$U_{444}$(2x, 2y+1)+$U_{444}$(2x+1,2y+1))/4, or the average of U0, U1, U2 and U3. Otherwise, if any of the factors α, β, γ, and δ have the same value, certain multiplication operations can be eliminated.

In the absence of quantization error, rounding error, etc., the original sample value U0 can be perfectly reconstructed by directly inverting the operations performed in the anti-aliasing filtering. When considering quantization error, however, using values of β, γ, and δ smaller than 1 may be advisable in order to reduce perceptible artifacts. In general, β, γ, and δ should be in the range from 0.0 to 1.0, and β, γ, and δ should be smaller when the quantization step size is larger. Using high values of β, γ, and δ may exacerbate artifacts introduced due to lossy compression. The values of α, β, γ, and δ can be designed for conditional optimality using cross-correlation analysis.

Returning to FIG. 22a, the chroma sample values are separated into coded pictures (e.g., YUV 4:2:0 picture and UUV 4:2:0 picture), which are encoded. After transmission, the coded pictures are decoded (reconstructed), then unpacked into an output picture. The reconstructed sample values UF', U1', U2', and U3' are reconstructed chroma sample values for the $U_{444}$ channel of the YUV 4:4:4 picture at the positions $U_{444}$(2x, 2y), $U_{444}$(2x+1, 2y), $U_{444}$(2x, 2y+1), and $U_{444}$(2x+1, 2y+1), respectively. (The ' mark indicates reconstruction from (possibly lossy) coding, accounting for effects of quantization, rounding, etc.)

As part of the unpacking process, a reconstructed version U0' of the chroma sample value U0 can be recovered from the reconstructed filtered sample value UF' and other reconstructed chroma sample values U1', U2', and U3'. The reconstructed sample value U0' for position $U_{444}$(2x, 2y) of the YUV 4:4:4 picture can be recovered as follows:

$$U'_{444}(2x,2y)=((\alpha+\beta+\gamma+\delta)*UF'_{444}(2x,2y)-\beta*U'_{444}(2x+1,2y)-\gamma*U'_{444}(2x,2y+1)-\delta*U'_{444}(2x+1,2y+1))/\alpha,$$

where the range of (x, y) is $$\left[0, \frac{W}{2}-1\right] \times \left[0, \frac{H}{2}-1\right],$$

and where α, β, γ, and δ are weighting factors that depend on implementation. If the weighting factors are all equal to 1, the reconstructed sample value U0' is simply $U'_{444}$(2x, 2y)=4*$UF'_{444}$(2x,2y)−$U'_{444}$(2x+1, 2y)−$U'_{444}$ (2x, 2y+1)−$U'_{444}$(2x+1,2y+1).

For example, for anti-aliasing filtering, the chroma sample values 29, 23, 27, and 10 for locations (2x, 2y), (2x+1, 2y), (2x, 2y+1) and (2x+1, 2y+1) are filtered with weight values α=β=γ=δ=1, to produce a chroma sample value 22.25, which is rounded to 22. The filtered chroma sample value of 22 is used in place of the original chroma sample value of 29. During recovery filtering, the sample value for the position (2x, 2y) is reconstructed to be 88−23−27−10=28. The difference between the original sample value (29) and reconstructed sample value (28) shows loss of precision due to the anti-aliasing filtering.

FIG. 22b shows the same four chroma sample values U0, U1, U2, and U3 from the $U_{444}$ channel of a YUV 4:4:4 picture. The process flow shown in FIG. 22b mirrors the process flow shown in FIG. 22a, but a different anti-aliasing filter and recovery filter are applied. In FIG. 22b, the anti-aliasing filter and recovery filter use chroma sample values at three positions, which can provide better smoothing quality when an edge runs through the chroma sample values U0, U1, and U2 but does not include U3.

As part of packing operations, in the approach shown in FIG. 22b, the filtered sample value UF for position $U_{444}$(2x, 2y) of the YUV 4:4:4 picture can be generated as follows:

$$UF_{444}(2x,2y)=(\alpha*U_{444}(2x,2y)+\beta*U_{444}(2x+1,2y)+\gamma*U_{444}(2x,2y+1))/(\alpha+\beta+\gamma),$$

where the range of (x, y) is $$\left[0, \frac{W}{2}-1\right] \times \left[0, \frac{H}{2}-1\right]$$

for the width W and height H of the YUV 4:4:4 picture, and where α, β, and γ are weighting factors that depend on implementation. If the weighting factors are all equal to 1, the filtered sample value UF is simply $UF_{444}(2x, 2y)=(U_{444}(2x, 2y)+U_{444}(2x+1,2y)+U_{444}(2x, 2y+1))/3$, or the average of U0, U1, and U2. Options for values of the weighting factors $\alpha$, $\beta$, and $\gamma$ are described with reference to FIG. 22*a*.

As part of the unpacking process, a reconstructed version U0' of the chroma sample value U0 can be recovered from the reconstructed filtered sample value UF' and other reconstructed chroma sample values U1' and U2'. The reconstructed sample value U0' for position $U_{444}(2x, 2y)$ of the YUV 4:4:4 picture can be recovered as follows:

$$U'_{444}(2x,2y)=((\alpha+\beta+\gamma)*UF'_{444}(2x,2y)-\beta*U'_{444}(2x+1,2y)-\gamma*U'_{444}(2x,2y+1))/\alpha,$$

where the range of (x, y) is $$\left[0, \frac{W}{2}-1\right] \times \left[0, \frac{H}{2}-1\right],$$

and where $\alpha$, $\beta$, and $\gamma$ are weighting factors that depend on implementation. If the weighting factors are all equal to 1, the reconstructed sample value U0' is simply $U_{444}(2x, 2y)=3*UF'_{444}(2x, 2y)-U'_{444}(2x+1,2y)-U'_{444}(2x, 2y+1)$.

For example, for anti-aliasing filtering, the chroma sample values 29, 23, and 27 for locations (2x, 2y), (2x+1, 2y), and (2x, 2y+1) are filtered with weight values $\alpha=\beta=\gamma=1$, to produce a chroma sample value 26.33, which is rounded to 26. The filtered chroma sample value of 26 is used in place of the original chroma sample value of 29. During recovery filtering, the sample value for the position (2x, 2y) is reconstructed to be 78−23−27=28. The difference between the original sample value (29) and reconstructed sample value (28) shows loss of precision due to the filtering for the anti-aliasing filtering. Note, however, that the filtered value (26) with the three-position filter of FIG. 22*b* is much closer to the original sample value (29) than the filtered value (22) with the four-position filter of FIG. 22*a*, since the contribution of the outlier sample value U3 is ignored.

Figure 22C:
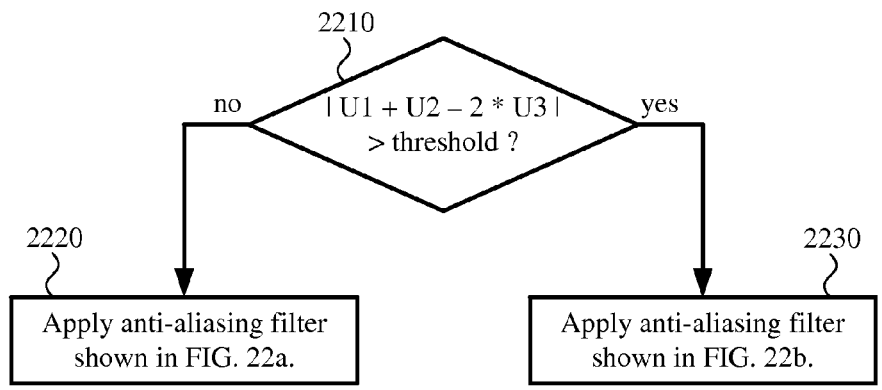

The three-position filters shown in FIG. 22*b* can be selectively applied in an "edge-aware" way. As shown in FIG. 22*c*, during packing operations an encoding tool can check a condition that indicates whether to apply a three-position anti-aliasing filter or four-position anti-aliasing filter. For example, the encoding tool checks (2210) whether the absolute value of U1+U2−2*U3 is greater than a threshold, where the threshold depends on implementation (e.g., 0, 10 or 20). If so, the encoding tool applies (2230) the three-position anti-aliasing filter shown in FIG. 22*b*. Otherwise, the encoding tool applies (2220) the four-position anti-aliasing filter shown in FIG. 22*a*. The value of the threshold be can be determined in experimentation. In general, having a higher threshold makes it less likely the three-position filter will be applied.

Figure 22D:
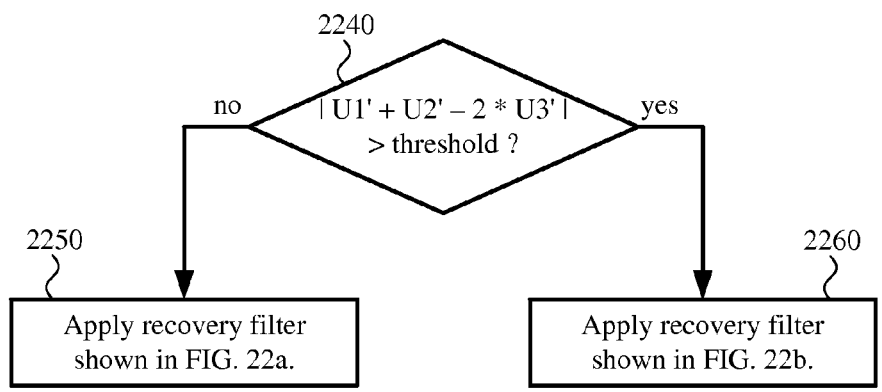

As shown in FIG. 22*d*, during corresponding unpacking operations a decoding tool can check a condition that indicates whether to apply a three-position recovery filter or four-position recovery filter. For example, the decoding tool checks (2240) whether the absolute value of U1'+U2'−2*U3' is greater than a threshold, where the threshold depends on implementation (e.g., 0, 10 or 20). If so, the decoding tool applies (2260) the three-position recovery filter shown in FIG. 22*b*. Otherwise, the decoding tool applies (2250) the four-position recovery filter shown in FIG. 22*a*. Typically, the encoding tool (making decisions based on the original values U1, U2, and U3) and decoding tool (making decisions based on the reconstructed values U1', U2', and U3') make identical decisions, but non-identical decisions may be made for a few chroma sample values due to differences between the original values and reconstructed values. The non-identical decisions may affect quality slightly, but do not affect subsequent decoding. Alternatively, the encoding tool can signal information that indicates which recovery filters to apply.

Although FIGS. 22*a*-22*d* show chroma sample values from the $U_{444}$ channel of a YUV 4:4:4 picture, chroma sample values from the $V_{444}$ channel of a YUV 4:4:4 picture can be filtered and reconstructed in the same way.

Alternatively, filtering operations during packing and unpacking are not limited to the chroma sample values of the YUV 4:4:4 picture that are part of the YUV 4:2:0 picture. Instead, filtering operations are also performed for the chroma sample values of the YUV 4:4:4 picture that are part of the UUV 4:2:0 picture. Such additional filtering operations can use different operations than the anti-aliasing and recovery filtering for the chroma sample values of the YUV 4:4:4 picture that are made part of the YUV 4:2:0 picture.

In the foregoing examples of anti-aliasing filtering operations and recovery filtering operations, an averaging filtering is used during anti-aliasing filtering and corresponding filtering is used during recovery. Alternatively, the anti-aliasing filtering operations and recovery filtering operations can implement a transform/inverse transform pair. For example, the transform/inverse transform pair can be one of the class of wavelet transformations, lifting transformations and other transformations. Specific transforms can also be designed depending on use case scenarios. Or, the anti-aliasing filtering and recovery filtering can use other filter structures, with other filter regions of support or other filter taps, or use filtering that is adaptive with respect to content and/or fidelity (e.g., adaptive with respect to the quantization step sizes used for the encoding). Thus, for the examples presented in this application, the sample values of the first coded picture and second coded picture may be wavelet coefficients or values at pixel positions. Dyadic multiplication and division operations can be implemented with bit shift operations. Normalization can be skipped (e.g., when coded pictures have a higher sample bit depth, as described in the next paragraph) or deferred until a final stage. For additional details about these options and other options for filtering, see U.S. Pat. App. Pub. No. 2014/0112394 A1.

In some example implementations, the representation and/or compression of coded pictures can use a higher sample bit depth than the input picture. For example, the sample bit depth of the input pictures is 8 bits per sample, and the sample bit depth of the coded pictures is 10 bits per sample. This can help reduce precision loss during the application of anti-aliasing filtering operations and recovery filtering operations. Or, this can help achieve higher level of fidelity when coded pictures are encoded using lossy compression. For example, if the input pictures have a sample bit depth of 8 bits per sample, and the coded pictures have a sample bit depth of 10 bits per sample, the bit depth of 10 bits per sample can be maintained in all or most internal modules of the encoder and decoder. The sample bit depth can be reduced to 8 bits per sample, if necessary, after unpacking the content to output pictures at the receiving end. More generally, the sample values of input pictures of the input picture format can have a first bit depth (such as 8, 10, 12 or 16 bits per sample) while the sample values of coded pictures of the coded picture format(s) (following packing operations) have a second bit depth higher than the first bit depth. Thus, for the examples presented in this application, the sample values of the first coded picture and second coded picture may have different bit depths.

B. Selectively Applying Recovery Filter to High Chroma Resolution Regions.

According to approaches described in this section, a video processing tool applies a recovery filter in a high chroma resolution region of an output picture, but skips application of the recovery filter in a low chroma resolution region of the output picture. In this way, the video processing tool can selectively compensate for anti-aliasing filtering previously performed during chroma sub-sampling. This allows the video processing tool to apply the recovery filter in a high chroma resolution region, before or while performing 4:4:4 color conversion, to recover the original chroma sample values from an input picture (within quantization error, rounding error, etc.). On the other hand, for a low chroma resolution region, the video processing tool can, for conventional 4:2:0 color conversion, not apply the recovery filter.

FIG. 23 illustrates a generalized technique (2300) for selectively applying a recovery filter in one or more high chroma resolution regions of an output picture. A video decoding tool such as the decoder system (500) described with reference to FIG. 5 or another decoding tool can perform the technique (2300).

The decoding tool receives (2310) encoded data and decodes (2320) first and second coded pictures organized according to first and second coded picture formats (which can be the same coded picture format or different coded picture formats). The first coded picture contains sample values for a low chroma resolution version of an output picture. The second coded picture contains sample values for high chroma resolution details of the output picture.

The decoding tool unpacks (2330) sample values for the first and second coded pictures into the output picture, which is organized according to an output picture format. For example, the decoding tool reverses any of the approaches described with reference to FIGS. 8a-8e, or another approach, to unpack sample values from the first and second coded pictures. In some cases, the second coded picture includes sample values for only part of that coded picture (e.g., for one or more regions of the coded picture, but not all regions of the coded picture), which affects which sample values are rearranged during the unpacking. In particular, according to the technique (2300) shown in FIG. 23, a high chroma resolution region of the output picture depends on the first and second coded pictures, but a low chroma resolution region of the output picture depends on only the first coded picture. That is, the second coded picture includes sample values for the high chroma resolution region, but not for the low chroma resolution region.

As part of the unpacking (2330), the decoding tool applies a recovery filter to multiple chroma sample values for the high chroma resolution region. For example, for a given chroma sample value (among the chroma sample values for the high chroma resolution region), for a given position in the output picture, the decoding tool recovers a reconstruction of an original chroma sample value at the given position based on the given chroma sample value and other chroma sample values at adjacent positions in the output picture. The other chroma sample values can be three chroma sample values (e.g., for the four-position recovery filter described with reference to FIG. 22a), two chroma sample values (e.g., for the three-position recovery filter described with reference to FIG. 22b), or some other number of chroma sample values. Or, the decoding tool can switch between two or more recovery filters. For example, for the given chroma sample value, the decoding tool evaluates a condition that depends on the other chroma sample values at adjacent positions and, depending on results of the evaluating, selects between using three of the other chroma sample values (as in FIG. 22a) or two of the other chroma sample values (as in FIG. 22b) to adjust the given chroma sample value. Alternatively, the decoding tool applies another recovery filter to chroma sample values for the high chroma resolution region.

As part of the unpacking (2330), the decoding tool skips application of the recovery filter to multiple chroma sample values for the low chroma resolution region. Instead of applying the recovery filter, the decoding tool can apply a lowpass filter to chroma sample values for the low chroma resolution region. For example, using a lowpass filter, the decoding tool generates chroma sample values for positions in the output picture (in place of the missing high chroma resolution details) by interpolating between reconstructed chroma sample values from the first coded picture.

The decoding tool can repeat the technique (2300) for each of one or more other output pictures. In some cases, the second coded picture may have been dropped (and hence not encoded), such that no encoded data for the second coded picture is received or decoded, in which case the recovery filter is not applied.

Alternatively, the decoding tool can selectively skip recovery filtering operations for high chroma resolution regions, even when anti-aliasing filtering was performed. For example, the decoding tool can skip recovery filtering to reduce the computational load of decoding and playback.

C. Applying Deblocking Filter to Boundary Between Low and High Chroma Resolution Regions.

When an output picture includes a high chroma resolution region and a low chroma resolution region, there may be a noticeable discontinuity between the two regions. The discontinuity can be a sharp edge or seam between the two regions, which may be especially noticeable in a smooth area or gradually changing area of the output picture. A deblocking filter can use lowpass filtering to smooth the discontinuity.

According to approaches described in this section, a video processing tool applies a deblocking filter to chroma sample values at a boundary between a low chroma resolution region and high chroma resolution region in an output picture. Applying the deblocking filter can improve visual quality by mitigating compression artifacts at the boundary. For example, the deblocking filter blends sample values on different sides of the boundary to smooth over a perceptible, artificial discontinuity at the boundary.

FIG. 24 illustrates aspects of deblock filtering at boundaries between low and high chroma resolution regions of an output picture (2401). The output picture (2401) includes two regions (2410, 2440) with low chroma resolution and two regions (2420, 2430) with high chroma resolution. A horizontal boundary (2421) separates one low chroma resolution region (2440) and an adjacent high chroma resolution region (2420). Another horizontal boundary (2431) separates the other low chroma resolution region (2410) and an adjacent high chroma resolution region (2430). Two vertical boundaries (2422, 2432) separate low chroma resolution regions (2410, 2440) and adjacent high chroma resolution regions (2420, 2430).

For a given vertical boundary (2422, 2432), a video processing tool applies a deblocking filtering to one or more (horizontal) lines of chroma sample values that cross the vertical boundary (2422, 2432). For a given horizontal boundary (2421, 2431), the video processing tool applies the deblocking filtering to one or more (vertical) lines of chroma sample values that cross the horizontal boundary (2421, 2431). The deblocking filter can be a deblocking filter specified in a standard (such as H.264, H.265, or VC-1) or proprietary format (such as VP8 or VP9) for use in-loop filtering or post-processing, or it can be another deblocking filter.

A deblocking filter can introduce noticeable blurriness when used inappropriately. An adaptive deblocking filter can change how and when the deblocking filter is applied so as to balance tendency to remove artificial discontinuities against tendency to introduce unwanted blurriness. Typically, a deblocking filter is content-adaptive. Depending on values of certain sample values in a given line that crosses a boundary (and/or other local information around the site of filtering), the deblocking filter may be applied or not applied to chroma sample values in the given line. For example, the video processing tool may perform deblocking filtering to smooth what appears to be (based on sample values) an artificial discontinuity in an otherwise smooth or relatively smooth line of chroma sample values. The video processing tool may skip deblock filtering, however, for a discontinuity that appears to be (based on sample values) an actual edge in the content of the picture. Also, depending on values of certain sample values in a given line that crosses a boundary (and/or other local information around the site of filtering), the strength of the deblocking filter as applied to chroma sample values in the given line may change (e.g., by changing filter coefficients for the filter or changing how many chroma sample values are filtered).

A video processing tool can automatically use deblock filtering on boundaries between low and high chroma resolution regions in output pictures. Or, the use (or strength) of the deblock filtering can be controlled through a setting (e.g., a user setting or application setting). Or, the use (or strength) of the deblock filtering can be specified with one or more syntax elements (so-called "filtering hints") signaled as metadata in a bitstream.

FIG. 25 illustrates a generalized technique (2500) for applying a deblocking filter at one or more boundaries between low and high chroma resolution regions of an output picture. A video decoding tool such as the decoder system (500) described with reference to FIG. 5 or another decoding tool can perform the technique (2500).

The decoding tool receives (2510) encoded data and decodes (2520) first and second coded pictures organized according to first and second coded picture formats (which can be the same coded picture format or different coded picture formats). The first coded picture contains sample values for a low chroma resolution version of an output picture. The second coded picture contains sample values for high chroma resolution details of the output picture.

The decoding tool unpacks (2530) sample values for the first and second coded pictures into the output picture, which is organized according to an output picture format. For example, the decoding tool reverses any of the approaches described with reference to FIGS. 8*a*-8*e*, or another approach, to unpack sample values from the first and second coded pictures. In some cases, the second coded picture includes sample values for only part of that coded picture (e.g., for one or more regions of the coded picture, but not all regions of the coded picture), which affects which sample values are rearranged during the unpacking. In particular, according to the technique (2500) shown in FIG. 25, a high chroma resolution region of the output picture depends on the first and second coded pictures, but a low chroma resolution region of the output picture depends on only the first coded picture. That is, the second coded picture includes sample values for the high chroma resolution region, but not for the low chroma resolution region.

The decoding tool applies (2540) a deblocking filter to at least some sample values along a boundary between the high chroma resolution region and the low chroma resolution region of the output picture. For example, the decoding tool applies one of the deblocking filters listed above. Alternatively, the decoding tool applies another deblocking filter. For a non-adaptive filter, in each of multiple lines of multiple chroma sample values that cross the boundary, on each side of the boundary, the decoding tool adjusts one or more of the multiple chroma sample values in the line. Or, for an adaptive deblocking filter, in each of multiple lines of multiple chroma sample values that cross the boundary, the decoding tool (1) evaluates a condition that depends on at least some sample values in the line (e.g., luma sample values and/or chroma sample values), and (2) depending on results of the evaluating, on each side of the boundary, adjusts one or more of the multiple chroma sample values in the line.

The decoding tool can repeat the technique (2500) for each of one or more other output pictures. In some cases, the second coded picture may have been dropped (and hence not encoded), such that no encoded data for the second coded picture is received or decoded, in which case the deblocking filter is not applied in any boundary of a high chroma resolution region.

Alternatively, the decoding tool can selectively skip deblocking filtering operations during post-processing. For example, the decoding tool can skip deblocking filtering during post-processing to reduce the computational load of decoding and playback, or as specified by filtering hints in the bitstream.

D. Applying a Deringing Filter to High Chroma Resolution Regions.

When an output picture includes a high chroma resolution region, high chroma resolution details for the region may have been encoded at lower quality (e.g., a higher value of quantization parameter) than low chroma resolution details for the region. In this case, the high chroma resolution region may include ringing artifacts, high-frequency noise, or other noticeable distortion due to the low coding quality for the high chroma resolution details. For example, when sample values from a high-quality YUV 4:2:0 picture are composed with sample values from a low-quality UUV 4:2:0 picture, ringing artifacts may appear in the high chroma resolution region. The ringing artifacts may be observed as faint, repeated edges around an actual edge in reconstructed content. Such ringing artifacts may be due to quantization of high-frequency coefficients. In extreme cases, the distortion may even be worse than a region constructed using the YUV 4:2:0 picture alone.

A deringing filter can be used preserve actual edges in content, and remove ringing artifacts around the edges, but may blur edges when used inappropriately. A deringing filter can be an adaptive, edge-preserving filter that changes filter mode and filter strength based on the detection of edges in reconstructed content. For example, a deringing filter can based on edge-preserving maximum a posteriori ("MAP") estimation, with a Markov random field, but such deringing filters tend to have high computational cost. Other examples of deringing filters are described below.

According to approaches described in this section, a video processing tool selectively applies a deringing filter to chroma sample values in a high chroma resolution region of an output picture. Applying the deringing filter can improve visual quality by mitigating compression artifacts due to low quality coding of high chroma resolution details.

Figure 26:
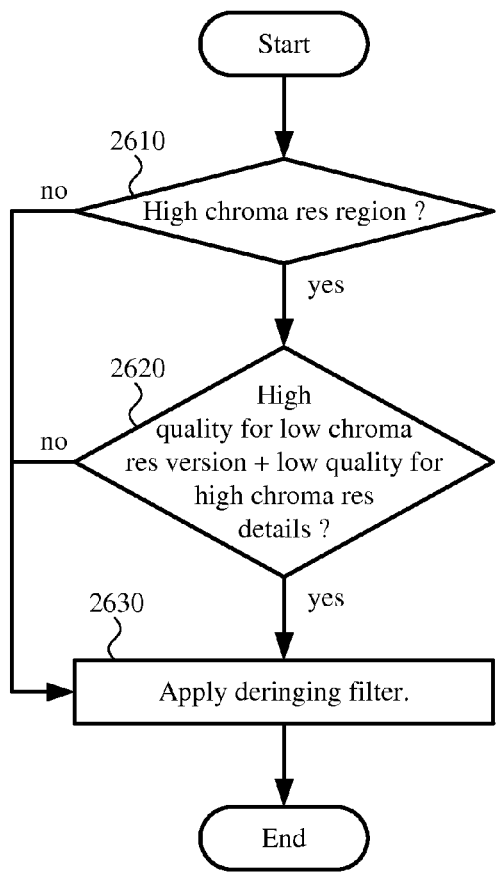
FIG. 26 is a flowchart illustrating aspects of adaptive deringing filtering in a region of an output picture.

FIG. 26 illustrates a technique (2600) for adaptive deringing filtering in a region of an output picture. A video decoding tool such as the decoder system (500) described with reference to FIG. 5 or another decoding tool can perform the technique (2600).

For a given region of an output picture, the decoding tool checks (2610) whether the region is a high chroma resolution region. If so, the decoding tool continues by checking (2620) whether the region is composed from a high-quality low chroma resolution version for the region and low-quality high chroma resolution details for the region. Alternatively, the decoding tool checks some other condition. If the condition is satisfied, the decoding tool applies (2630) a deringing filter in the region. The deringing filter can be based on a deringing filter specified in a standard (such as VC-1) or proprietary format for use in post-processing, or it can be another deringing filter. Typically, the deringing filter is content-adaptive.

For the condition checked (2620) in FIG. 26, the deringing filter that is selectively applied weights chroma sample values from high-quality low chroma resolution details for a region more heavily than chroma sample values from low-quality high chroma resolution details for the region. For example, the deringing filter weights sample values that depend on a first coded picture (low chroma resolution version) more heavily than sample values from the second coded picture (high chroma resolution details). This can improve visual quality by effectively using chroma sample values from the second coded picture to improve, rather than replace, approximate high-resolution chroma sample values derived from the first coded picture.

FIGS. 27a-27d illustrate an example of such a deringing filter for a high chroma resolution region of an output picture. FIGS. 27a-27d show a deringing filter with a 3×3 filter kernel having filter taps that vary depending on the position of the kernel in the output picture, although the normalization factor (equal to 16) is unchanged. Overall, the filter taps are higher at positions with chroma sample values recovered using values from the first coded picture. The chroma sample values shown in FIGS. 27a-27d include reconstructed chroma sample values (shown as U0') recovered using values from the first coded picture as well as reconstructed chroma sample values (shown as U1', U2', U3') from the second coded picture.

Figure 27A:
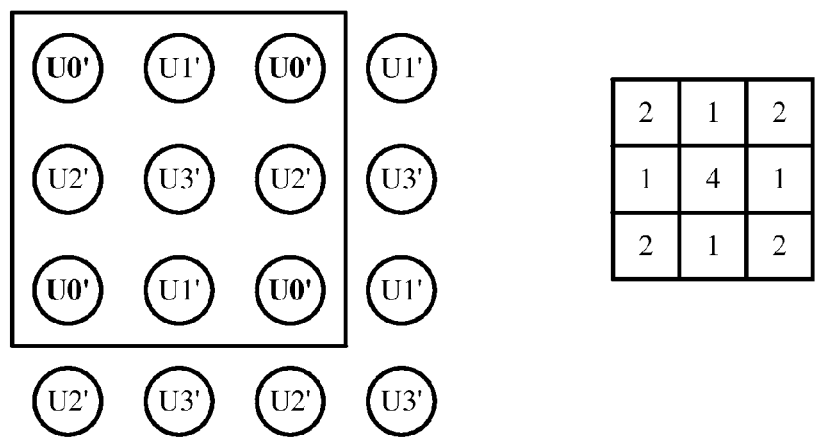
FIGS. 27a-27d are diagrams illustrating examples of deringing filters for a high chroma resolution region of an output picture.

FIG. 27a shows a first position (2701) for the filter kernel. For the first position (2701), the kernel includes four chroma sample values U0' recovered using values from the first coded picture. The center chroma sample value has the highest weight (4), but the four U0' values have the next highest weight (2).

Figure 27B:
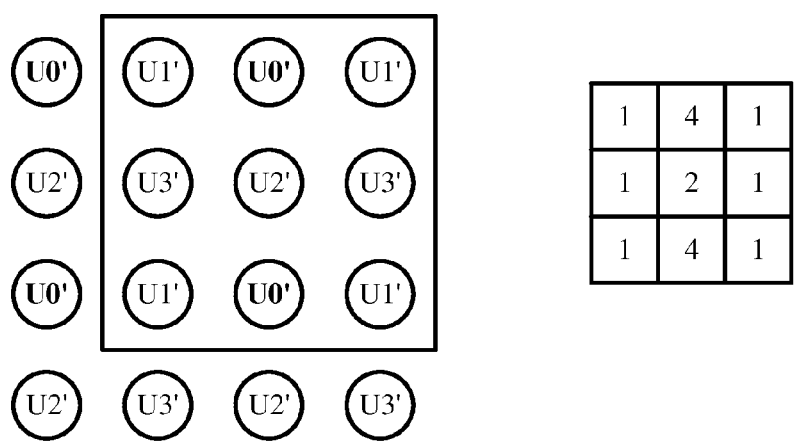
Figure 27C:
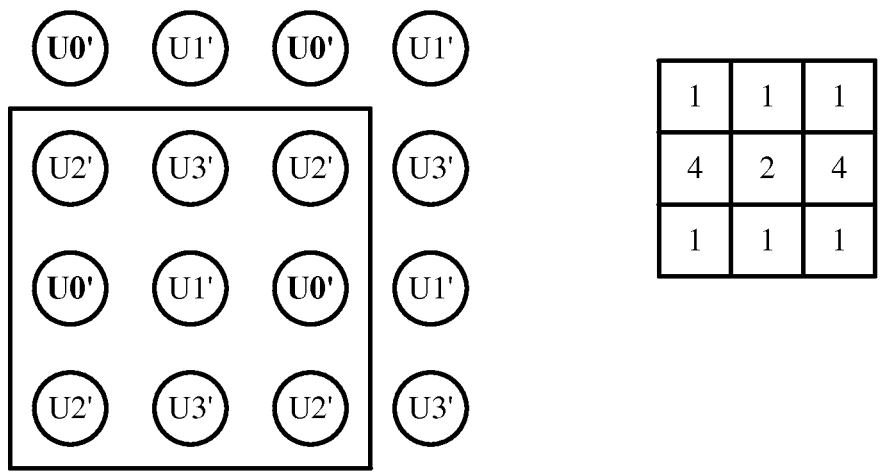

FIG. 27b shows a second position (2702) for the filter kernel. For the second position (2702), the kernel includes two recovered chroma sample values U0', which have the highest weight (4). The center chroma sample value has the next highest weight (2). FIG. 27c shows a third position (2703) for the filter kernel. For the third position (2703), filter taps are the same as the second position (2702) but rotated.

Figure 27D:
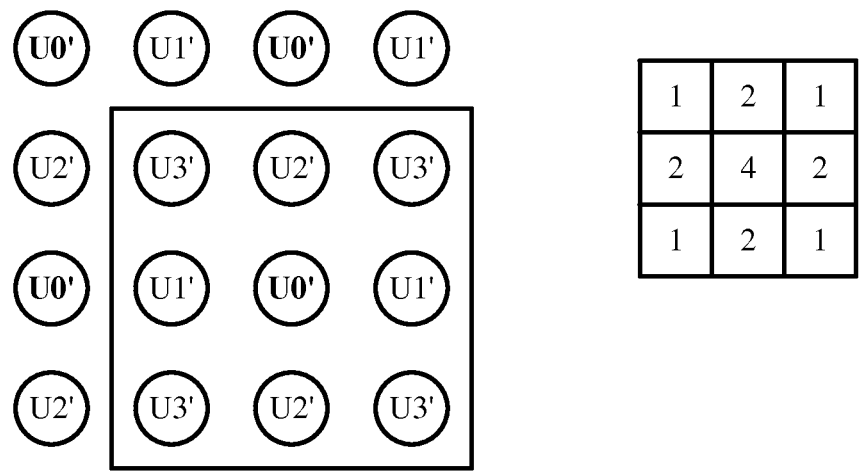

FIG. 27d shows a fourth position (2704) for the filter kernel. For the fourth position (2704), the kernel includes a single recovered chroma sample value U0', which has the highest weight (4). Four neighboring chroma sample values have the next highest weight (2).

A video processing tool can automatically use deringing filtering in high chroma resolution regions in output pictures. Or, the use (or strength) of the deringing filtering can be controlled through a setting (e.g., a user setting or application setting). Or, the use (or strength) of the deringing filtering can be specified with one or more syntax elements (so-called "filtering hints") signaled as metadata in a bitstream.

Figure 28:
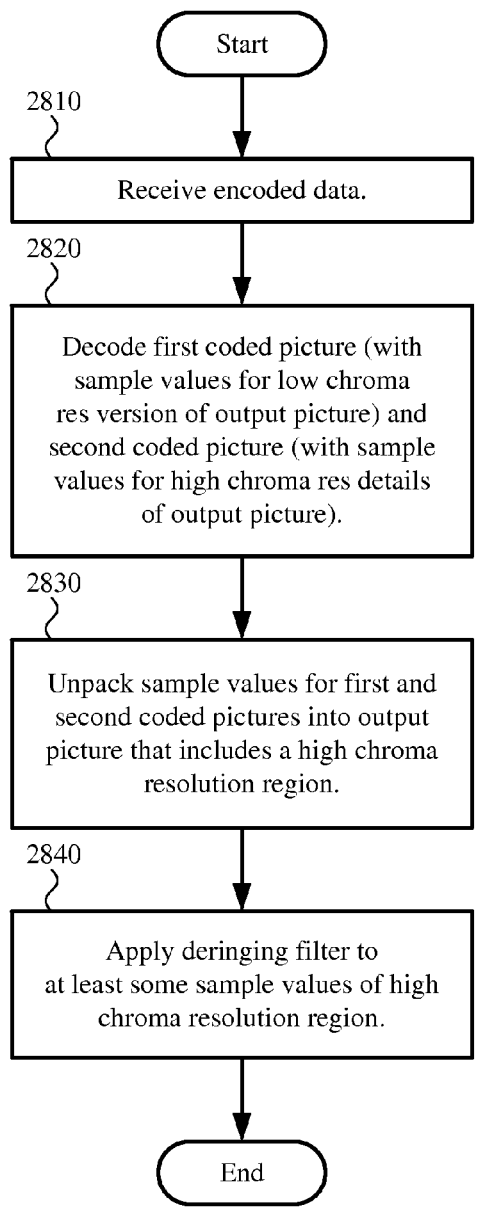
FIG. 28 is a flowchart illustrating a generalized technique for applying a deringing filter in a high chroma resolution region of an output picture.

FIG. 28 illustrates a generalized technique (2800) for applying a deringing filter in a high chroma resolution region of an output picture. A video decoding tool such as the decoder system (500) described with reference to FIG. 5 or another decoding tool can perform the technique (2800).

The decoding tool receives (2810) encoded data and decodes (2820) first and second coded pictures organized according to first and second coded picture formats (which can be the same coded picture format or different coded picture formats). The first coded picture contains sample values for a low chroma resolution version of an output picture. The second coded picture contains sample values for high chroma resolution details of the output picture.

The decoding tool unpacks (2830) sample values for the first and second coded pictures into the output picture, which is organized according to an output picture format. For example, the decoding tool reverses any of the approaches described with reference to FIGS. 8a-8e, or another approach, to unpack sample values from the first and second coded pictures. In particular, according to the technique (2800) shown in FIG. 28, a high chroma resolution region of the output picture depends on the first and second coded pictures. That is, the second coded picture includes sample values for the high chroma resolution region.

The decoding tool applies (2840) a deringing filter to at least some sample values of the high chroma resolution region of the output picture. For example, the decoding tool applies one of the deringing filters listed above. Alternatively, the decoding tool applies another deringing filter. The deringing filter can emphasize those of the sample values of the high chroma resolution region that depend on the first coded picture, relative to those of the sample values of the high chroma resolution region from the second coded picture. When determining whether to apply the deringing filter, the decoding tool can evaluate a condition that depends on coding quality of the first coded picture for the high chroma resolution region and coding quality of the second coded picture for the high chroma resolution region, where the decision about whether to apply the deringing filter depends on results of the evaluating. Alternatively, when determining whether to apply the deringing filter, the decoding tool can evaluate some other condition.

The decoding tool can repeat the technique (2800) for each of one or more other output pictures. In some cases, the second coded picture may have been dropped (and hence not encoded), such that no encoded data for the second coded picture is received or decoded, in which case the deringing filter is not applied in any high chroma resolution region.

Alternatively, the decoding tool can selectively skip deringing filtering operations during post-processing. For example, the decoding tool can skip deringing filtering during post-processing to reduce the computational load of decoding and playback, or as specified by filtering hints in the bitstream.

E. Alternatives and Variations.

For the approaches describes in sections XII.B, XII.C, and XII.D, encoded data can be received as part of one bitstream. Syntax for the bitstream permits the first coded picture and/or the second coded picture to lack encoded sample values for at least part of the output picture. The first and second coded pictures can be decoded as part of different sub-sequences of coded pictures, as described in section IX. When a coded picture (or region thereof) is skipped with zero motion, such that no encoded data for the coded picture (or region) is received, the coded picture (or region) can be decoded by repeating from the previous coded picture. Thus, when first and second coded pictures for an output picture are decoded, the decoding tool may use encoded data for none of the first coded picture, some regions of the first coded picture, or all of the first coded picture, and the decoding tool may use encoded data for none of the second coded picture, some regions of the second coded picture, or all of the second coded picture. Also, if either of the coded pictures (or a region therein) has been skipped with zero motion, a previous coded picture (or co-located region) in the same sub-sequence can provide sample values (for the current coded picture or its region) used when composing the output picture.

For the approaches describes in sections XII.B, XII.C, and XII.D, in general, the output picture format has a first chroma sampling rate, and at least one of the first and second coded picture formats has a second chroma sampling rate lower than the first chroma sampling rate. For example, the first chroma sampling rate is 4:4:4, and the second chroma sampling rate is 4:2:0. Alternatively, one or more of the picture formats has some other chroma sampling rate.

In addition to applying a deblocking filter and/deringing filter as part of post-processing operations, a video processing tool can apply one or more other types of filters (e.g., a denoising filter).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising a processor, memory, and storage, wherein the computer system is configured to implement a video processing tool comprising:
   a formatter configured to pack sample values of an input picture organized according to an input picture format into first and second coded pictures organized according to first and second coded picture formats, respectively, the first coded picture containing sample values for a low chroma resolution version of the input picture, and the second coded picture containing sample values for high chroma resolution details of the input picture;
   a video encoder system configured to encode the first and second coded pictures to produce encoded data, including, for each of multiple regions of the first and second coded pictures:
      evaluating one or more attributes of the region;
      based at least in part on results of the evaluating, determining whether or not to encode sample values in the region for the high chroma resolution details of the input picture as part of the second coded picture; and
      selectively encoding, or skipping encoding of, the sample values in the region for the high chroma resolution details of the input picture as part of the second coded picture; and
   a buffer configured to output the encoded data.

2. The computer system of claim 1, wherein the input picture format has a first chroma sampling rate, and wherein at least one of the first and second coded picture formats has a second chroma sampling rate lower than the first chroma sampling rate.

3. The computer system of claim 2, wherein the first chroma sampling rate is 4:4:4, and wherein the second chroma sampling rate is 4:2:0.

4. The computer system of claim 1, wherein the evaluating the one or more attributes of the region includes:
   evaluating extent of change in the region between one of the first and second coded pictures and a most recent previous picture for which the region was encoded.

5. The computer system of claim 4, wherein the evaluating the extent of change in the region includes one or more of:
   computing differences between sample values in the region for the one of the first and second coded pictures and sample values in the region for the most recent previous picture for which the region was encoded, and evaluating magnitude of the differences; and
   comparing one or more motion vector values in the region to a motion vector threshold.

6. The computer system of claim 4, wherein the evaluating the extent of change in the region includes comparing, to a threshold count, a count of pictures over which the region is unchanged for low chroma resolution versions.

7. The computer system of claim 1, wherein the evaluating the one or more attributes of the region includes:
   evaluating whether quality of encoded data for the region satisfies a threshold level of quality.

8. The computer system of claim 7, wherein the evaluating the quality of encoded data for the region includes comparing one or more quantization parameter values in the region to a quantization parameter threshold.

9. The computer system of claim 1, wherein the evaluating the one or more attributes of the region includes:
   classifying content in the region.

10. The computer system of claim 9, wherein the classifying the content n the region includes classifying the content as text content or non-text content.

11. The computer system of claim 9, wherein the classifying the content in the region includes classifying the content as high chroma content, in which chroma sample values are significant compared to a significance threshold, or low chroma content, in which chroma sample values are insignificant compared to the significance threshold.

12. The computer system of claim 1, wherein the encoding the first and second coded pictures further includes, for each of the multiple regions:
   based at least in part on the results of the evaluating, determining whether or not to encode sample values in the region for the low chroma resolution version of the input picture as part of the first coded picture; and
   selectively encoding, or skipping the encoding of, the sample values in the region for the low chroma resolution version of the input picture as part of the first coded picture in the first coded picture format.

13. The computer system of claim 12, wherein, for each of the multiple regions:
   if the region has changed between the low chroma resolution version of the input picture and a low chroma resolution version of a most recent previous picture for which the region was encoded, the sample values in the region for the low chroma resolution version of the input picture are encoded at an initial quality level as part of the first coded picture;
   otherwise, if quality of encoded data for the region fails to satisfy a threshold level of quality, the sample values in the region for the low chroma resolution version of the input picture are encoded at a high quality level as part of the first coded picture; and otherwise, the sample values in the region for the high chroma resolution details of the input picture are encoded as part of the second coded picture.

14. The computer system of claim 13, wherein the sample values in the region for the high chroma resolution details of the input picture are encoded at a default quality level.

15. The computer system of claim 13, wherein, when the sample values in the region for the high chroma resolution details of the input picture are encoded:
   if the region has changed between the high chroma resolution details of the input picture and high chroma resolution details of a most recent previous picture for which the region was encoded, the sample values in the region for the high chroma resolution details of the input picture are encoded at an initial quality level; and
   otherwise, the sample values in the region for the high chroma resolution details of the input picture are encoded at a high quality level.

16. The computer system of claim 13, wherein the encoding the first and second coded pictures further includes, for the region:
   comparing a count of pictures over which the region is unchanged for low chroma resolution versions to a threshold count, wherein the encoding of the sample values in the region for the high chroma resolution details of the input picture depends on the comparison of the count of pictures to the threshold count.

17. The computer system of claim 13, wherein the encoding the first and second coded pictures further includes, for the region:
   classifying content of the region, wherein the encoding of the sample values in the region for the high chroma resolution details of the input picture depends on the content of the region being classified as text content.

18. The computer system of claim 13, wherein the encoding the first and second coded pictures further includes, for the region:
   classifying content of the region, wherein the encoding of the sample values in the region for the high chroma resolution details of the input picture depends on the content of the region being classified as high chroma content in which chroma sample values are significant compared to a significance threshold.

19. In a computer system that implements a video encoder system, a method comprising:
   packing sample values of an input picture organized according to an input picture format into first and second coded pictures organized according to first and second coded picture formats, respectively, the first coded picture containing sample values for a low chroma resolution version of the input picture, and the second coded picture containing sample values for high chroma resolution details of the input picture;
   encoding the first and second coded pictures to produce encoded data, including, for each of multiple regions of the first and second coded pictures:
      evaluating one or more attributes of the region; and
      based at least in part on results of the evaluating, determining whether or not to encode sample values in the region for the high chroma resolution details of the input picture as part of the second coded picture;
      selectively encoding, or skipping encoding of, the sample values in the region for the high chroma resolution details of the input picture as part of the second coded picture; and
   outputting the encoded data.

20. One or more computer-readable media storing computer-executable instructions for causing a computer system, when programmed thereby, to perform video processing, the one or more computer-readable media being selected from the group consisting of non-volatile memory, magnetic disk, and optical storage media, the video processing comprising:
   packing sample values of an input picture organized according to an input picture format into first and second coded pictures organized according to first and second coded picture formats, respectively, the first coded picture containing sample values for a low chroma resolution version of the input picture, and the second coded picture containing sample values for high chroma resolution details of the input picture;
   encoding the first and second coded pictures to produce encoded data, including, for each of multiple regions of the first and second coded pictures:
      evaluating one or more attributes of the region; and
      based at least in part on results of the evaluating, determining whether or not to encode sample values in the region for the high chroma resolution details of the input picture as part of the second coded picture;
      selectively encoding, or skipping encoding of, the sample values in the region for the high chroma resolution details of the input picture as part of the second coded picture; and
   outputting the encoded data.

21. The one or more computer-readable media of claim 20, Wherein the encoding the first and second coded pictures further includes, for each of the multiple regions:
   based at least in part on the results of the evaluating, determining whether or not to encode sample values in the region for the low chroma resolution version of the input picture as part of the first coded picture; and
   selectively encoding, or skipping the encoding of, the sample values in the region for the low chroma resolution version of the input picture as part of the first coded picture in the first coded picture format.

22. The one or more computer-readable media of claim 21, wherein, for each of the multiple regions:
   if the region has changed between the low chroma resolution version of the input picture and a low chroma resolution version of a most recent previous picture for which the region was encoded, the sample values in the region for the low chroma resolution version of the input picture are encoded at an initial quality level as part of the first coded picture;
   otherwise, if quality of encoded data for the region fails to satisfy a threshold level of quality, the sample values in the region for the low chroma resolution version of the input picture are encoded at a high quality level as part of the first coded picture; and
   otherwise, the sample values in the region for the high chroma resolution details of the input picture are encoded as part of the second coded picture.

23. The method of claim 19, wherein the encoding the first and second coded pictures further includes, for each of the multiple regions:
   based at least in part on the results of the evaluating, determining whether or not to encode sample values in the region for the low chroma resolution version of the input picture as part of the first coded picture; and
   selectively encoding, or skipping the encoding of, the sample values in the region for the low chroma resolution version of the input picture as part of the first coded picture in the first coded picture format.

24. The method of claim 23, wherein, for each of the multiple regions:
- if the region has changed between the low chroma resolution version of the input picture and a low chroma resolution version of a most recent previous picture for which the region was encoded, the sample values in the region for the low chroma resolution version of the input picture are encoded at an initial quality level as part of the first coded picture;
- otherwise, if quality of encoded data for the region fails to satisfy a threshold level of quality, the sample values in the region for the low chroma resolution version of the input picture are encoded at a high quality level as part of the first coded picture; and
- otherwise, the sample values in the region for the high chroma resolution details of the input picture are encoded as part of the second coded picture.

\* \* \* \* \*